US010302920B2

(12) United States Patent
Chang et al.

(10) Patent No.: US 10,302,920 B2
(45) Date of Patent: *May 28, 2019

(54) OPTICAL IMAGE CAPTURING SYSTEM

(71) Applicant: Ability Opto-Electronics Technology Co. Ltd., Taichung (TW)

(72) Inventors: Yeong-Ming Chang, Taichung (TW); Chien-Hsun Lai, Taichung (TW); Yao-Wei Liu, Taichung (TW)

(73) Assignee: ABILITY OPTO-ELECTRONICS TECHNOLOGY CO. LTD., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/807,208

(22) Filed: Nov. 8, 2017

(65) Prior Publication Data
US 2019/0033562 A1 Jan. 31, 2019

(30) Foreign Application Priority Data
Jul. 26, 2017 (TW) ................... 106125173 A

(51) Int. Cl.
G02B 13/14 (2006.01)
G02B 13/00 (2006.01)

(52) U.S. Cl.
CPC ........... G02B 13/14 (2013.01); G02B 13/008 (2013.01); G02B 13/0045 (2013.01)

(58) Field of Classification Search
CPC ........ G02B 13/14; G02B 13/004; G02B 9/34; G02B 13/18; G02B 27/0025; G03F 7/70225; G03F 7/7015; G03F 7/70191; G03F 7/70241; G03F 7/70308

USPC ........ 359/708, 713–716, 557, 751, 740, 755
See application file for complete search history.

(56) References Cited

U.S. PATENT DOCUMENTS

| 8,599,495 | B1* | 12/2013 | Tsai | G02B 13/0045 359/708 |
| 2009/0063160 | A1* | 3/2009 | Tsai | G10L 19/02 704/500 |
| 2012/0257288 | A1* | 10/2012 | Tsai | G02B 13/0035 359/716 |
| 2014/0043694 | A1* | 2/2014 | Tsai | G02B 3/04 359/708 |
| 2015/0362702 | A1* | 12/2015 | Tang | G02B 13/0045 348/335 |
| 2015/0378131 | A1* | 12/2015 | Tang | G02B 9/64 359/708 |
| 2016/0004050 | A1* | 1/2016 | Tang | G02B 13/0045 348/374 |

(Continued)

Primary Examiner — William R Alexander
Assistant Examiner — Tamara Y. Washington
(74) Attorney, Agent, or Firm — Muncy, Geissler, Olds & Lowe, P.C.

(57) ABSTRACT

The invention discloses a six-piece optical lens for capturing image and a six-piece optical module for capturing image. In order from an object side to an image side, the optical lens along the optical axis comprises a first lens with refractive power; a second lens with refractive power; a third lens with refractive power; a fourth lens with refractive power; a fifth lens with refractive power; a sixth lens with refractive power; and at least one of the image side and object side of each of the six lens is aspheric. The optical lens can increase aperture value and improve the imagining quality for use in compact cameras.

25 Claims, 30 Drawing Sheets

(56) References Cited

U.S. PATENT DOCUMENTS

| | | | |
|---|---|---|---|
| 2016/0018629 A1* | 1/2016 | Tang | G02B 13/0045 348/373 |
| 2016/0033747 A1* | 2/2016 | Tang | G02B 13/0045 359/713 |
| 2016/0041369 A1* | 2/2016 | Tang | G02B 13/0045 348/335 |
| 2016/0124184 A1* | 5/2016 | Tang | G02B 9/62 359/713 |
| 2016/0124186 A1* | 5/2016 | Tang | G02B 13/0045 359/713 |
| 2016/0131870 A1* | 5/2016 | Tang | G02B 13/0045 359/713 |
| 2016/0131872 A1* | 5/2016 | Tang | G02B 13/0045 359/713 |
| 2016/0131873 A1* | 5/2016 | Tang | G02B 13/0045 359/713 |
| 2016/0131874 A1* | 5/2016 | Tang | G02B 13/0045 359/708 |
| 2016/0161713 A1* | 6/2016 | Huang | G02B 13/0045 348/373 |
| 2016/0299319 A1* | 10/2016 | Tang | G02B 9/64 |
| 2017/0248771 A1* | 8/2017 | Tang | G02B 13/0045 |
| 2017/0254989 A1* | 9/2017 | Tsai | G02B 13/0045 |

\* cited by examiner

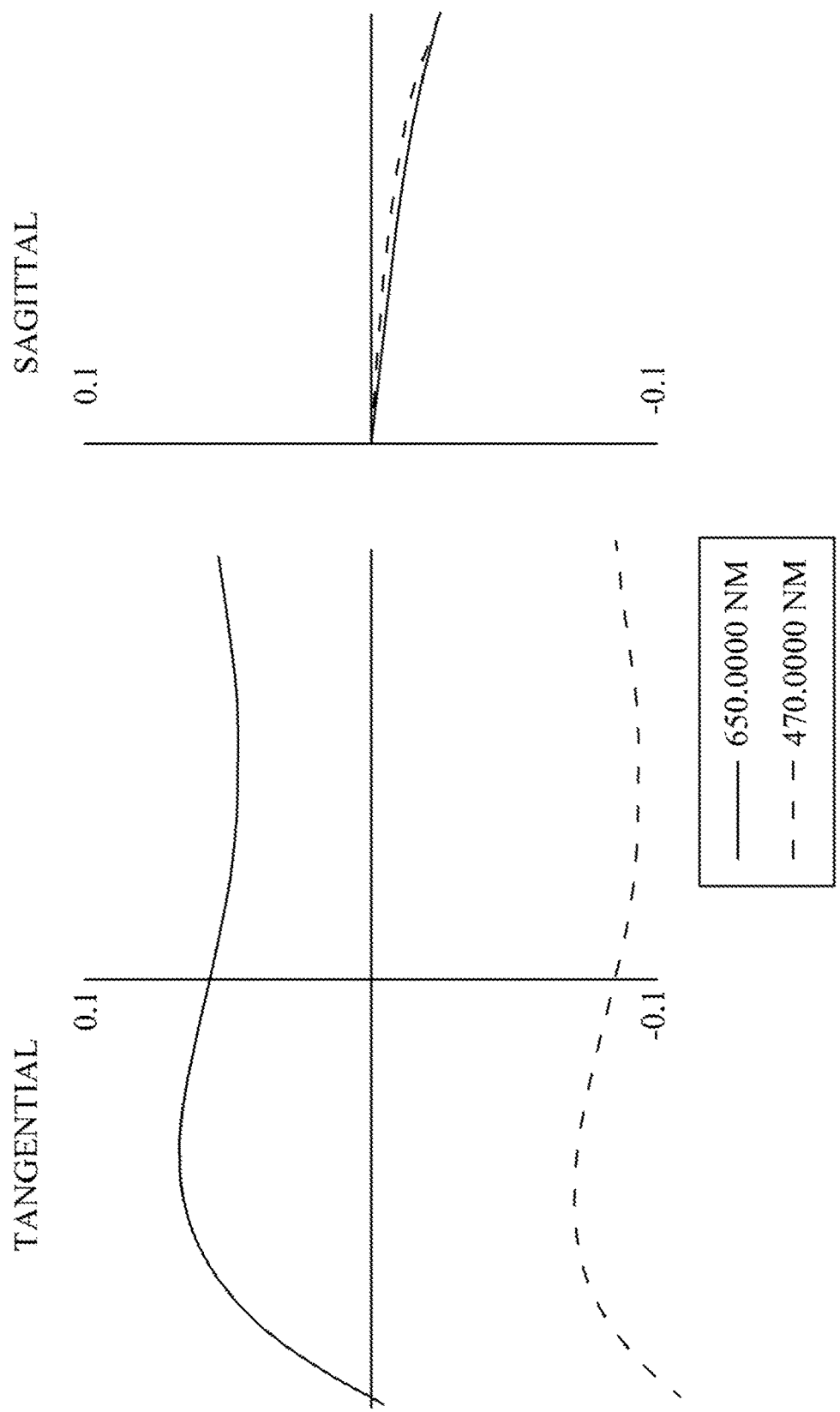

OPTICAL IMAGE CAPTURING SYSTEM

CROSS-REFERENCE TO RELATED APPLICATION

This application claims priority from Taiwan Patent Application No. 106125173, filed on Jul. 26, 2017, in the Taiwan Intellectual Property Office, the content of which is hereby incorporated by reference in its entirety for all purposes.

BACKGROUND OF THE INVENTION

1. Field of the Invention

The present disclosure relates to an optical image capturing system, and more particularly is about a minimized optical image capturing system which can be applied to electronic products.

2. Description of the Related Art

In recent years, as the popularization of portable electronic devices with camera functionalities, it has elevated the demand for optical image capturing systems. The photosensitive element of ordinary optical system is commonly selected from charge coupled device (CCD) or complementary metal-oxide semiconductor sensor (CMOS Sensor). Besides, as the advancement in semiconductor devices manufacturing technology, the pixel size of the photosensitive element is gradually minimized, and the optical systems make a development about the high pixel area by degrees. Therefore, it increases daily the demand of the quality of the image.

Conventional optical systems of portable electronic devices usually adopt four lenses or five lenses structure as main structure. However, since the resolution of the portable electronic devices is continuously raising, and more end-users are demanding for cameras having large aperture, which is equipped with functionalities such as low light mode or night mode, the conventional optical image capturing systems may not be sufficient to meet those advanced photography requirements.

Therefore, it is an important issue about how to effectively increase the amount of light admitted into the optical image capturing system and further improve the image quality thereof.

SUMMARY OF THE INVENTION

The aspect of embodiment of the present disclosure directs to an optical image capturing system and an optical image capturing lens which are able to use combination of refractive powers, convex and concave surfaces of six-piece optical lenses (the convex or concave surface in the disclosure is the change of geometrical shape of an object side or an image side of each lens at different heights from an optical axis in principle) to increase the amount of light admitted into the optical image capturing system, and to improve quality of image formation, so that the optical image capturing system can be applied to the minimized electronic products.

Furthermore, in a certain application of optical imaging, there will be a need to conduct the image formation for the light of the visible wavelength and the infrared wavelength, for example, IP video surveillance camera. The IP video surveillance camera may need to be equipped with the Day & Night function. The main reason is that the visible light spectrum for human vision is in the wavelength range from 400 to 700 nm, but the image formed on the camera sensor includes infrared light, which is invisible to human eyes. Therefore, based on the circumstances, an IR cut filter removable (ICR) is placed in front of the camera lens of the IP video surveillance camera in order to increase the "fidelity" of the image, which can not only prevent the infrared light and color shift at the daytime, but also allow the infrared light coming at night to elevate luminance. Nevertheless, the elements of the ICR occupy a significant amount of space and are expensive, which impede to the design and manufacture of miniaturized surveillance cameras in the future.

One aspect of embodiment of the present disclosure directs to an optical image capturing system and an optical image capturing camera lens, which are able to utilize the combination of refractive powers, convex surfaces and concave surfaces of six lenses, as well as the selection of materials thereof, to reduce the difference between the imaging focal length of visible light and imaging focal length of infrared light, that is, to achieve the near "confocal" effect without the ICR.

The terms and their definition for the lens parameters in the embodiment of the present invention are shown as below for further reference.

The Lens Parameters Related to the Magnification of the Optical Image Capturing System and the Optical Image Capturing Camera Lens The optical image capturing system and the optical image capturing camera lens may be designed for the application of the biometric characteristics identification, for example, facial recognition. When the embodiment of the present invention is configured to capture image for facial recognition, the infrared light may be selected as the operation wavelength. At the same time a face of about 15 centimeters (cm) wide at a distance of 25-30 cm, at least 30 horizontal pixels can be formed in the horizontal direction of an photosensitive element (pixel size of 1.4 micrometers ($\mu$m)). The linear magnification of the infrared light of the image plane is LM, which meets the following conditions: LM=(30 horizontal pixels)*(1.4 $\mu$m pixel size)/(15 cm, width of the photographed object); LM$\geq$0.0003. When the visible light is adopted as the operation wavelength, for a face of about 15 cm wide at a distance of 25-30 cm, at least 50 horizontal pixels can be formed in the horizontal direction of a photosensitive element (pixel size of 1.4 micrometers ($\mu$m)).

The Lens Parameter Related to a Length or a Height

For visible light spectrum, the present invention may select the wavelength of 555 nm as the primary reference wavelength and the basis for the measurement of focus shift. For infrared spectrum (700 nm-1300 nm), the present invention may select the wavelength of 850 nm as the primary reference wavelength and the basis for the measurement of focus shift.

The optical image capturing system may have a first image plane and a second image plane. The first image plane which is perpendicular to the optical axis is an image plane specifically for the visible light, and the through focus modulation transfer rate (value of MTF) at the first spatial frequency has a maximum value at the central field of view of the first image plane; and the second image plane which is perpendicular to the optical axis is an image plane specifically for the infrared light, and the through focus modulation transfer rate (value of MTF) at the first spatial frequency has a maximum value at the central of field of view of the second image plane. The optical image capturing system may further have a first average image plane and a second average image plane. The first average image plane which is perpendicular to the optical axis is an image plane specifically for the visible light. And the first average image plane may be disposed at the average position of the defocusing positions, where the values of MTF of the visible light at the central field of view, 0.3 field of view, and the 0.7 field of view are at their respective maximum at the first spatial frequency. The second average image plane which is perpendicular to the optical axis is an image plane specifically for the infrared light. The second average image plane is disposed at the average position of the defocusing positions, where the values of MTF of the infrared light at the central field of view, 0.3 field of view, and the 0.7 field of view are at their respective maximum at the first spatial frequency.

The aforementioned first spatial frequency is set to be an half spatial frequency (half frequency) of a photosensitive element (sensor) used in the present invention. For example, the photosensitive element having the pixel size of 1.12 μm or less, of which the one eighth spatial frequency, the quarter spatial frequency, half spatial frequency (half frequency) and full spatial frequency (full frequency) in the characteristic diagram of modulation transfer function are respectively at least 55 cycles/mm, 110 cycles/mm, 220 cycles/mm and 440 cycles/mm. Rays of any field of view can be further divided into sagittal ray and tangential ray.

The focus shifts, where the through focus MTF values of the visible sagittal ray at the central field of view, 0.3 field of view, and 0.7 field of view of the optical image capturing system are at their respective maxima, are respectively expressed as VSFS0, VSFS3, and VSFS7 (unit of measurement: mm). The maximum values of the through focus MTF of the visible sagittal ray at the central field of view, 0.3 field of view, and 0.7 field of view are respectively expressed as VSMTF0, VSMTF3, and VSMTF7. The focus shifts, where the through focus MTF values of the visible tangential ray at the central field of view, 0.3 field of view, and 0.7 field of view of the optical image capturing system are at their respective maxima, are respectively expressed as VTFS0, VTFS3, and VTFS7 (unit of measurement: mm). The maximum values of the through focus MTF of the visible tangential ray at the central field of view, 0.3 field of view, and 0.7 field of view are respectively expressed as VTMTF0, VTMTF3, and VTMTF7. The average focus shift (position) of both the aforementioned focus shifts of the visible sagittal ray at three fields of view and focus shifts of the visible tangential ray at three fields of view is expressed as AVFS (unit of measurement: mm), which meets the absolute value |(VSFS0+VSFS3+VSFS7+VTFS0+VTFS3+VTFS7)/6|.

The focus shifts where the through focus MTF values of the infrared sagittal ray at the central field of view, 0.3 field of view, and 0.7 field of view of the optical image capturing system are at their respective maxima are respectively expressed as ISFS0, ISFS3, and ISFS7 (unit of measurement: mm). The average focus shift (position) of the aforementioned focus shifts of the infrared sagittal ray at three fields of view is expressed as AISFS (unit of measurement: mm). The maximum values of the through focus MTF of the infrared sagittal ray at the central field of view, 0.3 field of view, and 0.7 field of view are respectively expressed as ISMTF0, ISMTF3, and ISMTF7. The focus shifts where the through focus MTF values of the infrared tangential ray at the central field of view, 0.3 field of view, and 0.7 field of view of the optical image capturing system are at their respective maxima are respectively expressed as ITFS0, ITFS3, and ITFS7 (unit of measurement: mm). The average focus shift (position) of the aforementioned focus shifts of the infrared tangential ray at three fields of view is expressed as AITFS (unit of measurement: mm). The maximum values of the through focus MTF of the infrared tangential ray at the central field of view, 0.3 field of view, and 0.7 field of view are respectively expressed as ITMTF0, ITMTF3, and ITMTF7. The average focus shift (position) of both of the aforementioned focus shifts of the infrared sagittal ray at the three fields of view and focus shifts of the infrared tangential ray at the three fields of view is expressed as AIFS (unit of measurement: mm), which meets the absolute value of |(ISFS0+ISFS3+ISFS7+ITFS0+ITFS3+ITFS7)/6|.

The focus shift between the focal points of the visible light and the focal points of the infrared light at their central fields of view (RGB/IR) of the entire optical image capturing system (i.e. wavelength of 850 nm versus wavelength of 555 nm, unit of measurement: mm) is expressed as FS, which meets the absolute value |(VSFS0+VTFS0)/2−(ISFS0+ITFS0)/2|. The difference (focus shift) between the average focus shift of the visible light in the three fields of view and the average focus shift of the infrared light in the three fields of view (RGB/IR) of the entire optical image capturing system is expressed as AFS (i.e. wavelength of 850 nm versus wavelength of 555 nm, unit of measurement: mm), which meets the absolute value of |AIFS−AVFS|.

The maximum height of an image of the optical image capturing system is expressed as HOI. The height of the optical image capturing system is expressed as HOS. The distance from the object side of the first lens of the optical image capturing system to the image side of the sixth lens of the optical image capturing system is expressed as InTL. The distance from a fixed aperture (stop) of the optical image capturing system to the first image plane of the optical image capturing system is expressed as InS. The distance from the first lens of the optical image capturing system to the second lens of the optical image capturing system is expressed as In12 (example). The thickness of the first lens of the optical image capturing system on the optical axis is expressed as TP1 (example).

The Lens Parameter Related to the Material

A coefficient of dispersion of the first lens in the optical image capturing system is expressed as NA1 (example); a refractive index of the first lens is expressed as Nd1 (example).

The Lens Parameter Related to the View Angle

An angle of view is expressed as AF. Half angle of view is expressed as HAF. An angle of a chief ray is expressed as MRA.

The Lens Parameter Related to Exit/Entrance Pupil

An entrance pupil diameter of the optical image capturing system is expressed as HEP. The exit pupil of the optical image capturing system means that the ray at the aperture passes through the lens set which is on the rear side of the aperture and forms an image on the first image plane. The exit pupil diameter of the optical image capturing system is expressed as HXP. The maximum effective half diameter (EHD) of any surface of a single lens refers to a perpendicular height between the optical axis and an intersection point, where the incident ray at the maximum angle of view passing through the most marginal entrance pupil intersects with the surface of the lens. For example, the maximum effective half diameter of the object side of the first lens is expressed as EHD11. The maximum effective half diameter of the image side of the first lens is expressed as EHD 12. The maximum effective half diameter of the object side of the second lens is expressed as EHD21. The maximum effective half diameter of the image side of the second lens is expressed as EHD22. The maximum effective half diameters of any surfaces of other lens in the optical image capturing system are expressed in the similar way.

The Lens Parameter Related to the Arc Length of the Lens Shape and the Outline of Surface The length of the maximum effective half diameter outline curve at any surface of a single lens refers to an arc length of a curve, which starts from a starting point which is an intersection point on the surface of the lens crossing the optical axis of the optical image capturing system, travels along the outline of the surface and ends at the ending point which is the maximum effective half diameter position of the surface, and this arc length is expressed as ARS. For example, the length of the maximum effective half diameter outline curve of the object side of the first lens is expressed as ARS11. The length of the maximum effective half diameter outline curve of the image side of the first lens is expressed as ARS12. The length of the maximum effective half diameter outline curve of the object side of the second lens is expressed as ARS21. The length of the maximum effective half diameter outline curve of the image side of the second lens is expressed as ARS22. The lengths of the maximum effective half diameter outline curve of any surface of other lens in the optical image capturing system are expressed in the similar way.

The length of ½ entrance pupil diameter (HEP) outline curve of any surface of a single lens refers to an arc length of curve, which starts from a starting point which is an intersection point on the surface of the lens crossing the optical axis of the optical image capturing system, travels along the outline of the surface of the lens and ends at a coordinate point on the surface where the vertical height from the optical axis to the coordinate point is equivalent to ½ entrance pupil diameter; and the arc length is expressed as ARE. For example, the length of the ½ entrance pupil diameter (HEP) outline curve of the object side of the first lens is expressed as ARE11. The length of the ½ entrance pupil diameter (HEP) outline curve of the image side of the first lens is expressed as ARE12. The length of the ½ entrance pupil diameter (HEP) outline curve of the object side of the second lens is expressed as ARE21. The length of the ½ entrance pupil diameter (HEP) outline curve of the image side of the second lens is expressed as ARE22. The lengths of the ½ entrance pupil diameter (HEP) outline curve of any surfaces of the other lens in the optical image capturing system are expressed in the similar way.

The Lens Parameter Related to the Surface Depth of the Lens

The distance paralleling an optical axis, which is measured from the intersection point where the object side of the sixth lens crosses the optical axis to the terminal point of the maximum effective half diameter outline curve on the object side of the sixth lens is expressed as InRS61 (depth of the EHD). The distance paralleling an optical axis, which is measured from the intersection point where the image side of the sixth lens crosses the optical axis to the terminal point of the maximum effective half diameter outline curve on the image side of the sixth lens is expressed as InRS62 (depth of the EHD). The depths of the EHD (sinkage values) on the object side or the image side of other lens are expressed in similar way.

The Lens Parameter Related to the Shape of the Lens

The critical point C is a point which is tangential to the tangential plane and perpendicular to the optical axis on the specific surface of the lens except that an intersection point which crosses the optical axis on the specific surface of the lens. In addition to the description above, the perpendicular distance between the critical point C51 on the object side of the fifth lens and the optical axis is HVT51 (example). The perpendicular distance between a critical point C52 on the image side of the fifth lens and the optical axis is HVT52 (example). The perpendicular distance between the critical point C61 on the object side of the sixth lens and the optical axis is HVT61 (example). The perpendicular distance between a critical point C62 on the image side of the sixth lens and the optical axis is HVT62 (example). The perpendicular distances between the critical point on the image side or the object side of other lens and the optical axis are expressed in similar way.

The inflection point on the object side of the sixth lens that is nearest to the optical axis is expressed as IF611, and the sinkage value of that inflection point IF611 is expressed as SGI611 (example). That is, the sinkage value SGI611 is a horizontal distance paralleling the optical axis, which is measured from the intersection point crossing the optical axis on the object side of the sixth lens to the inflection point nearest to the optical axis on the object side of the sixth lens. The perpendicular distance between the inflection point IF611 and the optical axis is HIF611 (example). The inflection point on the image side of the sixth lens that is nearest to the optical axis is expressed as IF621, and the sinkage value of that inflection point IF621 is expressed as SGI621 (example). That is, the sinkage value SGI621 is a horizontal distance paralleling the optical axis, which is measured from the intersection point crossing the optical axis on the image side of the sixth lens to the inflection point nearest to the optical axis on the image side of the sixth lens. The perpendicular distance between the inflection point IF621 and the optical axis is HIF621 (example).

The inflection point on the object side of the sixth lens that is second nearest to the optical axis is expressed as IF612, and the sinkage value of that inflection point IF612 is expressed as SGI612 (example). That is, the sinkage value SGI612 is a horizontal distance paralleling the optical axis, which is measured from the intersection point crossing the optical axis on the object side of the sixth lens to the inflection point second nearest to the optical axis on the object side of the sixth lens. The perpendicular distance between the inflection point IF612 and the optical axis is HIF612 (example). The inflection point on the image side of the sixth lens that is second nearest to the optical axis is expressed as IF622, and the sinkage value of that inflection point IF622 is expressed as SGI622 (example). That is, the sinkage value SGI622 is a horizontal distance paralleling the optical axis, which is measured from the intersection point crossing the optical axis on the image side of the sixth lens to the inflection point second nearest to the optical axis on the image side of the sixth lens. The perpendicular distance between the inflection point IF622 and the optical axis is HIF622 (example).

The inflection point on the object side of the sixth lens that is third nearest to the optical axis is expressed as IF613, and the sinkage value of that inflection point IF613 is expressed as SGI613 (example). The sinkage value SGI613 is a horizontal distance paralleling the optical axis, which is measured from the intersection point crossing the optical axis on the object side of the sixth lens to the inflection point third nearest to the optical axis on the object side of the sixth lens. The perpendicular distance between the inflection point IF613 and the optical axis is HIF613 (example). The inflection point on the image side of the sixth lens that is third nearest to the optical axis is expressed as IF623, and the sinkage value of that inflection point IF623 is expressed as SGI623 (example). That is, the sinkage value SGI623 is a horizontal distance paralleling the optical axis, which is measured from the intersection point crossing the optical axis on the image side of the sixth lens to the inflection point third nearest to the optical axis on the image side of the sixth lens. The perpendicular distance between the inflection point IF623 and the optical axis is HIF623 (example).

The inflection point on the object side of the sixth lens that is fourth nearest to the optical axis is expressed as IF614, and the sinkage value of the inflection point IF614 is expressed as SGI614 (example). That is, the sinkage value SGI614 is a horizontal distance paralleling the optical axis, which is measured from the intersection point crossing the optical axis on the object side of the sixth lens to the inflection point fourth nearest to the optical axis on the object side of the sixth lens. The perpendicular distance between the inflection point IF614 and the optical axis is HIF614 (example). The inflection point on the image side of the sixth lens that is fourth nearest to the optical axis is expressed as IF624, and the sinkage value of that inflection point IF624 is expressed as SGI624 (example). That is, the sinkage value SGI624 is a horizontal distance paralleling the optical axis, which is measured from the intersection point crossing the optical axis on the image side of the sixth lens to the inflection point fourth nearest to the optical axis on the image side of the sixth lens. The perpendicular distance between the inflection point IF624 and the optical axis is HIF624 (example).

The inflection points on the object side or the image side of the other lens and the perpendicular distances between them and the optical axis, or the sinkage values thereof are expressed in the similar way described above.

The Lens Parameter Related to the Aberration

Optical distortion for image formation in the optical image capturing system is expressed as ODT. TV distortion for image formation in the optical image capturing system is expressed as TDT. Furthermore, the degree of aberration offset within the range of 50% to 100% field of view of the formed image can be further illustrated. The offset of the spherical aberration is expressed as DFS. The offset of the coma aberration is expressed as DFC.

The transverse aberration of the margin of the aperture is expressed as STA and evaluates the performance of the specific optical image capturing system. The transverse aberration at any field of view can be calculated by utilizing the tangential fan and the sagittal fan. Specifically, the transverse aberration at the longest operation wavelength (for instance, the wavelength is 650 nm) and the shortest operation wavelength (for instance, the wavelength is 470 nm) respectively passing through the margin of the aperture is calculated to act for the standard of the performance. The aforementioned coordinate direction of the tangential fan can be further divided into the positive direction (the upper ray) and the negative direction (the lower ray). The transverse aberration at the longest operation wavelength passing through the margin of the aperture defines the distance difference between the image position at the specific field of view where the longest operation wavelength passes through the margin of the aperture and strikes on the image plane and the image position at the specific field of view where the chief ray of the reference wavelength (for instance, the wavelength is 555 nm) strikes on the first image plane. The transverse aberration at the shortest operation wavelength passing through the margin of the aperture defines the distance difference between the image position at the specific field of view where the shortest operation wavelength passes through the margin of the aperture and strikes on the image plane and the image position at the specific field of view where the chief ray of the reference wavelength (for instance, the wavelength is 555 nm) strikes on the image plane. To evaluates the performance of the specific optical image capturing system, we can utilize that the transverse aberration at the 0.7 field of view (i.e., the 0.7 height of an image HOI) where the longest operation wavelength passes through the margin of the aperture and strikes on the first image plane and the transverse aberration at the 0.7 field of view (i.e., the 0.7 height of an image HOI) where, the shortest operation wavelength passes through the margin of the aperture and strikes on the first image plane (i.e., the 0.7 height of an image HOI) both are less than 200 μm as a way of the examination. Even further, the way of the examination can be that the transverse aberration at the 0.7 field of view where the longest operation wavelength passes through the margin of the aperture and strikes on the first image plane and the transverse aberration at the 0.7 field of view where the shortest operation wavelength passes through the margin of the aperture and strikes on the first image plane are both less than 100 μm.

There is a maximum image height HOI of the optical image capturing system on the first image plane which is vertical to the optical axis. A lateral aberration of the longest operation wavelength of visible light of a positive tangential fan of the optical image capturing system passing through the margin of the entrance pupil and projecting onto the first image plane by 0.7 HOI is expressed as PLTA, and a lateral aberration of the shortest operation wavelength of visible light of the positive tangential fan of the optical image capturing system passing through the margin of the entrance pupil and projecting onto the first image plane by 0.7 HOI is expressed as PSTA. A lateral aberration of the longest operation wavelength of visible light of a negative tangential fan of the optical image capturing system passing through the margin of the entrance pupil and projecting onto the first image plane by 0.7 HOI is expressed as NLTA, and a lateral aberration of the shortest operation wavelength of visible light of a negative tangential fan of the optical image capturing system passing through the margin of the entrance pupil and projecting onto the first image plane by 0.7 HOI is expressed as NSTA. A lateral aberration of the longest operation wavelength of visible light of a sagittal fan of the optical image capturing system passing through the margin of the entrance pupil and projecting onto the first image plane by 0.7 HOI is expressed as SLTA, and a lateral aberration of the shortest operation wavelength of visible light of the sagittal fan of the optical image capturing system passing through the margin of the entrance pupil and projecting onto the first image plane by 0.7 HOI is expressed as SSTA.

The present invention provides the optical image capturing system. The object side or the image side of the sixth lens may be provided with the inflection point which can adjust each angle of view striking the sixth lens and conduct amendment for the optical distortion and TV distortion. Besides, the surface of the sixth lens may be provided with the function of the preferable adjustment about the optical path so as to elevate the quality of the image.

An optical image capturing system is provided in accordance with the present invention. In the order from an object side to an image side, the optical image capturing system includes a first lens, a second lens, a third lens, a fourth lens, a fifth lens, a sixth lens, a first image plane and a second image plane. The first image plane is an image plane specifically for visible light and perpendicular to an optical axis and a through focus modulation transfer rate (value of MTF) of central field of view of the first image plane has a maximum value at a first spatial frequency; the second image plane is an image plane specifically for infrared light and perpendicular to the optical axis and the through focus modulation transfer rate (value of MTF) of central field of view of the second image plane has a maximum value at the first spatial frequency. All of the first lens to the fifth lens have refractive power. The focal lengths of the six lenses are respectively f1, f2, f3, f4, f5 and f6. A focal length of the optical image capturing system is f. An entrance pupil diameter of the optical image capturing system is HEP. There is a distance HOS on the optical axis from an object side of the first lens to the first image plane. A half maximum angle of view of the optical image capturing system is HAF. The optical image capturing system has a maximum image height HOI perpendicular to the optical axis on the first image plane. A distance on the optical axis between the first image plane and the second image plane is FS. And the optical image capturing system meets the following condition: 1.0≤f/HEP≤10.0, 0 deg<HAF≤150 deg, |FS|≤60 μm and 1≤HOS/HOI≤15.

Another optical image capturing system is further provided in accordance with the present invention. In the order from an object side to an image side, the optical image capturing system includes a first lens, a second lens, a third lens, a fourth lens, a fifth lens, a sixth lens, a first image plane, and a second image plane. The first image plane is an image plane specifically for visible light and perpendicular to an optical axis and a through focus modulation transfer rate (value of MTF) of central field of view of the first image plane has a maximum value at a first spatial frequency; the second image plane is an image plane specifically for infrared light and perpendicular to the optical axis and the through focus modulation transfer rate (value of MTF) of central field of view of the second image plane has a maximum value at the first spatial frequency. The first lens has refractive power and the object side of the first lens near the optical axis can be convex surface. The second lens has refractive power. The third lens has refractive power. The fourth lens has refractive power. The fifth lens has refractive power. The sixth lens has refractive power. The optical image capturing system has a maximum image height HOI perpendicular to the optical axis on the first image plane. There is at least one lens which is made of the glass material among the first lens to the sixth lens. There is at least one lens having positive refractive power among the first lens to the sixth lens. The focal lengths of the six lenses are respectively f1, f2, f3, f4, f5 and f6. A focal length of the optical image capturing system is f. An entrance pupil diameter of the optical image capturing system is HEP. There is a distance HOS on the optical axis from an object side of the first lens to the first image plane. A half maximum angle of view of the optical image capturing system is HAF. The optical image capturing system has a maximum image height HOI perpendicular to the optical axis on the first image plane. A distance on the optical axis between the first image plane and the second image plane is FS. The point on the any surface of any one of the six lenses which crosses the optical axis is a starting point, a length of an outline curve from the starting point to a coordinate point of vertical height with the distance between the optical axis and the half entrance pupil diameter on the surface along an outline of the surface is ARE. The optical image capturing system meets the following condition: 1≤f/HEP≤10; 0 deg<HAF≤150 deg; |FS|≤30 μm; 1≤2(ARE/HEP)≤2.0 and 1≤HOS/HOI≤15.

Yet another optical image capturing system is further provided in accordance with the present invention. In the order from an object side to an image side, the optical image capturing system includes a first lens, a second lens a third lens, a fourth lens, a first average image plane, and a second average image plane. The first average image plane is an image plane specifically for visible light and perpendicular to an optical axis and the first average image plane is disposed at the average position of the defocusing positions, where through focus modulation transfer rates (values of MTF) of the visible light at central field of view, 0.3 field of view, and 0.7 field of view of the optical image capturing, system are respectively at corresponding maximum value at a first spatial frequency; the second average image plane is an image plane specifically for infrared light and perpendicular to the optical axis, and the second average image plane is disposed at the average position of the defocusing positions, where through focus modulation transfer rates (values of MTF) of the infrared light at central field of view, 0.3 field of view, and 0.7 field of view of the optical image capturing system are at their respective maximum value at the first spatial frequency. The optical image capturing system has six lenses with refractive powers. The optical image capturing system has a maximum image height HOI on the first average image plane that is perpendicular to the optical axis. There is at least one lens made of the glass material among the first lens to the sixth lens. The first lens has refractive power. The second lens has refractive power. The third lens has refractive power. The fourth lens has refractive power. The fifth lens has refractive power. The sixth lens has refractive power. The focal lengths of the six lenses are respectively f1, f2, f3, f4, f5 and f6. A focal length of the optical image capturing system is f. An entrance pupil diameter of the optical image capturing system is HEP. There is a distance HOS on the optical axis from an object side of the first lens to the first average image plane. A half maximum angle of view of the optical image capturing system is HAF. The optical image capturing system has a maximum image height HOI perpendicular to the optical axis on the first average image plane. The point on the any surface of any one of the six len which crosses the optical axis is a starting point, and a length of an outline curve from the starting point to a coordinate point of vertical height with a distance between the optical axis and the half entrance pupil diameter on the surface along an outline of the surface is ARE. A distance on the optical axis between the first average image plane and the second average image plane is AFS. The following condition are satisfied: 1≤f/HEP≤10; 0 deg<HAF≤150 deg; |AFS|≤30 μm; 1≤2(ARE/HEP)≤2.0 and 1≤HOS/HOI≤15.

The length of outline curve of any surface of a single lens in the range of the maximum effective half diameter influences the ability of the surface aberration correction and the optical path difference at each field of view. The length of outline curve is longer that can elevate the ability of the surface aberration correction, but it increases difficulty in the production. Therefore, the length of outline curve of any surface of a single lens must be controlled in the range of the maximum effective half diameter. Specifically, the ratio (ARS/TP) of the length of outline curve of the surface in the range of the maximum effective half diameter (ARS) to the thickness of the lens to which surface belongs on the optical axis (TP) must be controlled. For example, the length of the outline curve of the maximum effective half diameter position of the object side of the first lens is expressed as ARS11, and the thickness of the first lens on the optical axis is TP1, and the ratio between both of them is ARS11/TP1. The length of the outline curve of the maximum effective half diameter position of the image side of the first lens is expressed as ARS12, and the ratio between ARS12 and TP1 is ARS12/TP1. The length of the outline curve of the maximum effective half diameter position of the object side of the second lens is expressed as ARS21, and the thickness of the second lens on the optical axis is TP2, and the ratio between ARS21 and TP2 is ARS21/TP2. The length of the outline curve of the maximum effective half diameter position of the image side of the second lens is expressed as ARS22, and the ratio between ARS22 and TP2 is ARS22/TP2. The ratio of the lengths of the outline curve of the maximum effective half diameter position of any surface of the other lens to the thicknesses of the lens to which surface belongs on the optical axis (TP) in the optical image capturing system are expressed in the similar way.

The length of outline curve of any surface of a single lens in the range of the height which is half entrance pupil diameter (HEP) especially influences the ability of the surface aberration correction at the common area of each field of view of ray and the optical path difference at each field of view. The length of outline curve is longer that can elevate the ability of the surface aberration correction, but it increases difficulty in the production at the same time. Therefore, the length of outline curve of any surface of a single lens must be controlled in the range of the height which is half entrance pupil diameter (HEP). Specifically, the ratio (ARE/TP) of the length of outline curve of the surface (ARE) in the range of the height which is half entrance pupil diameter (HEP) to the thickness of the lens to which surface belongs on the optical axis (TP) must be controlled. For example, the length of outline curve of the height which is half entrance pupil diameter (HEP) of the object side of the first lens is expressed as ARE11, and the thickness of the first lens on the optical axis is TP1, and the ratio between ARE11 and TP1 is ARE11/TP1. The length of outline curve of the height which is half entrance pupil diameter (HEP) of the image side of the first lens is expressed as ARE12, and the thickness of the first lens on the optical axis is TP1, and the ratio between ARE12 and TP1 is ARE12/TP1. The length of outline curve of the height which is half entrance pupil diameter (HEP) of the object side of the first lens is expressed as ARE21, and the thickness of the second lens on the optical axis is TP2, and the ratio between ARE21 and TP2 is ARE21/TP2. The length of outline curve of the height which is half entrance pupil diameter (HEP) of the image side of the second lens is expressed as ARE22, and the thickness of the second lens on the optical axis is TP2, and the ratio between ARE22 and TP2 is ARE22/TP2. The ratio of the length of outline curve of the height which is half entrance pupil diameter (HEP) of the surface of the other lens to the thickness of the lens to which surface belongs on the optical axis in the optical image capturing system are expressed in the similar way.

The height of optical system (HOS) may be reduced to achieve the minimization of the optical image capturing system when the absolute value of f1 is larger than f6 (|f1|>|f6|).

When |f2|+|f3|+|f4|+|f5| and |f1|+|f6| meet the aforementioned conditions, at least one lens among the second lens to the fifth lens may have a weak positive refractive power or a weak negative refractive power. The weak refractive power indicates that an absolute value of the focal length of a specific lens is greater than 10. When at least one lens among the second lens to the fifth has the weak positive refractive power, the positive refractive power of the first lens can be shared by it, such that the unnecessary aberration will not appear too early. On the contrary, when at least one lens among the second lens to the fifth lens has the weak negative refractive power, the aberration of the optical image capturing system can be slightly corrected.

Besides, the sixth lens may have negative refractive power, and the image side thereof may be a concave surface. With this configuration, it is beneficial to shorten the back focal length of the optical image capturing system and the system may be minimized. Moreover, at least one surface of the sixth lens may possess at least one inflection point, which is capable of effectively reducing the incident angle of the off-axis rays, thereby further correcting the off-axis aberration.

BRIEF DESCRIPTION OF THE DRAWINGS

The detailed structure, operating principle and effects of the present invention will now be described in more details hereinafter with reference to the accompanying drawings that show various embodiments of the present invention as follows.

FIG. 3C shows the sagittal fan and the tangential fan of the optical image capturing system and the lateral aberration diagram of the longest operation wavelength and the shortest operation wavelength passing thorough the margin of the aperture at 0.7 field of view according to the third embodiment of the present invention.

DESCRIPTION OF THE PREFERRED EMBODIMENTS

Figure 1A:
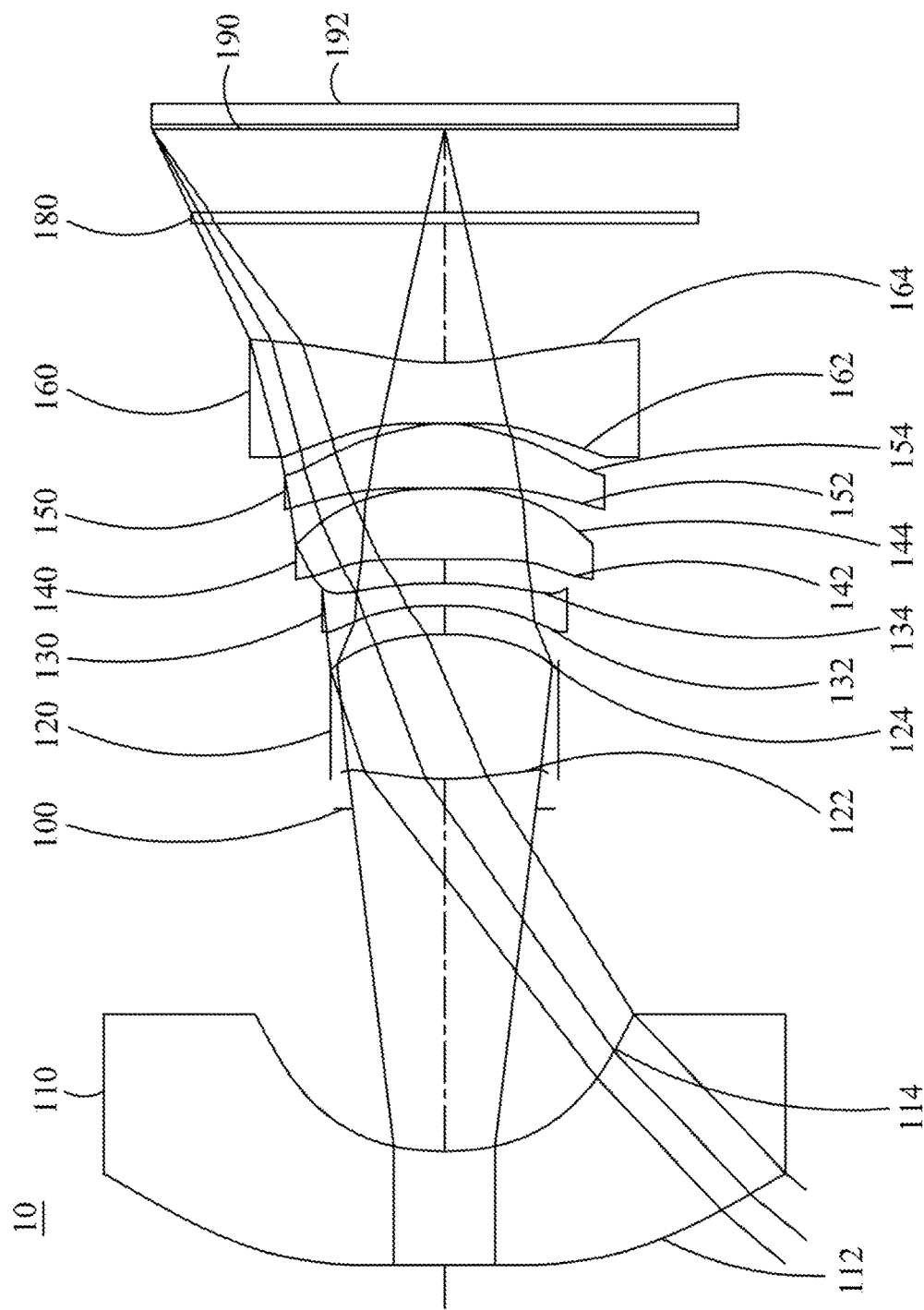
FIG. 1A is a schematic view of the optical image capturing system according to the first embodiment of the present invention.

The present invention has been described with some preferred embodiments thereof and it is understood that many changes and modifications in the described embodiments can be carried out without departing from the scope and the spirit of the invention that is intended to be limited only by the appended claims.

An optical image capturing system is provided, which includes, in the order from an object side to an image side, a first lens, a second lens, a third lens, a fourth lens, a fifth lens, and a sixth lens, a first image plane and a second image plane. The optical image capturing system may further include an image sensing device, which is disposed on the first image plane.

The optical image capturing system may use three sets of operation wavelengths, which are respectively 486.1 nm, 587.5 nm and 656.2 nm, and wherein 587.5 nm is served as the primary reference wavelength and the primary reference wavelength to obtain technical features of the optical image capturing system. The optical image capturing system may also use five sets of wavelengths which are respectively 470 nm, 510 nm, 555 nm, 610 nm and 650 nm, and wherein 555 nm is served as the primary reference wavelength and a reference wavelength to obtain technical features of the optical system.

The ratio of the focal length f of the optical image capturing system to a focal length fp of each lens with positive refractive power is PPR. The ratio of the focal length f of the optical image capturing system to a focal length fn of each lens with negative refractive power is NPR. The sum of the PPR of all lenses with positive refractive powers is ΣPPR. The sum of the NPR of all lenses with negative refractive powers is ΣNPR. The total refractive power and the total length of the optical image capturing system can be controlled easily when meeting following conditions: 0.5≤ΣPPR/|ΣNPR|≤15. Preferably, the following condition may be satisfied: 1≤ΣPPR/|ΣNPR|≤3.0.

The optical image capturing system may further include an image sensing device which is disposed on the first image plane. Half of a diagonal of the effective detection field of the image sensing device (image formation height or the maximum image height of the optical image capturing system) is HOI. The distance on the optical axis from the object side of the first lens to the first image plane is HOS. The following conditions are satisfied: HOS/HOI≤50 and $0.5 \leq HOS/f \leq 150$. Preferably, the following conditions may be satisfied: $1 \leq HOS/HOI \leq 40$ and $1 \leq HOS/f \leq 140$. Hereby, this configuration can keep the miniaturization of the optical image capturing system to collocate with light and thin portable electronic product.

In addition, in the optical image capturing system of the present invention, according to different requirements, at least one aperture may be arranged to reduce stray light and help elevate the imaging quality.

In the optical image capturing system of the disclosure, the aperture may be a front or middle aperture. Wherein, the front aperture is the aperture between a photographed object and the first lens while the middle aperture is the aperture between the first lens and the first image plane. In the case that the aperture is the front aperture, it can make the optical image capturing system generate a longer distance between the exit pupil and the first image plane, such that the optical image capturing system can accommodate more optical elements and the efficiency of the image sensing device in receiving image can be increased; In the case that the aperture is the middle aperture, it can expand the angle of view of the optical image capturing system, such that the optical image capturing system has an advantage of the wide angle camera lens. The distance from the foregoing aperture to the image plane is InS. The following condition is satisfied: $0.1 \leq InS/HOS \leq 1.1$. Therefore, the optical image capturing system can be kept miniaturized with the feature of wide angle of view.

In the optical image capturing system of the present invention, the distance from the object side of the first lens to the image side of the sixth lens is InTL. The sum of thicknesses of all lenses with refractive power on the optical axis is $\Sigma TP$. The following condition is satisfied: $0.1 \leq \Sigma TP/InTL \leq 0.9$. Therefore, this configuration can keep the contrast ratio of the optical image capturing system and the yield rate about manufacturing lens at the same time, and provide the proper back focal length so as to accommodate other elements.

The curvature radius of the object side of the first lens is R1. The curvature radius of the image side of the first lens is R2. The following condition is satisfied: $0.001 \leq |R1/R2| \leq 25$. Therefore, the first lens may have a suitable magnitude of positive refractive power, so as to prevent the spherical aberration from increasing too fast. Preferably, the following condition may be satisfied: $0.01 \leq |R1/R2| < 12$.

The curvature radius of the object side of the sixth lens is R11. The curvature radius of the image side of the sixth lens is R12. The following condition is satisfied: $-7 < (R11-R12)/(R11+R12) < 50$. Hereby, this configuration is beneficial to correct of the astigmatism generated by the optical image capturing system.

The distance between the first lens and the second lens on the optical axis is IN12. The following condition is satisfied: $IN12/f \leq 60$. Thereby, this configuration is helpful to improve the chromatic aberration of the lens in order to elevate their performance.

The distance between the fifth lens and the sixth lens on the optical axis is IN56. The following condition is satisfied: $IN56/f \leq 3.0$. Therefore, this configuration is helpful to improve the chromatic aberration of the lens in order to elevate their performance.

The thicknesses of the first lens and the second lens on the optical axis are TP1 and TP2, respectively. The following condition is satisfied: $0.1 \leq (TP1+IN12)/TP2 \leq 10$. Therefore, this configuration is helpful to control the sensitivity of the optical image capturing system and improve its performance.

The thicknesses of the fifth lens and the sixth lens on the optical axis are TP5 and TP6, respectively, and the distance between the foregoing two lens on the optical axis is IN56. The following condition is met: $0.1 \leq (TP6+IN56)/TP5 \leq 15$. Therefore, this configuration is helpful to control the sensitivity of the optical image capturing system, and decrease the total height of the optical image capturing system.

The thicknesses of the second lens, third lens and fourth lens on the optical axis are TP2, TP3 and TP4, respectively. The distance between the second lens and the third lens on the optical axis is IN23. The distance between the third lens and the fourth lens on the optical axis is IN34. The distance between the fourth lens and the fifth lens on the optical axis is IN45. The distance between the object side of the first lens and the image side of the sixth lens is InTL. The following condition is met: $0.1 \leq TP4/(IN34+TP4+IN45) < 1$. Therefore, this configuration is helpful to slightly correct the aberration of the propagating process of the incident light layer by layer, and decrease the total height of the optical image capturing system.

In the optical image capturing system of the present invention, a perpendicular distance between a critical point C61 on the object side of the sixth lens and the optical axis is HVT61. A perpendicular distance between a critical point C62 on the image side of the sixth lens and the optical axis is HVT62. A distance in parallel with the optical axis from an intersection point on the object side of the sixth lens crossing the optical axis to the critical point C61 is SGC61. A distance in parallel with the optical axis from an intersection point on the image side of the sixth lens crossing the optical axis to the critical point C62 is SGC62. The following conditions may be met: $0 \text{ mm} \leq HVT61 \leq 3 \text{ mm}$; $0 \text{ mm} < HVT62 \leq 6 \text{ mm}$; $0 \leq HVT61/HVT62$; $0 \text{ mm} \leq |SGC61| \leq 0.5 \text{ mm}$; $0 \text{ mm} < |SGC62| \leq 2 \text{ mm}$, and $0 < |SGC62|/(|SGC62|+TP6) \leq 0.9$. Therefore, this configuration is helpful to correct the off-axis aberration effectively.

The optical image capturing system of the present invention meets the following condition: $0.2 \leq HVT62/HOI \leq 0.9$. Preferably, the following condition may be met: $0.3 \leq HVT62/HOI \leq 0.8$. Therefore, this configuration is helpful to correct the aberration of surrounding field of view for the optical image capturing system.

The optical image capturing system of the present invention meets the following condition: $0 \leq HVT62/HOS \leq 0.5$. Preferably, the following condition may be met: $0.2 \leq HVT62/HOS \leq 0.45$. Therefore, this configuration is helpful to correct the aberration of surrounding field of view for the optical image capturing system.

In the optical image capturing system of the present invention, the distance in parallel with an optical axis from an inflection point on the object side of the sixth lens that is nearest to the optical axis to an intersection point on the object side of the sixth lens crossing the optical axis is expressed as SGI611. The distance in parallel with an optical axis from an inflection point on the image side of the sixth lens that is nearest to the optical axis to an intersection point on the image side of the sixth lens crossing the optical axis is expressed as SGI621. The following conditions are met: $0 < SGI611/(SGI611+TP6) \leq 0.9$ and $0 < SGI621/(SGI621+TP6) \leq 0.9$. Preferably, the following conditions may be met: $0.1 \leq SGI611/(SGI611+TP6) \leq 0.6$ and $0.1 \leq SGI621/(SGI621+TP6) \leq 0.6$.

The distance in parallel with the optical axis from the inflection point on the object side of the sixth lens that is second nearest to the optical axis to an intersection point on the object side of the sixth lens crossing the optical axis is expressed as SGI612. The distance in parallel with an optical axis from an inflection point on the image side of the sixth lens that is second nearest to the optical axis to an intersection point on the image side of the sixth lens crossing the optical axis is expressed as SGI622. The following conditions are met: 0<SGI612/(SGI612+TP6)≤0.9 and 0<SGI622/(SGI622+TP6)≤0.9. Preferably, the following conditions may be satisfied: 0.1≤SGI612/(SGI612+TP6)≤0.6 and 0.1≤SGI622/(SGI622+TP6)≤0.6.

The perpendicular distance between the inflection point on the object side of the sixth lens that is the nearest to the optical axis and the optical axis is expressed as HIF611. The perpendicular distance between an intersection point on the image side of the sixth lens crossing the optical axis and an inflection point on the image side of the sixth lens that is the nearest to the optical axis is expressed as HIF621. The following conditions are met: 0.001 mm≤|HIF611|≤5 mm and 0.001 mm≤|HIF621|≤5 mm. Preferably, the following conditions may be satisfied: 0.1 mm≤|HIF611|≤3.5 mm and 1.5 mm≤|HIF621|≤3.5 mm.

The perpendicular distance between the inflection point on the object side of the sixth lens that is second nearest to the optical axis and the optical axis is expressed as HIF612. The perpendicular distance between an intersection point on the image side of the sixth lens crossing the optical axis and an inflection point on the image side of the sixth lens that is second nearest to the optical axis is expressed as HIF622. The following conditions are met: 0.001 mm≤|HIF612|≤5 mm and 0.001 mm≤|HIF622|≤5 mm. Preferably, the following conditions may be satisfied: 0.1 mm≤|HIF622|≤3.5 mm and 0.1 mm≤|HIF612|≤3.5 mm.

The perpendicular distance between the inflection point on the object side of the sixth lens that is third nearest to the optical axis and the optical axis is expressed as HIF613. The perpendicular distance between an intersection point on the image side of the sixth lens crossing the optical axis and an inflection point on the image side of the sixth lens that is third nearest to the optical axis is expressed as HIF623. The following conditions are met: 0.001 mm≤|HIF613|≤5 mm and 0.001 mm≤|HIF623|≤5 mm. Preferably, the following conditions may be satisfied: 0.1 mm≤|HIF623|≤3.5 mm and 0.1 mm≤|HIF613|≤3.5 mm.

The perpendicular distance between the inflection point on the object side of the sixth lens that is fourth nearest to the optical axis and the optical axis is expressed as HIF614. The perpendicular distance between an intersection point on the image side of the sixth lens crossing the optical axis and an inflection point on the image side of the sixth lens that is fourth nearest to the optical axis is expressed as HIF624. The following conditions are met: 0.001 mm≤|HIF614|≤5 mm and 0.001 mm≤|HIF624|≤5 mm. Preferably, the following conditions may be satisfied: 0.1 mm≤|HIF624|≤3.5 mm and 0.1 mm≤|HIF614|≤3.5 mm.

In one embodiment of the optical image capturing system of the present invention, it can be helpful to correct the chromatic aberration of the optical image capturing system by arranging the lens with high coefficient of dispersion and low coefficient of dispersion in a staggered manner.

The equation for the aforementioned aspheric surface is:

$$z = ch^2/[1+[1-(k+1)c^2h^2]^{0.5}] + A_4 h^4 + A_6 h^6 + A_8 h^8 + A_{10} h^{10} + A_{12} h^{12} + A_{14} h^{14} + A_{16} h^{16} + A_{18} h^{18} + A_{20} h^{20} + \ldots \quad (1),$$

where z is a position value of the position along the optical axis and at the height h which refers to the surface apex; k is the cone coefficient, c is the reciprocal of curvature radius, and $A_4$, $A_6$, $A_8$, $A_{10}$, $A_{12}$, $A_{14}$, $A_{16}$, $A_{18}$, and $A_{20}$ are high order aspheric coefficients.

In the optical image capturing system provided by the present invention, the lens may be made of glass or plastic material. If the lens is made of the plastic material, it can reduce the cost of manufacturing as well as the weight of the lens effectively. If lens is made of glass, it can control the heat effect and increase the design space of the configuration of the lens with refractive powers in the optical image capturing system. Besides, the object side and the image side of the first lens through sixth lens may be aspheric, which can gain more control variables and even reduce the number of the used lens in contrast to traditional glass lens in addition to the use of reducing the aberration. Thus, the total height of the optical image capturing system can be reduced effectively.

Furthermore, in the optical image capturing system provided by the present disclosure, when the surface of lens is a convex surface, the surface of that lens is a convex surface in the vicinity of the optical axis basically. When the surface of lens is a concave surface, the surface of that lens is a concave surface in the vicinity of the optical axis basically.

The optical image capturing system of the present invention can be applied to the optical image capturing system with automatic focus based on the demand and have the characters of the good aberration correction and the good quality of image. Thereby, the optical image capturing system expands the application aspect.

The optical image capturing system of the present invention can further include a driving module based on the demand. The driving module may be coupled with the lens and enable the movement of the lens. The foregoing driving module may be the voice coil motor (VCM) which is applied to move the lens to focus, or may be the optical image stabilization (OIS) which is applied to reduce the frequency which lead to the out focus due to the vibration of the camera lens in the process of the shooting.

In the optical image capturing system of the present invention, at least one lens among the first lens, second lens, third lens, fourth lens, fifth lens and sixth lens may further be a light filtering element for light with wavelength of less than 500 nm based on the requirements. The light filtering element may be made by coating film on at least one surface of that lens with certain filtering function, or forming that lens with material that can filter light with short wavelength.

The first image plane of the optical image capturing system of the present invention may be a plane or a curved surface based on the design requirement. When the first image plane is a curved surface (e.g. a spherical surface with curvature radius), it is helpful to decrease the required incident angle to focus rays on the first image plane. In addition to the aid of the miniaturization of the length of the optical image capturing system (TTL), this configuration is helpful to elevate the relative illumination at the same time.

According to the foregoing implementation method, the specific embodiments with figures are presented in detail as below.

The First Embodiment

Figure 1B:
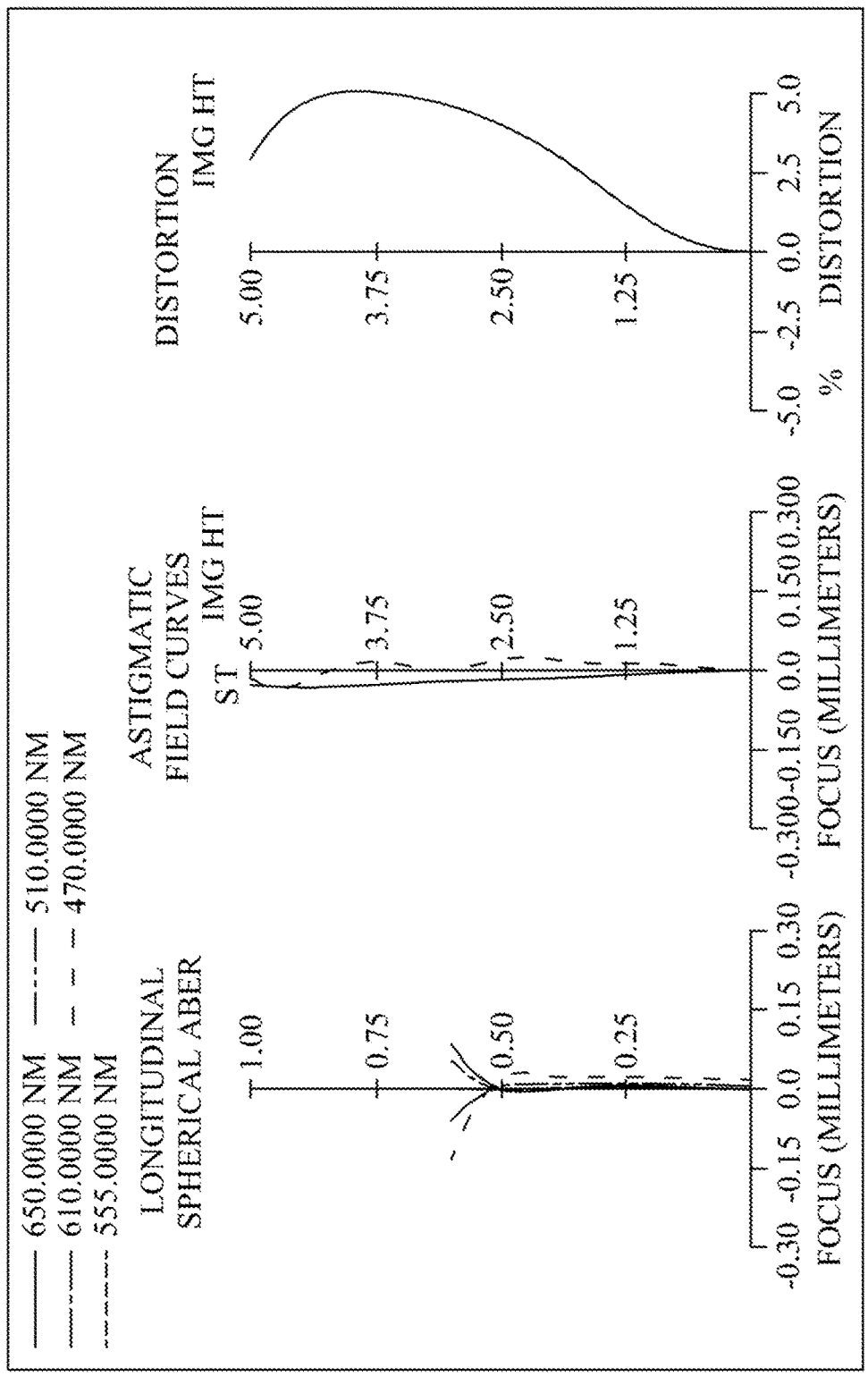
FIG. 1B shows the longitudinal spherical aberration curves, astigmatic field curves, and optical distortion curve of the optical image capturing system in the order from left to right according to the first embodiment of the present invention.
Figure 1C:
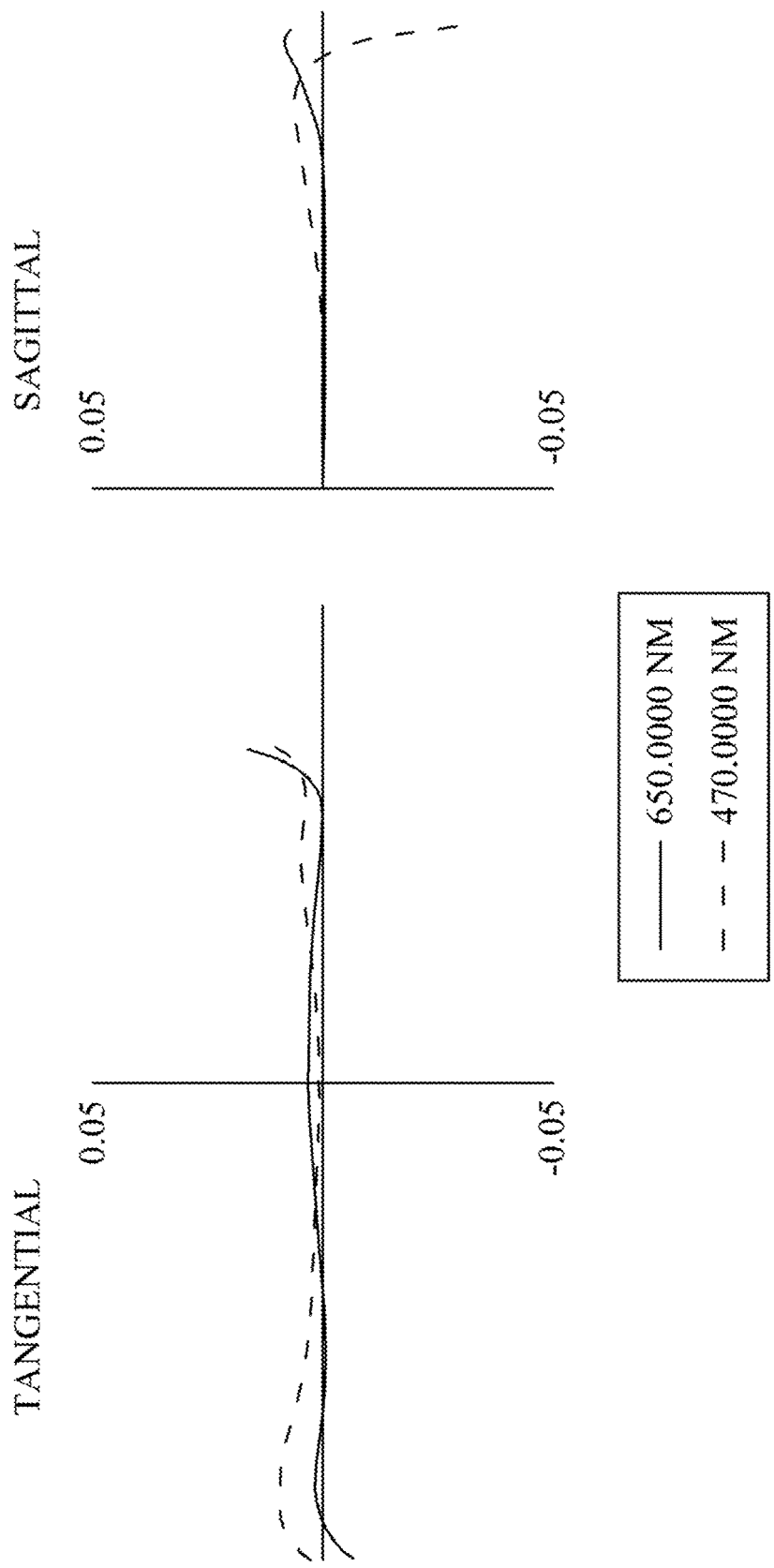
FIG. 1C shows the sagittal fan and the tangential fan of the optical image capturing system and the lateral aberration diagram of the longest operation wavelength and the shortest operation wavelength passing thorough the margin of the aperture at 0.7 field of view according to the first embodiment of the present invention.
Figure 1D:
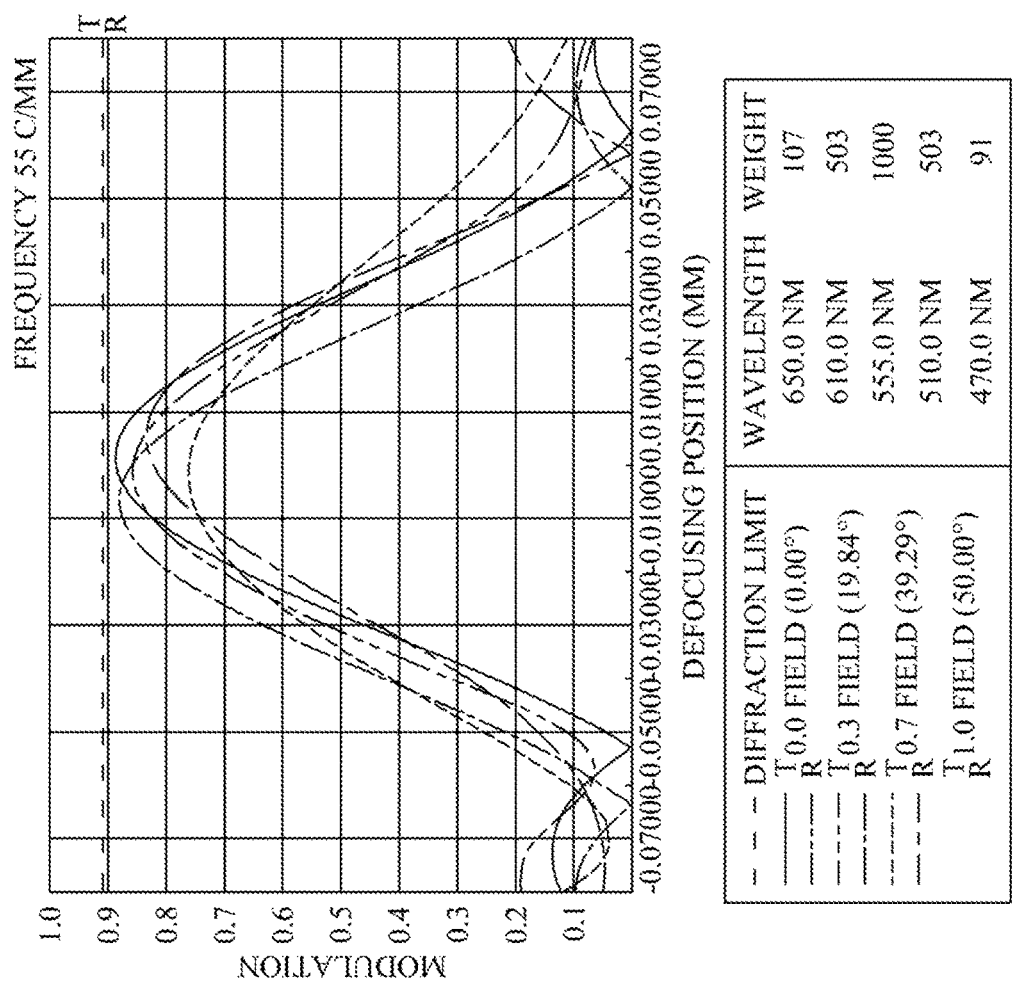
FIG. 1D is a diagram showing the through focus MTF values (Through Focus MTF) of the visible light spectrum at the central field of view, 0.3 field of view, and 0.7 field of view of the first embodiment of the present invention.
Figure 1E:
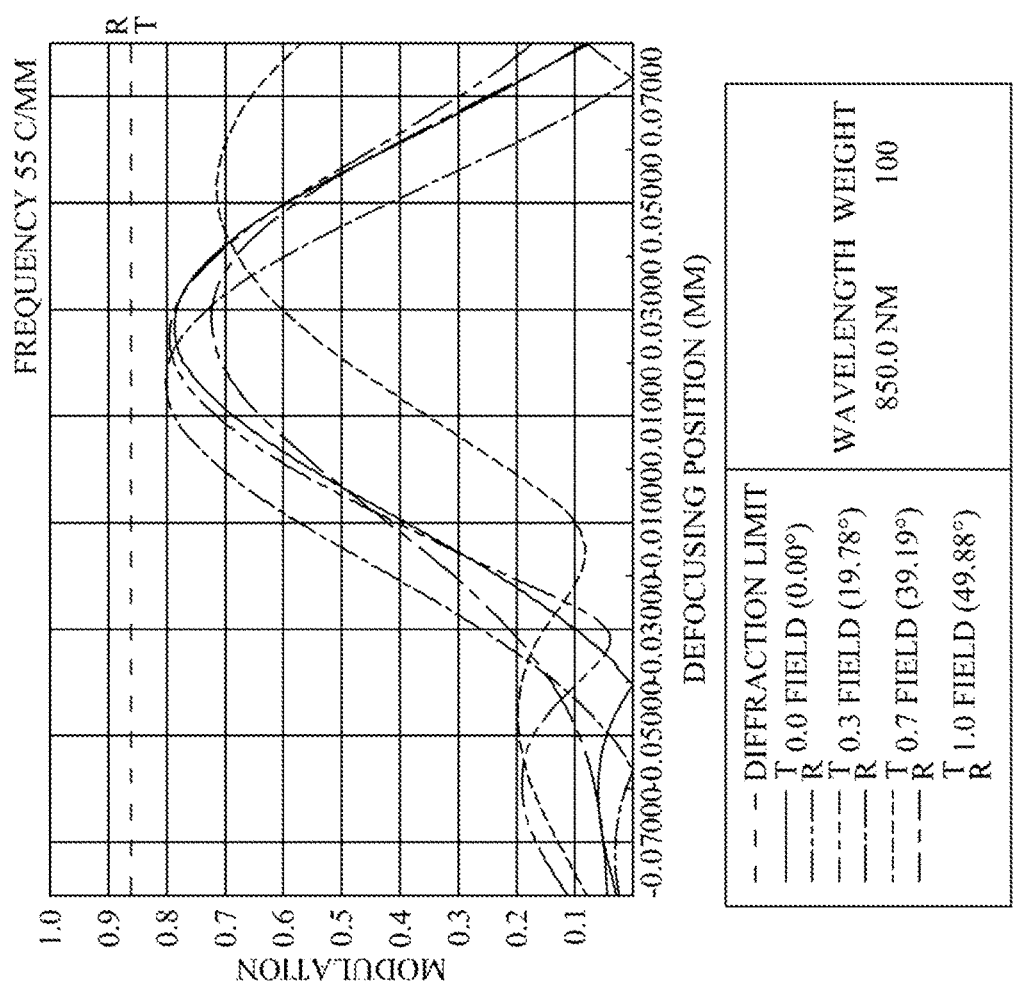
FIG. 1E is a diagram showing the through focus MTF values of the infrared light spectrum at the central field of view, 0.3 field of view, and 0.7 field of view of the first embodiment of the present invention.

Please refer to FIG. 1A and FIG. 1B, wherein FIG. 1A is a schematic view of the optical image capturing system according to the first embodiment of the present invention and FIG. 1B shows the longitudinal spherical aberration curves, astigmatic field curves, and optical distortion curve of the optical image capturing system in the order from left to right according to the first embodiment of the present invention. FIG. 1C shows the sagittal fan and the tangential fan of the optical image capturing system and the lateral aberration diagram of the longest operation wavelength and the shortest operation wavelength passing thorough the margin of the aperture at 0.7 field of view according to the first embodiment of the present invention. FIG. 1D is a diagram showing the through focus MTF values (Through Focus MTF) of the visible light spectrum at the central field of view, 0.3 field of view, and 0.7 field of view of the first embodiment of the present invention. FIG. 1E is a diagram showing the through focus MTF values of the infrared light spectrum at the central field of view, 0.3 field of view, and 0.7 field of view of the first embodiment of the present invention.

As shown in FIG. 1A, in the order from the object side to the image side, the optical image capturing system includes a first lens 110, an aperture 100, a second lens 120, a third lens 130, a fourth lens 140, a fifth lens 150, a sixth lens 160, an IR-bandstop filter 180, a first image plane 190, and an image sensing device 192. In the first embodiment of the present invention, the rays of any field of view can be further divided into sagittal ray and tangential ray, and the spatial frequency of 55 cycles/mm serves as the benchmark for evaluating the focus shifts and the MTF values. The first embodiment of the present invention takes 850 nm as the infrared light wavelength.

The first lens 110 has negative refractive power and it is made of plastic material. An object side 112 of the first lens 110 is a concave surface and an image side 114 of the first lens 110 is a concave surface, and the object side 112 and the image side 114 of the first lens are both aspheric. The object side 112 of the first lens has two inflection points. The length of the maximum effective half diameter outline curve of the object side of the first lens is expressed as ARS11. The length of the maximum effective half diameter outline curve, of the image side of the first lens is expressed as ARS12. The length of the ½ entrance pupil diameter (HEP) outline curve of the object side of the first lens is expressed as ARE11. The length of the ½ entrance pupil diameter (HEP) outline curve of the image side of the first lens is expressed as ARE12. The thickness of the first lens on the optical axis is TP1. The maximum effective half diameter of the object side of the first lens is expressed as EHD11. The maximum effective half diameter of the image side of the first lens is expressed as EHD12.

The distance paralleling an optical axis from an inflection point on the object side of the first lens which is nearest to the optical axis to an intersection point on the object side of the first lens crossing the optical axis is expressed as SGI111. The distance paralleling an optical axis from an inflection point on the image side of the first lens which is nearest to the optical axis to an intersection point on the image side of the first lens crossing the optical axis is expressed as SGI121. The following conditions are meet: SGI111=−0.0031 mm, and |SGI111|/(|SGI111|+TP1)=0.0016.

The horizontal distance in parallel with an optical axis from an inflection point on the object side of the first lens that is second nearest to the optical axis to an intersection point on the object side of the first lens crossing the optical axis is expressed as SGI112. The horizontal distance in parallel with an optical axis from an inflection point on the image side of the first lens that is second nearest to the optical axis to an intersection point on the image side of the first lens crossing the optical axis is expressed as SGI122. The following conditions are met: SGI112=1.3178 mm and |SGI112|/(|SGI112|+TP1)=0.4052.

The perpendicular distance from the inflection point on the object side of the first lens that is nearest to the optical axis to an optical axis is expressed as HIF111. The perpendicular distance from the inflection point on the image side of the first lens that is nearest to the optical axis to an intersection point on the image side of the first lens crossing the optical axis is expressed as HIF121. The following conditions are met: HIF111=0.5557 mm and HIF111/HOI=0.1111.

The perpendicular distance from the inflection point on the object side of the first lens that is second nearest to the optical axis to an optical axis is expressed as HIF112. The perpendicular distance from the inflection point on the image side of the first lens that is second nearest to the optical axis to an intersection point on the image side of the first lens crossing the optical axis is expressed as HIF122. The following conditions are met: HIF112=5.3732 mm and HIF112/HOI=1.0746.

The second lens 120 has positive refractive power and it is made of plastic material. An object side 122 of the second lens 120 is a convex surface and an image side 124 of the second lens 120 is a convex surface, and the object side 122 and the image side 124 of the second lens are both aspheric. The object side 122 of the second lens 120 has one inflection point. The length of the maximum effective half diameter outline curve of the object side of the second lens is expressed as ARS21. The length of the maximum effective half diameter outline curve of the image side of the second lens is expressed as ARS22. The length of the ½ entrance pupil diameter (HEP) outline curve of the object side of the second lens is expressed as ARE21. The length of the ½ entrance pupil diameter (HEP) outline curve of the image side of the second lens is expressed as ARE22. The thickness of the second lens on the optical axis is TP2. The maximum effective half diameter of the object side of the second lens is expressed as EHD21. The maximum effective half diameter of the image side of the second lens is expressed as EHD22.

The distance in parallel with an optical axis from an inflection point on the object side of the second lens that is nearest to the optical axis to the intersection point on the object side of the second lens crossing the optical axis is expressed as SGI211. The distance in parallel with an optical axis from an inflection point on the image side of the second lens that is nearest to the optical axis to the intersection point on the image side of the second lens crossing the optical axis is expressed as SGI221. The following conditions are met: SGI211=0.1069 mm, |SGI211|/(|SGI211|+TP2)=0.0412, SGI221=0 mm and |SGI221|/(|SGI221|+TP2)=0.

The perpendicular distance from the inflection point on the object side of the second lens that is nearest to the optical axis to the optical axis is expressed as HIF211. The perpendicular distance from the inflection point on the image side of the second lens that is nearest to the optical axis to the intersection point on the image side of the second lens crossing the optical axis is expressed as HIF221. The following conditions are met: HIF211=1.1264 mm, HIF211/HOI=0.2253, HIF221=0 mm and HIF221/HOI=0.

The third lens 130 has negative refractive power and it is made of plastic material. An object side 132 of the third lens 130 is a concave surface and an image side 134 of the third lens 130 is a convex surface, and the object side 132 and the image side 134 of the third lens are both aspheric. The object side 132 and the image side 134 of the third lens both have one inflection point. The length of the maximum effective half diameter outline curve of the object side of the third lens is expressed as ARS31. The length of the maximum effective half diameter outline curve of the image side of the third lens is expressed as ARS32. The length of the ½ entrance pupil diameter (HEP) outline curve of the object side of the third lens is expressed as ARE31. The length of the ½ entrance pupil diameter (HEP) outline curve of the image side of the third lens is expressed as ARE32. The thickness of the third lens on the optical axis is TP3. The maximum effective half diameter of the object side of the third lens is expressed as EHD31. The maximum effective half diameter of the image side of the third lens is expressed as EHD32.

The distance in parallel with an optical axis from an inflection point on the object side of the third lens that is nearest to the optical axis to an intersection point on the image side of the third lens crossing the optical axis is expressed as SGI311. The distance in parallel with an optical axis from an inflection point on the image side of the third lens that is nearest to the optical axis to an intersection point on the image side of the third lens crossing the optical axis is expressed as SGI321. The following conditions are met: SGI311=−0.3041 mm, |SGI311|/(|SGI311|+TP3)=0.4445, SGI321=−0.1172 mm and |SGI321|/(|SGI321|+TP3)=0.2357.

The perpendicular distance between the inflection point on the object side of the third lens that is nearest to the optical axis and the optical axis is expressed as HIF311. The perpendicular distance between the inflection point on the image side of the third lens that is nearest to the optical axis and the intersection point on the image side of the third lens crossing the optical axis is expressed as HIF321. The following conditions are met: HIF311=1.5907 mm, HIF311/HOI=0.3181, HIF321=1.3380 mm and HIF321/HOI=0.2676.

The fourth lens 140 has positive refractive power and it is made of plastic material. An object side 142 of the fourth lens 140 is a convex surface and an image side 144 of the fourth lens 140 is a concave surface, and the object side 142 and the image side 144 of the fourth lens 140 are both aspheric. The object side 142 of the fourth lens 140 has two inflection points, and the image side 144 of the fourth lens 140 has one inflection point. The length of the maximum effective half diameter outline curve of the object side of the fourth lens is expressed as ARS41. The length of the maximum effective half diameter outline curve of the image side of the fourth lens is expressed as ARS42. The length of the ½ entrance pupil diameter (HEP) outline curve of the object side of the fourth lens is expressed as ARE41. The length of the ½ entrance pupil diameter (HEP) outline curve of the image side of the fourth lens is expressed as ARE42. The thickness of the fourth lens on the optical axis is TP4. The maximum effective half diameter of the object side of the fourth lens is expressed as EHD41. The maximum effective half diameter of the image side of the fourth lens is expressed as EHD42.

The distance in parallel with the optical axis from an inflection point on the object side of the fourth lens that is nearest to the optical axis to the intersection point on the object side of the fourth lens crossing the optical axis is expressed as SGI411. The distance in parallel with the optical axis from an inflection point on the image side of the fourth lens that is nearest to the optical axis to the intersection point on the image side of the fourth lens crossing the optical axis is expressed as SGI421. The following conditions are met: SGI411=0.0070 mm, |SGI411|/(|SGI411|+TP4)=0.0056, SGI421=0.0006 mm and |SGI421|/(|SGI421|+TP4)=0.0005.

The distance in parallel with an optical axis from an inflection point on the object side of the fourth lens that is second nearest to the optical axis to the intersection point on the object side of the fourth lens crossing the optical axis is expressed as SGI412. The distance in parallel with an optical axis from an inflection point on the image side of the fourth lens that is second nearest to the optical axis to the intersection point on the image side of the fourth lens crossing the optical axis is expressed as SGI422. The following conditions are met: SGI412=−0.2078 mm and |SGI412|/(|SGI412|+TP4)=0.1439.

The perpendicular distance between the inflection point on the object side of the fourth lens that is nearest to the optical axis and the optical axis is expressed as HIF411. The perpendicular distance on the optical axis between the inflection point on the image side of the fourth lens that is nearest to the optical axis and the intersection point on the image side of the fourth lens crossing the optical axis is expressed as HIF421. The following conditions are met: HIF411=0.4706 mm, HIF411/HOI=0.0941, HIF421=0.1721 mm and HIF421/HOI=0.0344.

The perpendicular distance between the inflection point on the object side of the fourth lens that is second nearest to the optical axis and the optical axis is expressed as HIF412. The perpendicular distance between the inflection point on the image side of the fourth lens that is second nearest to the optical axis and the intersection point on the image side of the fourth lens crossing the optical axis is expressed as HIF422. The following conditions are met: HIF412=2.0421 mm and HIF412/HOI=0.4084.

The fifth lens 150 has positive refractive power and it is made of plastic material. An object side 152 of the fifth lens 150 is a convex surface and an image side 154 of the fifth lens 150 is a convex surface, and the object side 152 and the image side 154 of the fifth lens 150 are both aspheric. The object side 152 of the fifth lens 150 has two inflection points and the image side 154 of the fifth lens 150 has one inflection point. The length of the maximum effective half diameter outline curve of the object side of the fifth lens is expressed as ARS51. The length of the maximum effective half diameter outline curve of the image side of the fifth lens is expressed as ARS52. The length of the ½ entrance pupil diameter (HEP) outline curve of the object side of the fifth lens is expressed as ARE51. The length of the ½ entrance pupil diameter (HEP) outline curve of the image side of the fifth lens is expressed as ARE52. The thickness of the fifth lens on the optical axis is TP5. The maximum effective half diameter of the object side of the fifth lens is expressed as EHD51. The maximum effective half diameter of the image side of the fifth lens is expressed as EHD52.

The distance in parallel with an optical axis from an inflection point on the object side of the fifth lens that is nearest to the optical axis to the intersection point on the object side of the fifth lens crossing the optical axis is expressed as SGI511. The distance in parallel with an optical axis from an inflection point on the image side of the fifth lens that is nearest to the optical axis to the intersection point on the image side of the fifth lens crossing the optical axis is expressed as SGI521. The following conditions are met: SGI511=0.00364 mm, |SGI511|/(|SGI511|+TP5)=0.00338, SGI521=−0.63365 mm and |SGI521|/(|SGI521|+TP5)=0.37154.

The distance in parallel with an optical axis from an inflection point on the object side of the fifth lens that is second nearest to the optical axis to the intersection point on the object side of the fifth lens crossing the optical axis is expressed as SGI512. The distance in parallel with an optical axis from an inflection point on the image side of the fifth lens that is second nearest to the optical axis to the intersection point on the image side of the fifth lens crossing the optical axis is expressed as SGI522. The following conditions are met: SGI512=−0.32032 mm and |SGI512|/(|SGI512|+TP5)=0.23009.

The distance in parallel with an optical axis from an inflection point on the object side of the fifth lens that is third nearest to the optical axis to the intersection point on the object side of the fifth lens crossing the optical axis is expressed as SGI513. The distance in parallel with an optical axis from an inflection point on the image side of the fifth lens that is third nearest to the optical axis to the intersection point on the image side of the fifth lens crossing the optical axis is expressed as SGI523. The following conditions are met: SGI513=0 mm, |SGI513|/(|SGI513|+TP5)=0, SGI523=0 mm and |SGI523|/(SGI523|+TP5)=0.

The distance in parallel with an optical axis from an inflection point on the object side of the fifth lens that is fourth nearest to the optical axis to the intersection point on the object side of the fifth lens crossing the optical axis is expressed as SGI514. The distance in parallel with an optical axis from an inflection point on the image side of the fifth lens that is fourth nearest to the optical axis to the intersection point on the image side of the fifth lens crossing the optical axis is expressed as SGI524. The following conditions are meet: SGI514=0 mm, |SGI514|/(|SGI514|+TP5)=0, SGI524=0 mm and |SGI524|/(|SGI524|+TP5)=0.

The perpendicular distance between the optical axis and the inflection point on the object side of the fifth lens that is nearest to the optical axis is expressed as HIF511. The perpendicular distance between the optical axis and the inflection point on the image side of the fifth lens that is nearest to the optical axis is expressed as HIF521. The following conditions are met: HIF511=0.28212 mm, HIF511/HOI=0.05642, HIF521=2.13850 mm and HIF521/HOI=0.42770.

The perpendicular distance between the inflection point on the object side of the fifth lens that is second nearest to the optical axis and the optical axis is expressed as HIF512. The perpendicular distance between the inflection point on the image side of the fifth lens that is second nearest to the optical axis and the optical axis is expressed as HIF522. The following conditions are met: HIF512=2.51384 mm and HIF512/HOI=0.50277.

The perpendicular distance between the inflection point on the object side of the fifth lens that is third nearest to the optical axis and the optical axis is expressed as HIF513. The perpendicular distance between the inflection point on the image side of the fifth lens that is third nearest to the optical axis and the optical axis is expressed as HIF523. The following conditions are met: HIF513=0 mm, HIF513/HOI=0, HIF523=0 mm and HIF523/HOI=0.

The perpendicular distance between the inflection point on the object side of the fifth lens that is fourth nearest to the optical axis and the optical axis is expressed as HIF514. The perpendicular distance between the inflection point on the image side of the fifth lens that is fourth nearest to the optical axis and the optical axis is expressed as HIF524. The following conditions are met: HIF514=0 mm, HIF514/HOI=0, HIF524=0 mm and HIF524/HOI=0.

The sixth lens 160 has negative refractive power and it is made of plastic material. An object side 162 of the sixth lens 160 is a concave surface and an image side 164 of the sixth lens 160 is a concave surface, and the object side 162 of the sixth lens 160 has two inflection points and the image side 164 of the sixth lens 160 has one inflection point. Therefore, the incident angle of each field of view on the sixth lens can be effectively adjusted and the spherical aberration can thus be improved. The length of the maximum effective half diameter outline curve of the object side of the sixth lens is expressed as ARS61. The length of the maximum effective half diameter outline curve of the image side of the sixth lens is expressed as ARS62. The length of the ½ entrance pupil diameter (HEP) outline curve of the object side of the sixth lens is expressed as ARE61. The length of the ½ entrance pupil diameter (HEP) outline curve of the image side of the sixth lens is expressed as ARE62. The thickness of the sixth lens on the optical axis is TP6. The maximum effective half diameter of the object side of the sixth lens is expressed as EHD61. The maximum effective half diameter of the image side of the sixth lens is expressed as EHD62.

The distance in parallel with an optical axis from an inflection point on the object side of the sixth lens that is nearest to the optical axis to the intersection point on the object side of the sixth lens crossing the optical axis is expressed as SGI611. The distance in parallel with an optical axis from an inflection point on the image side of the sixth lens that is nearest to the optical axis to the intersection point on the image side of the sixth lens crossing the optical axis is expressed as SGI621. The following conditions are meet: SGI611=−0.38558 mm, |SGI611|/(|SGI611|+TP6)=0.27212, SGI621=0.12386 mm and |SGI621|/(|SGI621|+TP6)=0.10722.

The distance in parallel with an optical axis from an inflection point on the object side of the sixth lens that is second nearest to the optical axis to an intersection point on the object side of the sixth lens crossing the optical axis is expressed as SGI612. The distance in parallel with an optical axis from an inflection point on the image side of the sixth lens that is second nearest to the optical axis to the intersection point on the image side of the sixth lens crossing the optical axis is expressed as SGI622. The following conditions are met: SGI612=−0.47400 mm, |SGI612|/(|SGI612|+TP6)=0.31488, SGI622=0 mm and |SGI622|/(|SGI622|+TP6)=0.

The perpendicular distance between the inflection point on the object side of the sixth lens that is nearest to the optical axis and the optical axis is expressed as HIF611. The perpendicular distance between the inflection point on the image side of the sixth lens that is nearest to the optical axis and the optical axis is expressed as HIF621. The following conditions are met: HIF611=2.24283 mm, HIF611/HOI=0.44857, HIF621=1.07376 mm and HIF621/HOI=0.21475.

The perpendicular distance between the inflection point on the object side of the sixth lens that is second nearest to the optical axis and the optical axis is expressed as HIF612. The perpendicular distance between the inflection point on the image side of the sixth lens that is second nearest to the optical axis and the optical axis is expressed as HIF622. The following conditions are met: HIF612=2.48895 mm and HIF612/HOI=0.49779.

The perpendicular distance between the inflection point on the object side of the sixth lens that is third nearest to the optical axis and the optical axis is expressed as HIF613. The perpendicular distance between the inflection point on the image side of the sixth lens that is third nearest to the optical axis and the optical axis is expressed HIF623. The following conditions are met: HIF613=0 mm, HIF613/HOI=0, HIF623=0 mm and HIF623/HOI=0.

The perpendicular distance between the inflection point on the object side of the sixth lens that is fourth nearest to the optical axis and the optical axis is expressed as HIF614. The perpendicular distance between the inflection point on the image side of the sixth lens that is fourth nearest to the optical axis and the optical axis is expressed as HIF624. The following conditions are met: HIF614=0 mm, HIF614/HOI=0, HIF624=0 mm and HIF624/HOI=0.

The IR-bandstop filter 180 is made of glass material. The IR-bandstop filter 180 is disposed between the sixth lens 160 and the first image plane 190, and it does not affect the focal length of the optical image capturing system.

In the optical image capturing system of the first embodiment, the focal length of the optical image capturing system is f, the entrance pupil diameter of the optical image capturing system is HEP, and a half maximum angle of view of the optical image capturing system is HAF. The detailed parameters are shown as below: f=4.075 mm, f/HEP=1.4, HAF=50.001° and tan(HAF)=1.1918.

In the optical image capturing system of the first embodiment, the focal length of the first lens 110 is f1 and the focal length of the sixth lens 160 is f6. The following conditions are met: f1=−7.828 mm, |f/f1|=0.52060, f6=−4.886 and |f1|>|f6|.

In the optical image capturing system of the first embodiment, focal lengths of the second lens 120 to the fifth lens 150 are f2, f3, f4 and f5, respectively. The following conditions are met: |f2|+|f3|+|f4|+|f5|=95.50815 mm, |f1|+|f6|=12.71352 mm and |f2|+|f3|+|f4|+|f5|>|f1|+|f6|.

The ratio of the focal length f of the optical image capturing system to the focal length fp of each of lens with positive refractive power is PPR. The ratio of the focal length f of the optical image capturing system to a focal length fn of each of lens with negative refractive power is NPR. In the optical image capturing system of the first embodiment, the sum of the PPR of all lenses with positive refractive power is ΣPPR=f/f2+f/f4+f/f5=1.63290. The sum of the NPR of all lenses with negative refractive powers is ΣNPR=|f/f1|+|f/f3|+|f/f6|=1.51305, ΣPPR/|ΣNPR|=1.07921. Simultaneously, the following conditions are also met: |f/f2|=0.69101, |f/f3|=0.15834, |f/f4|=0.06883, |f/f5|=0.87305 and |f/f6|=0.83412.

In the optical image capturing system of the first embodiment, the distance from the object side 112 of the first lens to the image side 164 of the sixth lens is InTL. The distance from the object side 112 of the first lens to the first image plane 190 is HOS. The distance from the aperture 100 to the first image plane 190 is InS. Half of a diagonal length of the effective detection field of the image sensing device 192 is HOI. The distance from the image side 164 of the sixth lens to the first image plane 190 is BFL. The following conditions are met: InTL+BFL=HOS, HOS=19.54120 mm, HOI=5.0 mm, HOS/HOI=3.90824, HOS/f=4.7952, InS=11.685 mm and InS/HOS=0.59794.

In the optical image capturing system of the first embodiment, a total thickness of all lenses with refractive power on the optical axis is ΣTP. The following conditions are met: ΣTP=8.13899 mm and ΣTP/InTL=0.52477. Hereby, this configuration can keep the contrast ratio of the optical image capturing system and the yield rate about manufacturing lens at the same time, and provide the proper back focal length so as to accommodate other elements.

In the optical image capturing system of the first embodiment, the curvature radius of the object side 112 of the first lens is R1. The curvature radius of the image side 114 of the first lens is R2. The following condition is met: |R1/R2|=8.99987. Hereby, the first lens has a suitable magnitude of positive refractive power, so as to prevent the longitudinal spherical aberration from increasing too fast.

In the optical image capturing system of the first embodiment, the curvature radius of the object side 162 of the sixth lens is R11. The curvature radius of the image side 164 of the sixth lens is R12. The following condition is met: (R11−R12)/(R11+R12)=1.27780. Hereby, this configuration is beneficial to correct the astigmatism generated by the optical image capturing system.

In the optical image capturing system of the first embodiment, the sum of focal lengths of all lenses with positive refractive power is ΣPP. The following conditions are met: ΣPP=f2+f4+f5=69.770 mm and f5/(f2+f4+f5)=0.067. Hereby, this configuration is helpful to distribute the positive refractive power of a single lens to other lens with positive refractive powers in an appropriate way, so as to suppress the generation of noticeable aberrations in the propagating process of the incident light in the optical system.

In the optical image capturing system of the first embodiment, the sum of focal lengths of all lenses with negative refractive power is ΣNP. The following conditions are met: ΣNP=f1+f3+f6=−38.451 mm and f6/(f1+f3+f6)=0.127. Hereby, this configuration is helpful to distribute the sixth lens with negative refractive power to other lens with negative refractive powers in an appropriate way, so as to suppress the generation of noticeable aberrations in the propagating process of the incident light in the optical system.

In the optical image capturing system of the first embodiment, the distance between the first lens 110 and the second lens 120 on the optical axis is IN12. The following conditions are met: IN12=6.418 mm and IN12/f=1.57491. Therefore, this configuration is helpful to improve the chromatic aberration of the lens in order to elevate the performance of the optical image capturing system of the first embodiment.

In the optical image capturing system of the first embodiment, a distance between the fifth lens 150 and the sixth lens 160 on the optical axis is IN56. The following conditions are met: IN56=0.025 mm and IN56/f=0.00613. Therefore, this configuration is helpful to improve the chromatic aberration of the lens in order to elevate the performance of the optical image capturing system of the first embodiment.

In the optical image capturing system of the first embodiment, the thicknesses of the first lens 110 and the second lens 120 on the optical axis are TP1 and TP2, respectively. The following conditions are met: TP1=1.934 mm, TP2=2.486 mm and (TP1+IN12)/TP2=3.36005. Therefore, this configuration is helpful to control the sensitivity generated by the optical image capturing system and elevate the performance of the optical image capturing system of the first embodiment.

In the optical image capturing system of the first embodiment, the thicknesses of the fifth lens 150 and the sixth lens 160 on the optical axis are TP5 and TP6, respectively, and the distance between the aforementioned two lenses on the optical axis is IN56. The following conditions are met: TP5=1.072 mm, TP6=1.031 mm and (TP6+IN56)/TP5=0.98555. Therefore, this configuration is helpful to control the sensitivity generated by the optical image capturing system and reduce the total height of the optical image capturing system.

In the optical image capturing system of the first embodiment, the distance between the third lens 130 and the fourth lens 140 on the optical axis is IN34. The distance between the fourth lens 140 and the fifth lens 150 on the optical axis is IN45. The following conditions are met: IN34=0.401 mm, IN45=0.025 mm and TP4/(IN34+TP4+IN45)=0.74376. Therefore, this configuration is helpful to slightly correct the aberration of the propagating process of the incident light layer by layer and decrease the total height of the optical image capturing system.

In the optical image capturing system of the first embodiment, a distance in parallel with an optical axis from an intersection point on the object side 152 of the fifth lens crossing the optical axis to a maximum effective half diameter position on the object side 152 of the fifth lens is InRS51. The distance in parallel with an optical axis from an intersection point on the image side 154 of the fifth lens crossing the optical axis to a maximum effective half diameter position on the image side 154 of the fifth lens is InRS52. The thickness of the fifth lens 150 on the optical axis is TP5. The following conditions are met: InRS51=−0.34789 mm, InRS52=−0.88185 mm, |InRS51|/TP5=0.32458 and |InRS52|/TP5=0.82276. Hereby, this configuration is favorable to the manufacturing and forming of lens and keeps the miniaturization of the optical image capturing system effectively.

In the optical image capturing system of the first embodiment, the perpendicular distance between a critical point C51 on the object side 152 of the fifth lens and the optical axis is HVT51. The perpendicular distance between a critical point C52 on the image side 154 of the fifth lens and the optical axis is HVT52. The following conditions are met: HVT51=0.515349 mm and HVT52=0 mm.

In the optical image capturing system of the first embodiment, a distance in parallel with an optical axis from an intersection point on the object side 162 of the sixth lens crossing the optical axis to a maximum effective half diameter position on the object side 162 of the sixth lens is InRS61. A distance in parallel with an optical axis from an intersection point on the image side 164 of the sixth lens crossing the optical axis to a maximum effective half diameter position on the image side 164 of the sixth lens is InRS62. The thickness of the sixth lens 160 is TP6. The following conditions are met: InRS61=−0.58390 mm, InRS62=0.41976 mm, |InRS61|/TP6=0.56616 and |InRS62|/TP6=0.40700. Hereby, this configuration is favorable to the manufacturing and forming of lens and keeping the miniaturization of the optical image capturing system effectively.

In the optical image capturing system of the first embodiment, the perpendicular distance between a critical point C61 on the object side 162 of the sixth lens and the optical axis is HVT61. The perpendicular distance between a critical point C62 on the image side 164 of the sixth lens and the optical axis is HVT62. The following conditions are met: HVT61=0 mm and HVT62=0 mm.

In the optical image capturing system of the first embodiment, the following condition is met: HVT51/HOI=0.1031. Therefore, this configuration is helpful to correct the aberration of surrounding field of view of the optical image capturing system.

In the optical image capturing system of the first embodiment, the following condition is met: HVT51/HOS=0.02634. Therefore, this configuration is helpful to correct the aberration of surrounding field of view of the optical image capturing system.

In the optical image capturing system of the first embodiment, the second lens 120, the third lens 130 and the sixth lens 160 have negative refractive powers. The coefficient of dispersion of the second lens is NA2. The coefficient of dispersion of the third lens is NA3. The coefficient of dispersion of the sixth lens is NA6. The following condition is met: NA6/NA2≤1. Therefore, this configuration is helpful to correct the chromatic aberration of the optical image capturing system.

In the optical image capturing system of the first embodiment, TV distortion and optical distortion for image formation in the optical image capturing system are TDT and ODT, respectively. The following conditions are met: |TDT|=2.124% and |ODT|=5.076%.

In the first embodiment of the present invention, the rays of any field of view can be further divided into sagittal ray and tangential ray, and the spatial frequency of 55 cycles/mm serves as the benchmark for evaluating the focus shifts and the values of MTF. The focus shifts where the through focus MTF values of the visible sagittal ray at the central field of view, 0.3 field of view, and 0.7 field of view of the optical image capturing system are at their respective maxima are expressed as VSFS0, VSFS3, and VSFS7 (unit of measurement: mm), respectively. The values of VSFS0, VSFS3, and VSFS7 equal to 0.000 mm, −0.005 mm, and 0.005 mm, respectively. The maximum values of the through focus MTF of the visible sagittal ray at the central field of view, 0.3 field of view, and 0.7 field of view are expressed as VSMTF0, VSMTF3, and VSMTF7, respectively. The values of VSMTF0, VSMTF3, and VSMTF7 equal to 0.886, 0.880, and 0.834, respectively. The focus shifts where the through focus MTF values of the visible tangential ray at the central field of view, 0.3 field of view, and 0.7 field of view of the optical image capturing system are at their respective maxima are expressed as VTFS0, VTFS3, and VTFS7 (unit of measurement: mm), respectively. The values of VTFS0, VTFS3, and VTFS7 equal to 0.000 mm, 0.000 mm, and 0.000 mm, respectively. The maximum values of the through focus MTF of the visible tangential ray at the central field of view, 0.3 field of view, and 0.7 field of view are expressed as VTMTF0, VTMTF3, and VTMTF7, respectively. The values of VTMTF0, VTMTF3, and VTMTF7 equal to 0.886, 0.857, and 0.761, respectively. The average focus shift (position) of both the aforementioned focus shifts of the visible sagittal ray at three fields of view and the focus shifts of the visible tangential ray at three fields of view is expressed as AVFS (unit of measurement: mm), which meets the absolute value |(VSFS0+VSFS3+VSFS7+VTFS0+VTFS3+VTFS7)/6|=|0.000 mm|.

The focus shifts where the through focus MTF values of the infrared sagittal ray at the central field of view, 0.3 field of view, and 0.7 field of view of the optical image capturing system are at their respective maxima are expressed as ISFS0, ISFS3, and ISFS7 (unit of measurement: mm), respectively. The values of ISFS0, ISFS3, and ISFS7 equal to 0.025 mm, 0.015 mm, and 0.030 mm, respectively. The average focus shift (position) of the aforementioned focus shifts of the infrared sagittal ray at three fields of view is expressed as AISFS. The maximum values of the through focus MTF of the infrared sagittal ray at the central field of view, 0.3 field of view, and 0.7 field of view of the optical image capturing system are expressed as ISMTF0, ISMTF3, and ISMTF7, respectively. The values of ISMTF0, ISMTF3, and ISMTF7 equal to 0.787, 0.802, and 0.726, respectively. The focus shifts where the through focus MTF values of the infrared tangential ray at the central field of view, 0.3 field of view, and 0.7 field of view of the optical image capturing system are at their respective maxima are expressed as ITFS0, ITFS3, and ITFS7 (unit of measurement: mm), respectively. The values of ITFS0, ITFS3, and ITFS7 equal to 0.025, 0.025, and 0.050, respectively. The average focus shift (position) of the aforementioned focus shifts of the infrared tangential ray at three fields of view is expressed as AITFS (unit of measurement: mm). The maximum values of the through focus MTF of the infrared tangential ray at the central field of view, 0.3 field of view, and 0.7 field of view of the optical image capturing system are expressed as ITMTF0, ITMTF3, and ITMTF7, respectively. The values of ITMTF0, ITMTF3, and ITMTF7 equal to 0.787, 0.797, and 0.715, respectively. The average focus shift (position) of both of the aforementioned focus shifts of the infrared sagittal ray at the three fields of view and focus shifts of the infrared tangential ray at the three fields of view is expressed as AIFS (unit of measurement: mm), which equals to the absolute value of |(ISFS0+ISFS3+ISFS7+ITFS0+ITFS3+ITFS7)/6|=|0.028 mm|.

The focus shift (difference) between the focal points of the visible light and the focal points of the infrared light at their respective central fields of view (RGB/IR) of the entire optical image capturing system (i.e. wavelength of 850 nm versus wavelength of 555 nm, unit of measurement: mm) is expressed as FS, which meets the absolute value |(VSFS0+VTFS0)/2−(ISFS0+ITFS0)/2|=|0.025 mm|. The difference (focus shift) between the average focus shift of the visible light at the three fields of view and the average focus shift of the infrared light at the three fields of view (RGB/IR) of the entire optical image capturing system is expressed as AFS (i.e. wavelength of 850 nm versus wavelength of 555 nm, unit of measurement: mm), which meets the absolute value of |AIFS−AVFS|=|0.028 mm|.

In the optical image capturing system of the first embodiment, a lateral aberration of the longest operation wavelength of a visible light of a positive tangential fan diagram passing through a margin of the aperture and projecting onto the first image plane at 0.7 field of view is expressed as PLTA and its value is 0.006 mm. A lateral aberration of the shortest operation wavelength of a visible light of the positive tangential fan diagram passing through the margin of the aperture and projecting onto the first image plane at 0.7 field of view is expressed as PSTA and its value is 0.005 mm. A lateral aberration of the longest operation wavelength of a visible light of a negative tangential fan diagram passing through the margin of the aperture and projecting onto the first image plane at 0.7 field of view is expressed as NLTA and its value is 0.004 mm. A lateral aberration of the shortest operation wavelength of a visible light of a negative tangential fan diagram passing through the margin of the aperture and projecting onto the first image plane at 0.7 field of view is expressed as NSTA and its value is −0.007 mm. A lateral aberration of the longest operation wavelength of a visible light of a sagittal fan diagram passing through the margin of the aperture and projecting onto the first image plane at 0.7 field of view is expressed as SLTA and its value is −0.003 mm. A lateral aberration of the shortest operation wavelength of a visible light of the sagittal fan diagram passing through the margin of the aperture and projecting onto the first image plane by 0.7 HOI is expressed as SSTA and its value is 0.008 mm.

Table 1 and Table 2 below should be incorporated into the reference of the present embodiment.

TABLE 1

Lens Parameter for the First Embodiment
f(focal length) = 4.075 mm; f/HEP = 1.4; HAF(half angle of view) = 50.000 deg

| Surface No | | Curvature Radius | Thickness (mm) | Material | Refractive Index | Coefficient of Dispersion | Focal Length |
|---|---|---|---|---|---|---|---|
| 0 | Object | Plane | Plane | | | | |
| 1 | First Lens | −40.99625704 | 1.934 | Plastic | 1.515 | 56.55 | −7.828 |
| 2 | | 4.555209289 | 5.923 | | | | |
| 3 | Aperture | Plane | 0.495 | | | | |
| 4 | Second Lens | 5.333427366 | 2.486 | Plastic | 1.544 | 55.96 | 5.897 |
| 5 | | −6.781659971 | 0.502 | | | | |
| 6 | Third Lens | −5.697794287 | 0.380 | Plastic | 1.642 | 22.46 | −25.738 |
| 7 | | −8.883957518 | 0.401 | | | | |
| 8 | Fourth Lens | 13.19225664 | 1.236 | Plastic | 1.544 | 55.96 | 59.205 |
| 9 | | 21.55681832 | 0.025 | | | | |
| 10 | Fifth Lens | 8.987806345 | 1.072 | Plastic | 1.515 | 56.55 | 4.668 |
| 11 | | −3.158875374 | 0.025 | | | | |
| 12 | Sixth Lens | −29.46491425 | 1.031 | Plastic | 1.642 | 22.46 | −4.886 |
| 13 | | 3.593484273 | 2.412 | | | | |
| 14 | IR-bandstop Filter | Plane | 0.200 | | 1.517 | 64.13 | |
| 15 | | Plane | 1.420 | | | | |
| 16 | First Image Plane | Plane | | | | | |

Reference Wavelength = 555 nm; Shield Position: The 1st surface with effective aperture radius = 5.800 mm; The 3rd surface with effective aperture radius = 1.570 mm; the 5th surface with the effective aperture radius = 1.950 mm

TABLE 2

Aspheric Coefficients of the First Embodiment
Table 2: Aspheric Coefficients

| | Surface No | | | | | | |
|---|---|---|---|---|---|---|---|
| | 1 | 2 | 4 | 5 | 6 | 7 | 8 |
| k | 4.310876E+01 | −4.707622E+00 | 2.616025E+00 | 2.445397E+00 | 5.645686E+00 | −2.117147E+01 | −5.287220E+00 |
| A4 | 7.054243E−03 | 1.714312E−02 | −8.377541E−03 | −1.789549E−02 | −3.379055E−03 | −1.370959E−02 | −2.937377E−02 |
| A6 | −5.233264E−04 | −1.502232E−04 | −1.838068E−03 | −3.657520E−03 | −1.225453E−03 | 6.250200E−03 | 2.743532E−03 |
| A8 | 3.077890E−05 | −1.359611E−04 | 1.233332E−03 | −1.131622E−03 | −5.979572E−03 | −5.854426E−03 | −2.457574E−03 |
| A10 | −1.260650E−06 | 2.680747E−05 | −2.390895E−03 | 1.390351E−03 | 4.556449E−03 | 4.049451E−03 | 1.874319E−03 |
| A12 | 3.319093E−08 | −2.017491E−06 | 1.998555E−03 | −4.152857E−04 | −1.177175E−03 | −1.314592E−03 | −6.013661E−04 |
| A14 | −5.051600E−10 | 6.604615E−08 | −9.734019E−04 | 5.487286E−05 | 1.370522E−04 | 2.143097E−04 | 8.792480E−05 |
| A16 | 3.380000E−12 | −1.301630E−09 | 2.478373E−04 | −2.919339E−06 | −5.974015E−06 | −1.399894E−05 | −4.770527E−06 |

| | Surface No | | | | |
|---|---|---|---|---|---|
| | 9 | 10 | 11 | 12 | 13 |
| k | 6.200000E+01 | −2.114008E+01 | −7.699904E+00 | −6.155476E+01 | −3.120467E−01 |
| A4 | −1.359965E−01 | −1.263831E−01 | −1.927804E−02 | −2.492467E−02 | −3.521844E−02 |
| A6 | 6.628518E−02 | 6.965399E−02 | 2.478376E−03 | −1.835360E−03 | 5.629654E−03 |
| A8 | −2.129167E−02 | −2.116027E−02 | 1.438785E−03 | 3.201343E−03 | −5.466925E−04 |
| A10 | 4.396344E−03 | 3.819371E−03 | −7.013749E−04 | −8.990757E−04 | 2.231154E−05 |
| A12 | −5.542899E−04 | −4.040283E−04 | 1.253214E−04 | 1.245343E−04 | 5.548990E−07 |
| A14 | 3.768879E−05 | 2.280473E−05 | −9.943196E−06 | −8.788363E−06 | −9.396920E−08 |
| A16 | −1.052467E−06 | −5.165452E−07 | 2.898397E−07 | 2.494302E−07 | 2.728360E−09 |

The values pertaining to the length of the outline curves are obtainable from the data in Table 1 and Table 2

| First Embodiment (Primary Reference Wavelength = 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 1.455 | 1.455 | −0.00033 | 99.98% | 1.934 | 75.23% |
| 12 | 1.455 | 1.495 | 0.03957 | 102.72% | 1.934 | 77.29% |
| 21 | 1.455 | 1.465 | 0.00940 | 100.65% | 2.486 | 58.93% |
| 22 | 1.455 | 1.495 | 0.03950 | 102.71% | 2.486 | 60.14% |
| 31 | 1.455 | 1.486 | 0.03045 | 102.09% | 0.380 | 391.02% |
| 32 | 1.455 | 1.464 | 0.00830 | 100.57% | 0.380 | 385.19% |
| 41 | 1.455 | 1.458 | 0.00237 | 100.16% | 1.236 | 117.95% |
| 42 | 1.455 | 1.484 | 0.02825 | 101.94% | 1.236 | 120.04% |
| 51 | 1.455 | 1.462 | 0.00672 | 100.46% | 1.072 | 136.42% |
| 52 | 1.455 | 1.499 | 0.04335 | 102.98% | 1.072 | 139.83% |
| 61 | 1.455 | 1.465 | 0.00964 | 100.66% | 1.031 | 142.06% |
| 62 | 1.455 | 1.469 | 0.01374 | 100.94% | 1.031 | 142.45% |
| ARS | EHD | ARS value | ARS − EHD | (ARS/EHD)% | TP | ARS/TP (%) |
| 11 | 5.800 | 6.141 | 0.341 | 105.88% | 1.934 | 317.51% |
| 12 | 3.299 | 4.423 | 1.125 | 134.10% | 1.934 | 228.70% |
| 21 | 1.664 | 1.674 | 0.010 | 100.61% | 2.486 | 67.35% |
| 22 | 1.950 | 2.119 | 0.169 | 108.65% | 2.486 | 85.23% |
| 31 | 1.980 | 2.048 | 0.069 | 103.47% | 0.380 | 539.05% |
| 32 | 2.084 | 2.101 | 0.017 | 100.83% | 0.380 | 552.87% |
| 41 | 2.247 | 2.287 | 0.040 | 101.80% | 1.236 | 185.05% |
| 42 | 2.530 | 2.813 | 0.284 | 111.22% | 1.236 | 227.63% |
| 51 | 2.655 | 2.690 | 0.035 | 101.32% | 1.072 | 250.99% |
| 52 | 2.764 | 2.930 | 0.166 | 106.00% | 1.072 | 273.40% |
| 61 | 2.816 | 2.905 | 0.089 | 103.16% | 1.031 | 281.64% |
| 62 | 3.363 | 3.391 | 0.029 | 100.86% | 1.031 | 328.83% |

Table 1 is the detailed structural data for the first embodiment in FIG. 1A, in which the unit for the curvature radius, the central thickness, the distance, and the focal length is millimeters (mm). Surfaces 0-16 illustrate the surfaces from the object side to the image side in the optical image capturing system. Table 2 shows the aspheric coefficients of the first embodiment, where k is the cone coefficient in the aspheric surface equation, and $A_1$-$A_{20}$ are respectively the first to the twentieth order aspheric surface coefficients. Besides, the tables in the following embodiments correspond to their respective schematic views and the diagrams of aberration curves, and definitions of the parameters in these tables are similar to those in the Table 1 and the Table 2, so the repetitive details will not be given here.

Second Embodiment

Figure 2A:
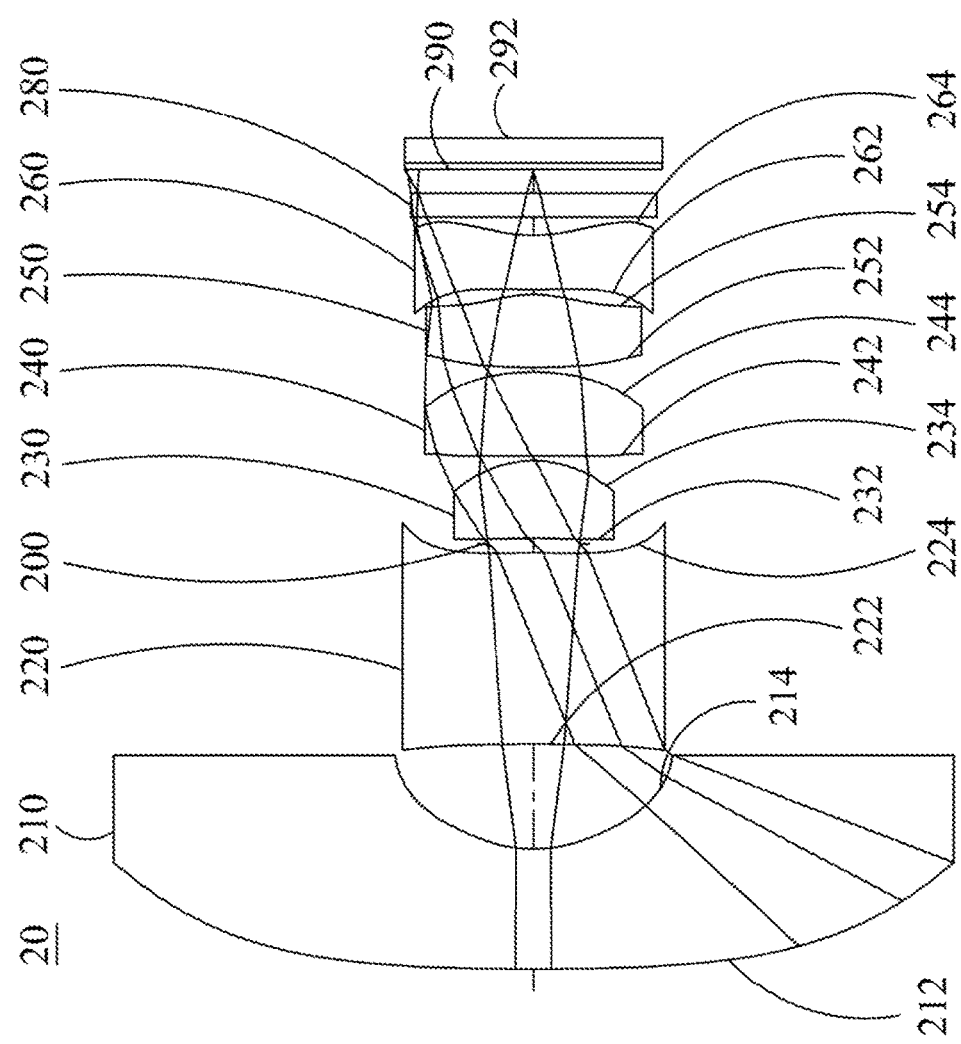
FIG. 2A is a schematic view of the optical image capturing system according to the second embodiment of the present invention.
Figure 2B:
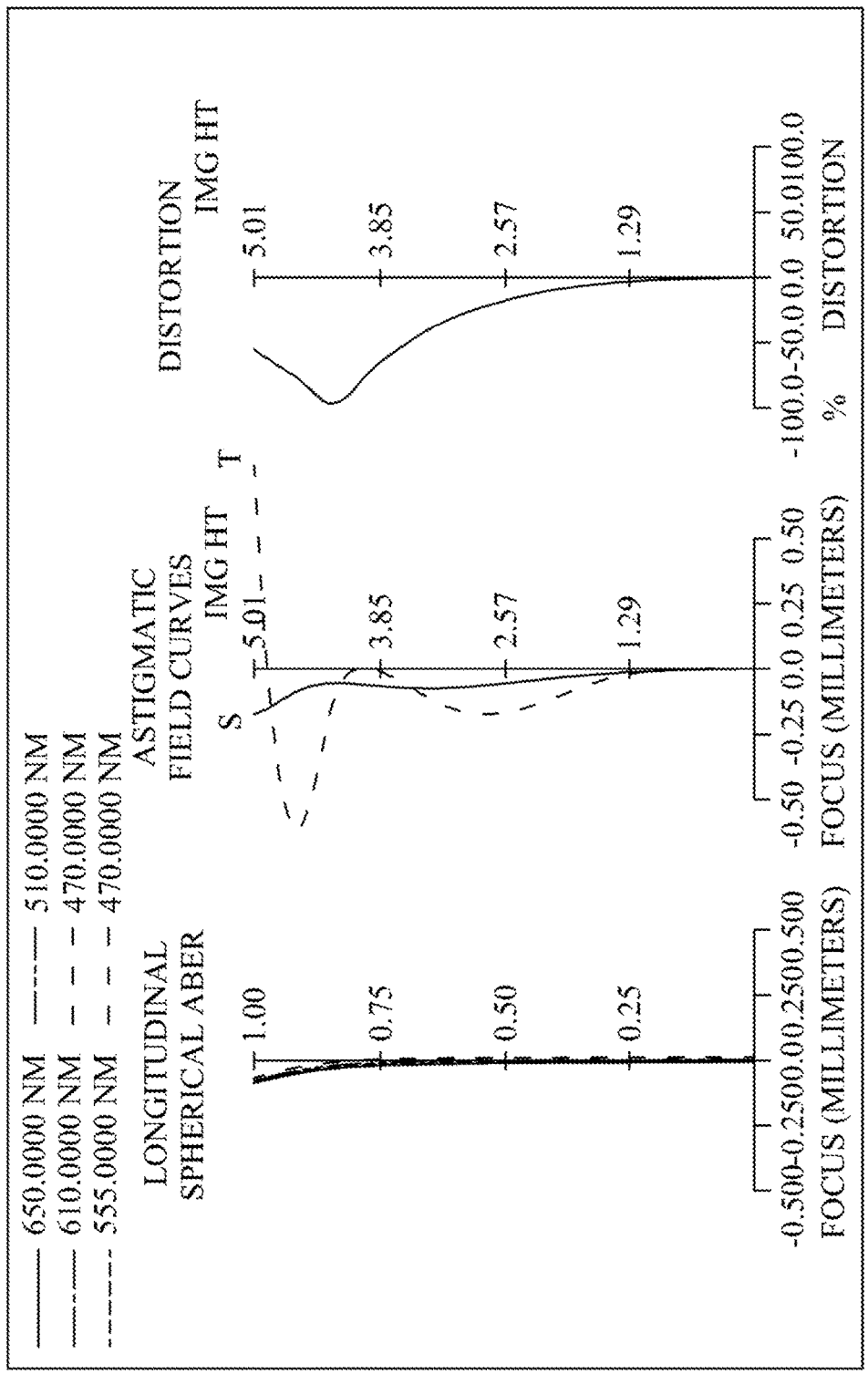
FIG. 2B shows the longitudinal spherical aberration curves, astigmatic field curves, and optical distortion curve of the optical image capturing system in the order from left to right according to the second embodiment of the present invention.
Figure 2C:
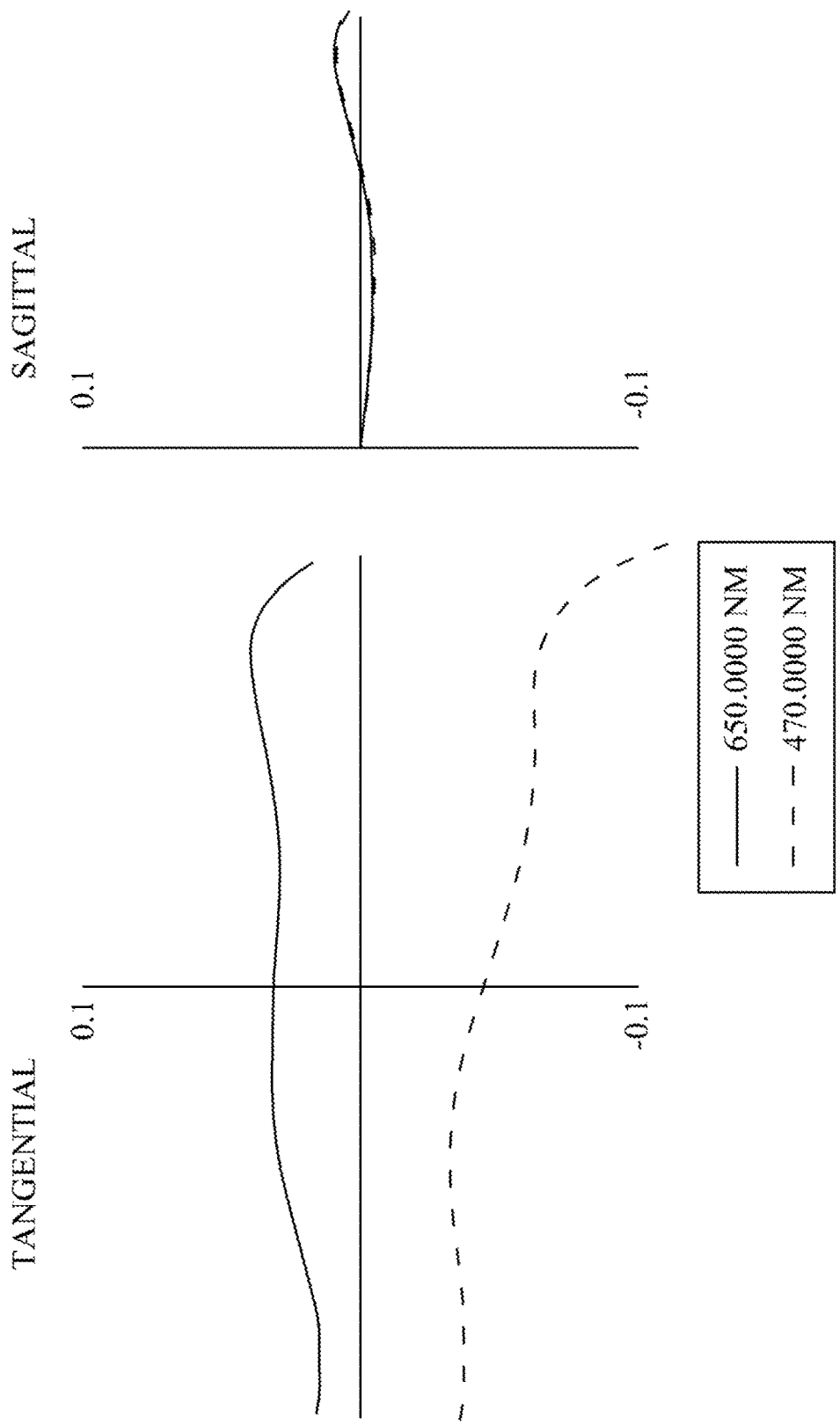
FIG. 2C shows the sagittal fan and the tangential fan of the optical image capturing system and the lateral aberration diagram of the longest operation wavelength and the shortest operation wavelength passing thorough the margin of the aperture at 0.7 field of view according to the second embodiment of the present invention.
Figure 2D:
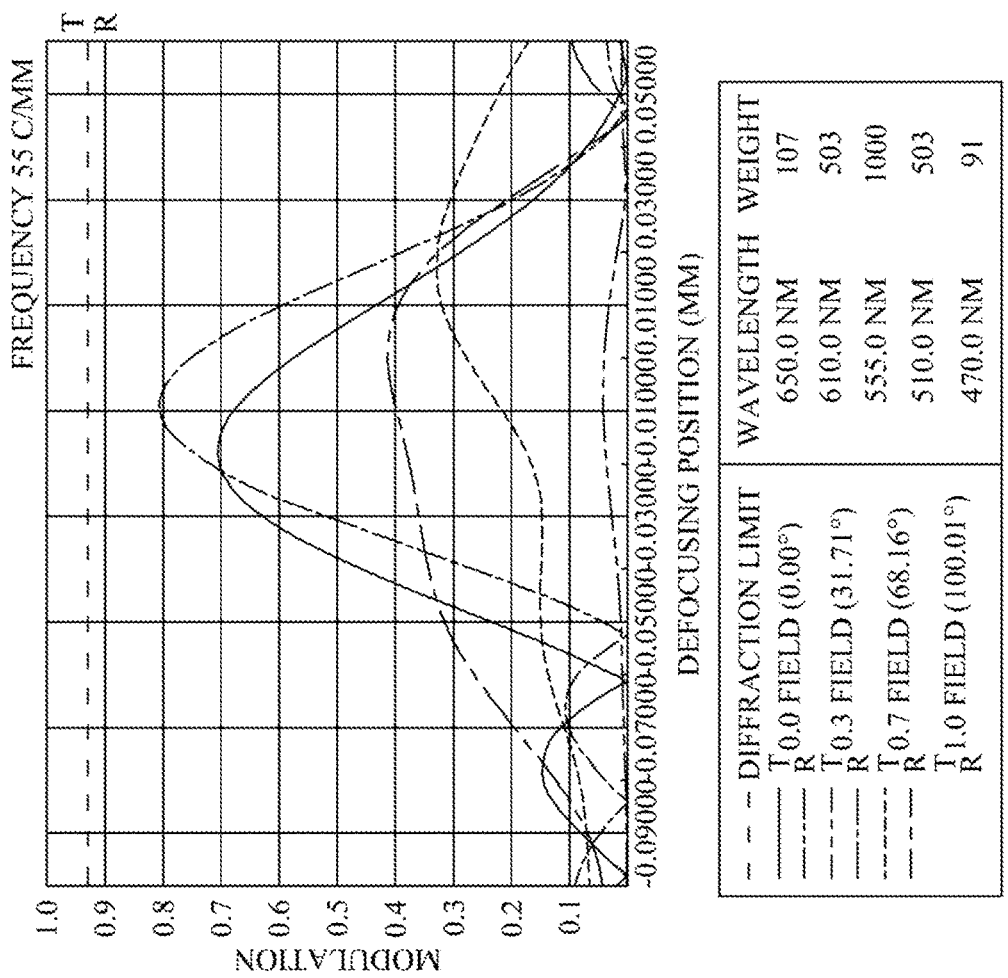
FIG. 2D is a diagram showing the through focus MTF values of the visible light spectrum at the central field of view, 0.3 field of view, and 0.7 field of view of the second embodiment of the present invention.
Figure 2E:
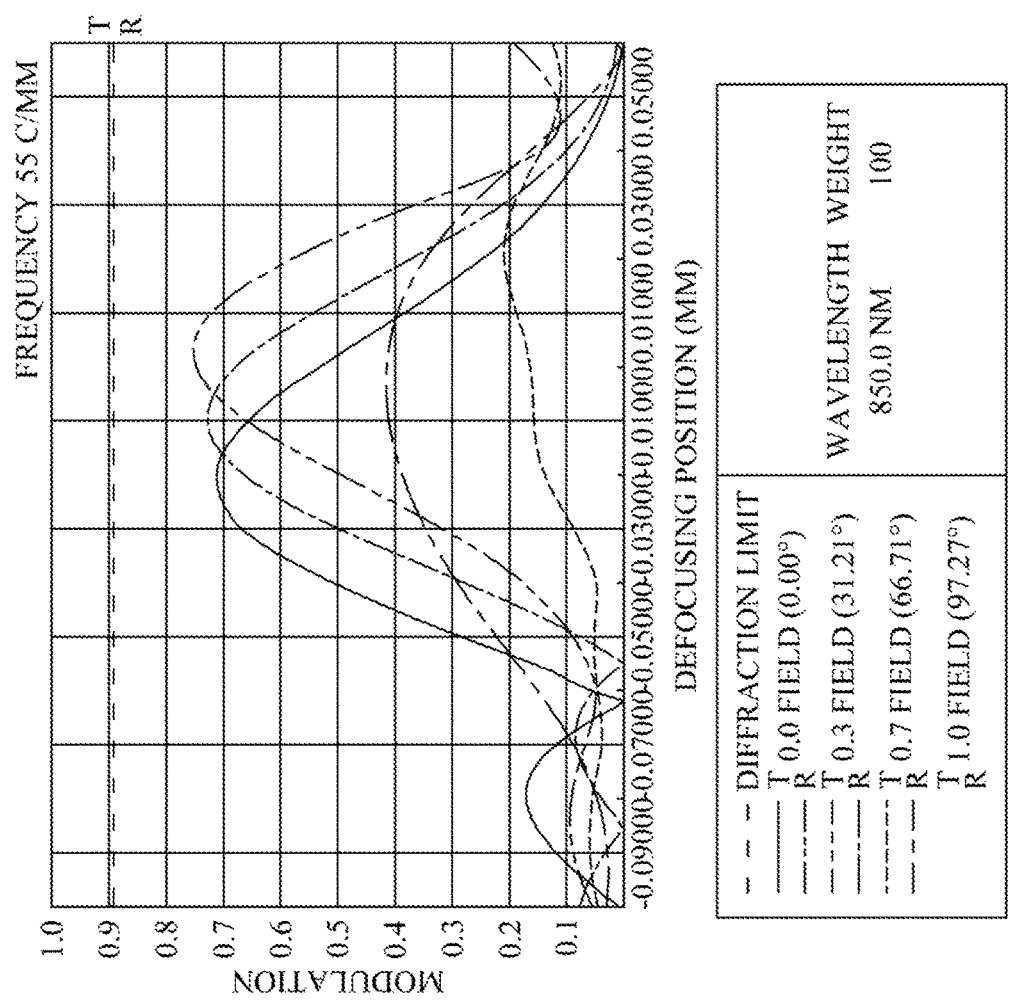
FIG. 2E is a diagram showing the through focus MTF values of the infrared light spectrum at the central field of view, 0.3 field of view, and 0.7 field of view of the second embodiment of the present invention.

Please refer to FIGS. 2A to 2E. FIG. 2A is a schematic view of the optical image capturing system according to the second embodiment of the present invention. FIG. 2B shows the longitudinal spherical aberration curves, astigmatic field curves, and optical distortion curve of the optical image capturing system in the order from left to right according to the second embodiment of the present invention. FIG. 2C shows the lateral aberration diagram of the optical image capturing system at 0.7 field of view according to the second embodiment of the present invention. FIG. 2D is a diagram showing the through focus MTF values of the visible light spectrum at the central field of view, 0.3 field of view, and 0.7 field of view of the second embodiment of the present invention. FIG. 2E is a diagram showing the through focus MTF values of the infrared light spectrum at the central field of view, 0.3 field of view, and 0.7 field of view of the second embodiment of the present invention.

As shown in FIG. 2A, in the order from the object side to the image side, the optical image capturing system includes a first lens 210, a second lens 220, an aperture 200, a third lens 230, a fourth lens 240, a fifth lens 250, a sixth lens 260, an IR-bandstop filter 280, a first image plane 290, and an image sensing device 292. In the second embodiment of the present invention, the rays of any field of view can be further divided into sagittal ray and tangential ray, and the spatial frequency of 55 cycles/mm serves as the benchmark for evaluating the focus shifts and the MTF values. The second embodiment of the present invention takes 850 nm as the infrared light wavelength.

The first lens 210 has negative refractive power and is made of glass material. The object side 212 of the first lens 210 is a convex surface and the image side 214 of the first lens 210 is a concave surface, and the object side 212 and the image side 214 of the first lens 210 are both aspheric.

The second lens 220 has positive refractive power and is made of glass material. The object side 222 of the second lens 220 is a concave surface and the image side 224 of the second lens 220 is a convex surface, and the object side 222 and an image side 224 of the second lens 220 are both aspheric. Both the image side 224 and the object side 222 of the second lens 220 have one inflection point.

The third lens 230 has positive refractive power and is made of glass material. The object side 232 of the third lens 230 is a concave surface and the image side 234 of the third lens 230 is a convex surface, and the object side 232 and an image side 234 of the third lens 230 are both aspheric.

The fourth lens 240 has positive refractive power and is made of glass material. The object side 242 of the fourth lens 240 is a concave surface and the image side 244 of the fourth lens 240 is a convex surface, and the object side 242 and an image side 244 of the fourth lens 240 are both aspheric. The object side 242 of the fourth lens 240 has one inflection point.

The fifth lens 250 has positive refractive power and is made of glass material. The object side 252 of the fifth lens 250 is a convex surface and the image-side 254 of the fifth lens 250 is a convex surface, and the object side 252 and an image side 254 of the fifth lens 250 are both aspheric. The object side 252 of the fifth lens 250 has one inflection point and the image side 254 of the fifth lens 250 has two inflection point.

The sixth lens 260 has negative refractive power and is made of glass material. The object side 262 of the sixth lens 260 is a convex surface and the image side 264 of the sixth lens 260 is a concave surface, and the object side 262 and an image side 264 of the sixth lens 260 are both aspheric. The object side 262 of the sixth lens 260 has one inflection point and the image side 264 of the sixth lens 260 has one inflection point. Hereby, this configuration is beneficial to shorten the back focal length of the optical image capturing system so as to keep its miniaturization. Besides, the incident angle of the off-axis rays can be reduced effectively, thereby further correcting the off-axis aberration.

The IR-bandstop filter 280 is made of glass material and is disposed between the sixth lens 260 and the first image plane 290. The IR-bandstop filter 280 does not affect the focal length of the optical image capturing system.

Table 3 and Table 4 below should be incorporated into the reference of the present embodiment

TABLE 3

Lens Parameters for the Second Embodiment
f(focal length) = 2.530 mm; f/HEP = 1.8; HAF(half angle of view) = 100 deg

| Surface No | | Curvature Radius | Thickness (mm) | Material | Refractive Index | Coefficient of Dispersion | Focal Length |
|---|---|---|---|---|---|---|---|
| 0 | Object | 1E+18 | 1E+18 | | | | |
| 1 | First Lens | 128.3992126 | 5.031 | Glass | 2.001 | 29.13 | −5.82118 |
| 2 | | 5.496816331 | 4.365 | | | | |
| 3 | Second Lens | −90.56838621 | 8.000 | Glass | 2.002 | 19.32 | 434.857 |
| 4 | | −78.43219208 | 0.367 | | | | |
| 5 | Aperture | 1E+18 | 0.252 | | | | |
| 6 | Third Lens | −148.6875885 | 3.224 | Glass | 1.497 | 81.56 | 8.15151 |
| 7 | | −3.981801275 | 0.200 | | | | |
| 8 | Fourth Lens | −198.1229131 | 3.515 | Glass | 1.497 | 81.56 | 20.8239 |
| 9 | | −9.91686171 | 0.200 | | | | |
| 10 | Fifth Lens | 46.02872933 | 3.038 | Glass | 1.497 | 81.56 | 9.10834 |
| 11 | | −4.923844385 | 0.200 | | | | |
| 12 | Sixth Lens | 31.97529834 | 2.266 | Glass | 2.002 | 19.32 | −7.15458 |
| 13 | | 5.688582611 | 0.759 | | | | |
| 14 | IR-bandstop Filter | 1E+18 | 1.000 | BK_7 | 1.517 | 64.13 | |

TABLE 3-continued

Lens Parameters for the Second Embodiment
f(focal length) = 2.530 mm; f/HEP = 1.8; HAF(half angle of view) = 100 deg

| Surface No | Curvature Radius | Thickness (mm) | Material | Refractive Index | Coefficient of Dispersion | Focal Length |
|---|---|---|---|---|---|---|
| 15 | | 1E+18 | 0.999 | | | |
| 16 | First Image Plane | 1E+18 | 0.000 | | | |

Reference Wavelength = 555 nm; Shield Position: The 10th surface with effective aperture radius = 4.244 mm

TABLE 4

The Aspheric Coefficients of the Second Embodiment
Table 4: Aspheric Coefficients

| | Surface No | | | | | | |
|---|---|---|---|---|---|---|---|
| | 1 | 2 | 3 | 4 | 6 | 7 | 8 |
| k | 0.000000E+00 | 0.000000E+00 | 0.000000E+00 | 0.000000E+00 | 0.000000E+00 | 0.000000E+00 | 0.000000E+00 |
| A4 | 4.554632E−05 | −1.116511E−03 | −3.281717E−04 | 1.013007E−03 | −2.319147E−03 | 2.551578E−03 | 5.494284E−04 |
| A6 | 0.000000E+00 | 0.000000E+00 | 7.431375E−06 | 3.569700E−05 | −2.312258E−05 | −3.432703E−06 | −4.447697E−06 |
| A8 | 0.000000E+00 | 0.000000E+00 | 0.000000E+00 | 0.000000E+00 | 0.000000E+00 | 0.000000E+00 | 0.000000E+00 |
| A10 | 0.000000E+00 | 0.000000E+00 | 0.000000E+00 | 0.000000E+00 | 0.000000E+00 | 0.000000E+00 | 0.000000E+00 |

| | Surface No | | | | |
|---|---|---|---|---|---|
| | 9 | 10 | 11 | 12 | 13 |
| k | 0.000000E+00 | 0.000000E+00 | 0.000000E+00 | 0.000000E+00 | 0.000000E+00 |
| A4 | −2.215066E−03 | 2.071182E−03 | 7.920742E−03 | −2.865030E−03 | −2.215066E−03 |
| A6 | 4.178355E−05 | −5.813936E−05 | −1.125644E−04 | 6.567843E−06 | 4.178355E−05 |
| A8 | 0.000000E+00 | 0.000000E+00 | 0.000000E+00 | −5.897881E−09 | 0.000000E+00 |
| A10 | 0.000000E+00 | 0.000000E+00 | 0.000000E+00 | 0.000000E+00 | 0.000000E+00 |

In the second embodiment, the presentation of the aspheric surface equation is similar to that in the first embodiment. Besides, the definitions of parameters in following tables are similar to those in the first embodiment, so the repetitive details will not be given here.

The following values for the conditions can be obtained from the data in Table 3 and Table 4.

| Second Embodiment (Primary Reference Wavelength = 587.5 nm) | | | | | |
|---|---|---|---|---|---|
| |f/f1| | |f/f2| | |f/f3| | |f/f4| | |f/f5| | |f/f6| |
| 0.43455 | 0.00582 | 0.31032 | 0.12148 | 0.27772 | 0.35356 |

| ΣPPR | ΣNPR | ΣPPR/|ΣNPR| | IN12/f | IN56/f | TP4/(IN34 + TP4 + IN45) |
|---|---|---|---|---|---|
| 0.78536 | 0.71809 | 1.09368 | 1.72562 | 0.07906 | 0.89784 |

| |f1/f2| | |f2/f3| | (TP1 + IN12)/TP2 | | (TP6 + IN56)/TP5 | |
|---|---|---|---|---|---|
| 0.01339 | 53.34680 | 1.17446 | | 0.81174 | |

| HOS | InTL | HOS/HOI | InS/HOS | ODT % | TDT % |
|---|---|---|---|---|---|
| 33.41460 | 30.65750 | 6.68292 | 0.46842 | −134.90400 | 108.07900 |

| HVT51 | HVT52 | HVT61 | HVT62 | HVT62/HOI | HVT62/HOS |
|---|---|---|---|---|---|
| 0 | 0 | 1.66090 | 3.58499 | 0.71700 | 0.10729 |

| TP2/TP3 | TP3/TP4 | InRS61 | InRS62 | |InRS61|/TP6 | |InRS62|/TP6 |
|---|---|---|---|---|---|
| 2.48116 | 0.91719 | −0.46140 | 0.31416 | 0.20364 | 0.13865 |

-continued

| Second Embodiment (Primary Reference Wavelength = 587.5 nm) | | | | | |
|---|---|---|---|---|---|
| PSTA | PLTA | NSTA | NLTA | SSTA | SLTA |
| −0.111 mm | 0.017 mm | −0.036 mm | 0.016 mm | −0.025 mm | −0.023 mm |
| VSFS0 | VSFS3 | VSFS7 | VTFS0 | VTFS3 | VTFS7 |
| −0.020 | −0.010 | −0.000 | −0.020 | −0.010 | 0.015 |
| VSMTF0 | VSMTF3 | VSMTF7 | VTMTF0 | VTMTF3 | VTMTF7 |
| 0.704 | 0.805 | 0.413 | 0.704 | 0.042 | 0.328 |
| ISFS0 | ISFS3 | ISFS7 | ITFS0 | ITFS3 | ITFS7 |
| −0.020 | −0.010 | −0.005 | −0.020 | 0.005 | 0.020 |
| ISMTF0 | ISMTF3 | ISMTF7 | ITMTF0 | ITMTF3 | ITMTF7 |
| 0.712 | 0.728 | 0.416 | 0.712 | 0.751 | 0.211 |
| FS | AIFS | AVFS | AFS | | |
| 0.000 | −0.005 | −0.008 | 0.003 | | |

The following values about the length of the outline curve can be obtained from the data in Table 3 and Table 4.

| Second Embodiment (Primary Reference Wavelength = 587.5 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 0.703 | 0.702 | −0.00071 | 99.90% | 5.031 | 13.95% |
| 12 | 0.703 | 0.704 | 0.00118 | 100.17% | 5.031 | 13.99% |
| 21 | 0.703 | 0.702 | −0.00070 | 99.90% | 8.000 | 8.78% |
| 22 | 0.703 | 0.702 | −0.00070 | 99.90% | 8.000 | 8.78% |
| 31 | 0.703 | 0.702 | −0.00071 | 99.90% | 3.224 | 21.77% |
| 32 | 0.703 | 0.706 | 0.00289 | 100.41% | 3.224 | 21.88% |
| 41 | 0.703 | 0.702 | −0.00071 | 99.90% | 3.515 | 19.97% |
| 42 | 0.703 | 0.703 | −0.00009 | 99.99% | 3.515 | 19.99% |
| 51 | 0.703 | 0.702 | −0.00068 | 99.90% | 3.038 | 23.11% |
| 52 | 0.703 | 0.704 | 0.00148 | 100.21% | 3.038 | 23.18% |
| 61 | 0.703 | 0.702 | −0.00067 | 99.91% | 2.266 | 30.99% |
| 62 | 0.703 | 0.704 | 0.00099 | 100.14% | 2.266 | 31.06% |
| ARS | EHD | ARS value | ARS − EHD | (ARS/EHD)% | TP | ARS/TP (%) |
| 11 | 16.799 | 17.989 | 1.19028 | 107.09% | 5.031 | 357.59% |
| 12 | 5.472 | 7.347 | 1.87496 | 134.26% | 5.031 | 146.06% |
| 21 | 5.288 | 5.295 | 0.00737 | 100.14% | 8.000 | 66.19% |
| 22 | 2.163 | 2.162 | −0.00083 | 99.96% | 8.000 | 27.03% |
| 31 | 1.995 | 1.996 | 0.00121 | 100.06% | 3.224 | 61.91% |
| 32 | 3.145 | 3.478 | 0.33320 | 110.60% | 3.224 | 107.86% |
| 41 | 3.814 | 3.816 | 0.00160 | 100.04% | 3.515 | 108.54% |
| 42 | 4.292 | 4.641 | 0.34905 | 108.13% | 3.515 | 132.01% |
| 51 | 4.244 | 4.295 | 0.05043 | 101.19% | 3.038 | 141.39% |
| 52 | 4.085 | 4.126 | 0.04102 | 101.00% | 3.038 | 135.84% |
| 61 | 4.050 | 4.135 | 0.08481 | 102.09% | 2.266 | 182.51% |
| 62 | 4.785 | 4.885 | 0.10038 | 102.10% | 2.266 | 215.61% |

The following values for the conditions can be obtained from the data in Table 3 and Table 4.

| Values Related to Inflection Point of Second Embodiment (Primary Reference Wavelength = 555 nm) | | | | | | | |
|---|---|---|---|---|---|---|---|
| HIF211 | 4.4871 | HIF211/HOI | 0.8974 | SGI211 | −0.1836 | \|SGI211\|/(\|SGI211\| + TP2) | 0.0224 |
| HIF221 | 0.9832 | HIF221/HOI | 0.1966 | SGI221 | −0.0052 | \|SGI221\|/(\|SGI221\| + TP2) | 0.0006 |
| HIF411 | 0.8818 | HIF411/HOI | 0.1764 | SGI411 | −0.0016 | \|SGI411\|/(\|SGI411\| +TP4) | 0.0005 |
| HIF511 | 3.8839 | HIF511/HOI | 0.7768 | SGI511 | 0.4359 | \|SGI511\|/(\|SGI511\| + TP5) | 0.1255 |
| HIF521 | 1.6958 | HIF521/HOI | 0.3392 | SGI521 | −0.2384 | \|SGI521\|/(\|SGI521\| + TP5) | 0.0728 |
| HIF522 | 3.6424 | HIF522/HOI | 0.7285 | SGI522 | −0.4794 | \|SGI522\|/(\|SGI522\| + TP5) | 0.1363 |

-continued

Values Related to Inflection Point of Second Embodiment
(Primary Reference Wavelength = 555 nm)

| | | | | | | | |
|---|---|---|---|---|---|---|---|
| HIF611 | 0.9570 | HIF611/HOI | 0.1914 | SGI611 | 0.0119 | \|SGI611\|/(\|SGI611\| + TP6) | 0.0052 |
| HIF621 | 2.0648 | HIF621/HOI | 0.4130 | SGI621 | 0.3128 | \|SGI621\|/(\|SGI621\| + TP6) | 0.1213 |

Third Embodiment

Figure 3A:
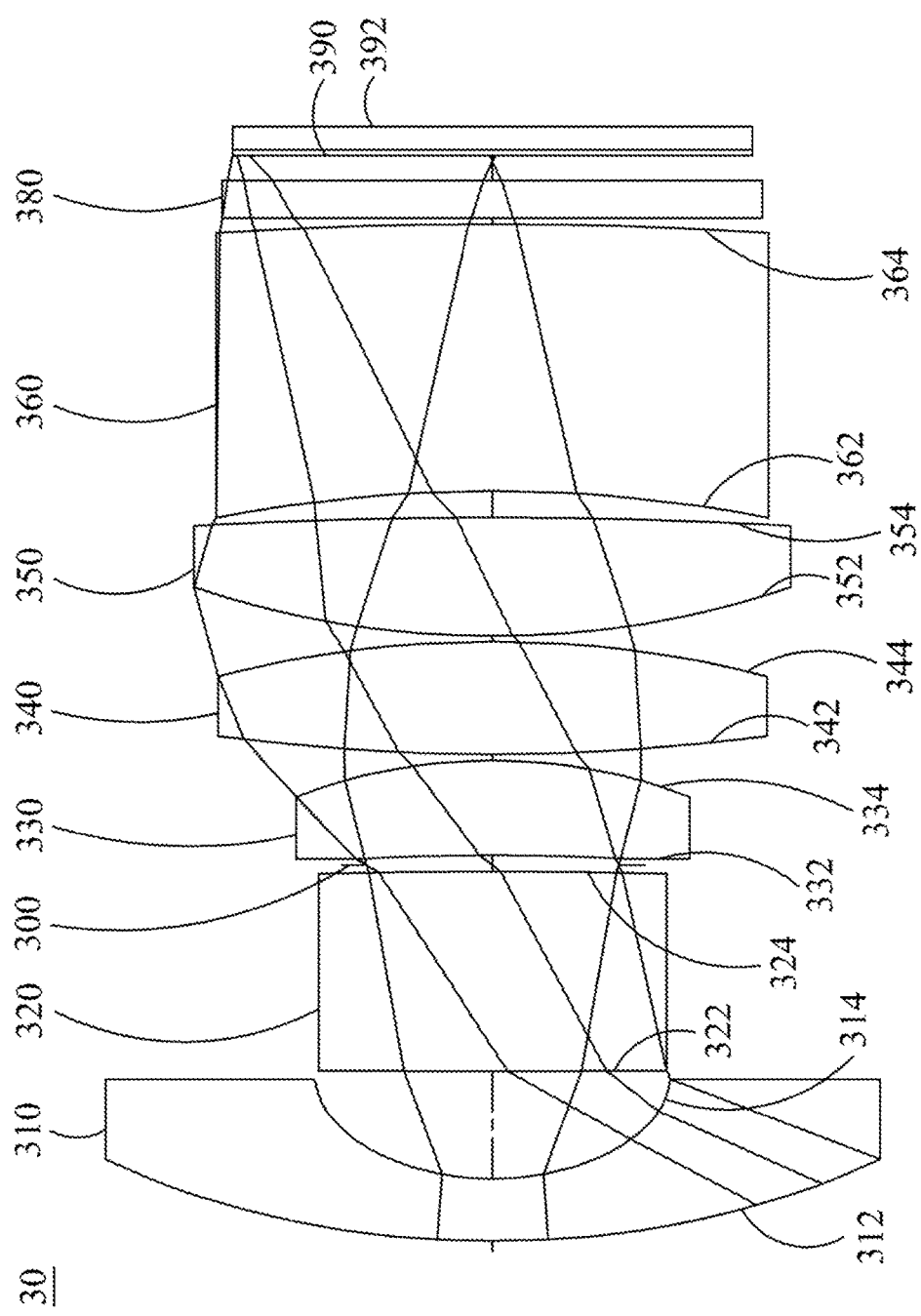
FIG. 3A is a schematic view of the optical image capturing system according to the third embodiment of the present invention.
Figure 3B:
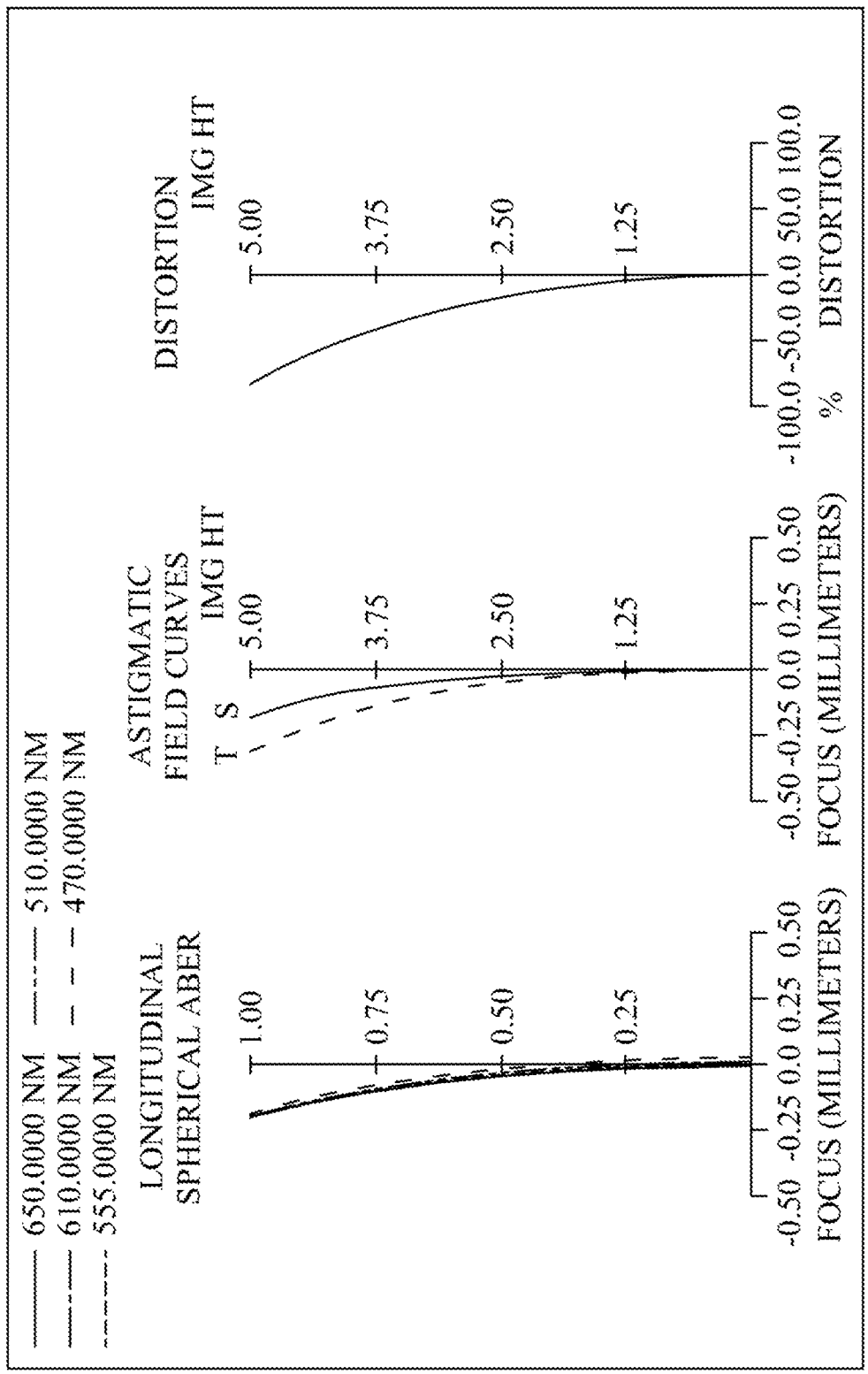
FIG. 3B shows the longitudinal spherical aberration curves, astigmatic field curves, and optical distortion curve of the optical image capturing system in the order from left to right according to the third embodiment of the present invention.
Figure 3D:
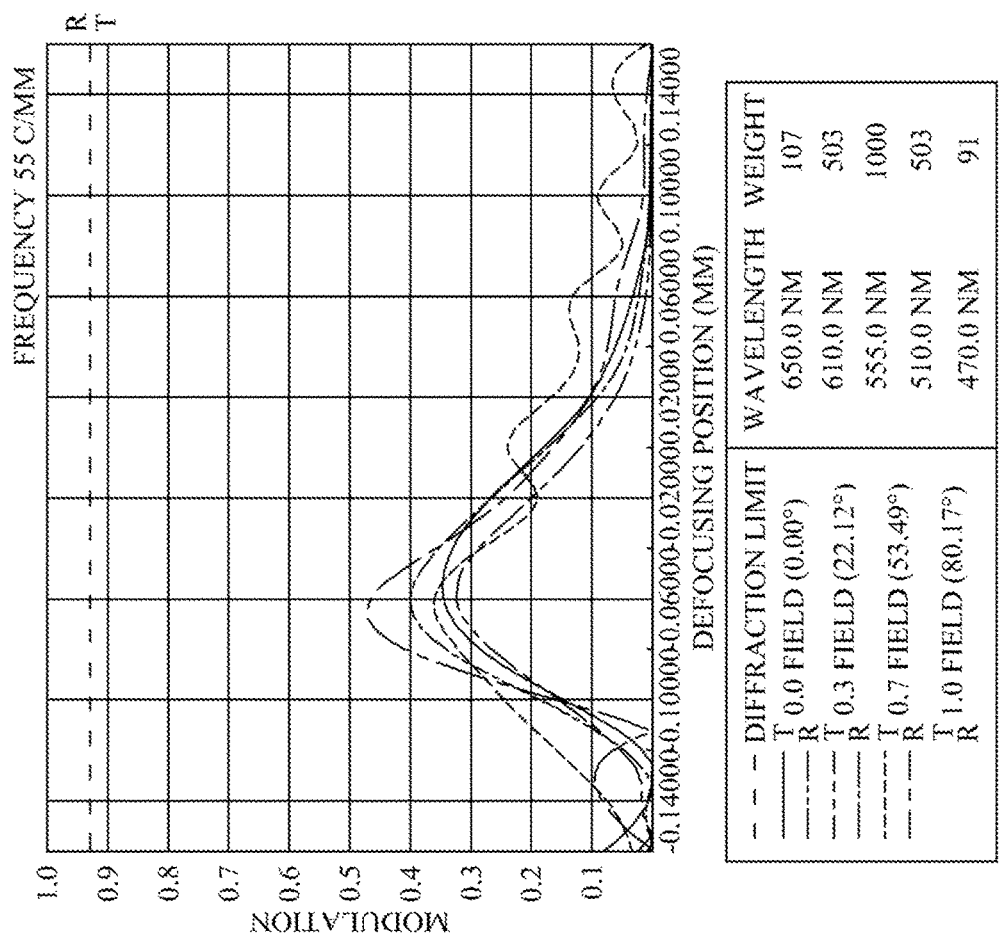
FIG. 3D is a diagram showing the through focus MTF values of the visible light spectrum at the central field of view, 0.3 field of view, and 0.7 field of view of the third embodiment of the present invention.
Figure 3E:
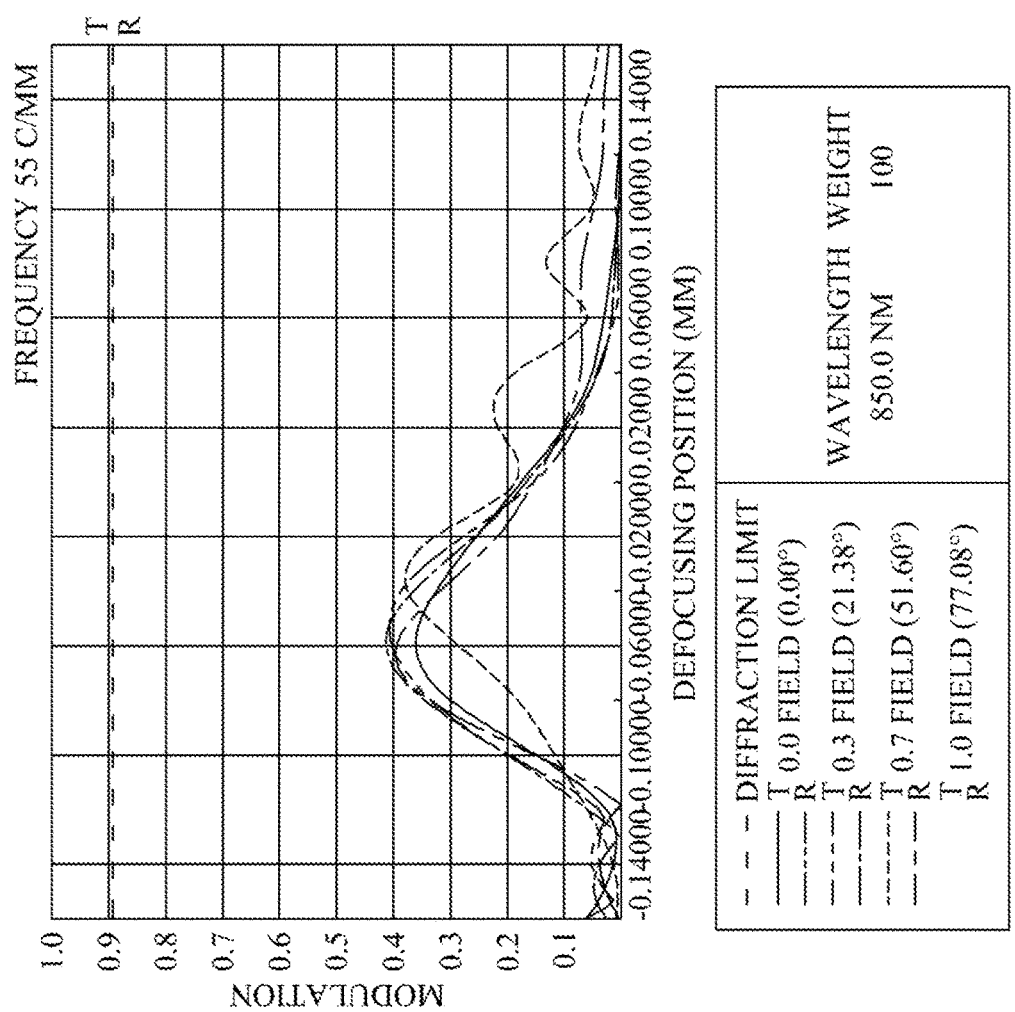
FIG. 3E is a diagram showing the through focus MTF values of the infrared light spectrum at the central field of view, 0.3 field of view, and 0.7 field of view of the third embodiment of the present invention.

Please refer to FIGS. 3A to 3E. FIG. 3A is a schematic view of the optical image capturing system according to the third embodiment of the present invention. FIG. 3B shows the longitudinal spherical aberration curves, astigmatic field curves, and optical distortion curve of the optical image capturing system, in the order from left to right, according to the third embodiment of the present invention. FIG. 3C shows the lateral aberration diagram of the optical image capturing system at 0.7 field of view according to the third embodiment of the present invention. FIG. 3D is a diagram showing the through focus MTF values of the visible light spectrum at the central field of view, 0.3 field of view, and 0.7 field of view of the third embodiment of the present invention. FIG. 3E is a diagram showing the through focus MTF values of the infrared light spectrum at the central field of view, 0.3 field of view, and 0.7 field of view of the third embodiment of the present invention.

As shown in FIG. 3A, in the order from the object side to the image side, the optical image capturing system includes a first lens 310, a second lens 320, an aperture 300, a third lens 330, a fourth lens 340, a fifth lens 350, a sixth lens 360, an IR-bandstop filter 380, a first image plane 390, and an image sensing device 392. In the third embodiment of the present invention, the rays of any field of view can be further divided into sagittal ray and tangential ray, and the spatial frequency of 55 cycles/mm serves as the benchmark for evaluating the focus shifts and the MTF values. The third embodiment of the present invention takes 850 nm as the infrared light wavelength.

The first lens 310 has negative refractive power and is made of glass material. The object side 312 of the first lens 310 is a convex surface and the image side 314 of the first lens 310 is a concave surface, and the object side 312 and the image side 314 of the first lens 310 are both spherical.

The second lens 320 has positive refractive power and is made of glass material. The object side 322 of the second lens 320 is a convex surface and the image side 324 of the second lens 320 is a convex surface, and the object side 322 and the image side 324 of the second lens 320 are both spherical.

The third lens 330 has positive refractive power and is made of glass material. The object side 332 of the third lens 330 is a concave surface and the image side 334 of the third lens 330 is a convex surface, and the object side 332 and the image side 334 of the third lens 330 are both spherical.

The fourth lens 340 has positive refractive power and is made of glass material. The object side 342 of the fourth lens 340 is a convex surface and the image side 344 of the fourth lens 340 is a convex surface, and the object side 342 and the image side 344 of the fourth lens 340 are both spherical.

The fifth lens 350 has positive refractive power and is made of glass material. The object side 352 of the fifth lens 350 is a convex surface and the image side 354 of the fifth lens 350 is a convex surface, and the object side 352 and an image side 354 of the fifth lens 350 are both spherical.

The sixth lens 360 has negative refractive power and is made of glass material. The object side 362 of the sixth lens 360 is a concave surface and the image side 364 of the sixth lens 360 is a convex surface, and the object side 362 and the image side 364 of the sixth lens 360 are both spherical. Hereby, this configuration is beneficial to shorten the back focal length of the optical image capturing system so as to keep its miniaturization. Besides, the incident angle of the off-axis rays can be reduced effectively, thereby further correcting the off-axis aberration.

The IR-bandstop filter 380 is made of glass material and is disposed between the sixth lens 360 and the first image plane 390, without affecting the focal length of the optical image capturing system.

Table 5 and Table 6 below should be incorporated into the reference of the present embodiment.

TABLE 5

Lens Parameters for the Third Embodiment
f(focal length) = 3.97731 mm; f/HEP = 1.8; HAF(half angle of view) = 80 deg

| Surface No | | Curavature Radius | Thickness (mm) | Material | Refractive Index | Coefficient of Dispersion | Focal Length |
|---|---|---|---|---|---|---|---|
| 0 | Object | 1E+18 | 1E+18 | | | | |
| 1 | First Lens | 12.18357163 | 2.000 | Glass | 2.002 | 19.32 | −5.82118 |
| 2 | | 3.484707507 | 3.494 | | | | |
| 3 | Second Lens | 708.6396095 | 6.421 | Glass | 2.002 | 19.32 | 434.857 |
| 4 | | −85.99235034 | 0.200 | | | | |
| 5 | Aperture | 1E+18 | 0.316 | | | | |
| 6 | Third Lens | −30.86236047 | 3.070 | Glass | 1.497 | 81.56 | 8.15151 |
| 7 | | −6.871888888 | 0.200 | | | | |
| 8 | Fourth Lens | 24.4653824 | 3.623 | Glass | 1.497 | 81.56 | 20.8239 |
| 9 | | −13.47371476 | 0.200 | | | | |
| 10 | Fifth Lens | 11.67742237 | 3.812 | Glass | 1.806 | 33.27 | 9.10834 |

TABLE 5-continued

Lens Parameters for the Third Embodiment
f(focal length) = 3.97731 mm; f/HEP = 1.8; HAF(half angle of view) = 80 deg

| Surface No | | Curavature Radius | Thickness (mm) | Material | Refractive Index | Coefficient of Dispersion | Focal Length |
|---|---|---|---|---|---|---|---|
| 11 | | −67.22912907 | 0.855 | | | | |
| 12 | Sixth Lens | −17.27056372 | 8.610 | Glass | 2.002 | 19.32 | −7.15458 |
| 13 | | −50.79940648 | 0.200 | | | | |
| 14 | IR-bandstop Filter | 1E+18 | 1.200 | BK_7 | 1.517 | 64.13 | |
| 15 | | 1E+18 | 0.803 | | | | |
| 16 | First Image Plane | 1E+18 | −0.001 | | | | |

Reference Wavelength = 555 nm; the third embodiment doesn't have any shield position.

TABLE 6

The Aspheric Coefficients of the Third Embodiment
Table 6: Aspheric Coefficients

| | Surface No | | | | | | |
|---|---|---|---|---|---|---|---|
| | 1 | 2 | 3 | 4 | 6 | 7 | 8 |
| k | 0.000000E+00 | 0.000000E+00 | 0.000000E+00 | 0.000000E+00 | 0.000000E+00 | 0.000000E+00 | 0.000000E+00 |
| A4 | 0.000000E+00 | 0.000000E+00 | 0.000000E+00 | 0.000000E+00 | 0.000000E+00 | 0.000000E+00 | 0.000000E+00 |
| A6 | 0.000000E+00 | 0.000000E+00 | 0.000000E+00 | 0.000000E+00 | 0.000000E+00 | 0.000000E+00 | 0.000000E+00 |
| A8 | 0.000000E+00 | 0.000000E+00 | 0.000000E+00 | 0.000000E+00 | 0.000000E+00 | 0.000000E+00 | 0.000000E+00 |
| A10 | 0.000000E+00 | 0.000000E+00 | 0.000000E+00 | 0.000000E+00 | 0.000000E+00 | 0.000000E+00 | 0.000000E+00 |

| | Surface No | | | | |
|---|---|---|---|---|---|
| | 9 | 10 | 11 | 12 | 13 |
| k | 0.000000E+00 | 0.000000E+00 | 0.000000E+00 | 0.000000E+00 | 0.000000E+00 |
| A4 | 0.000000E+00 | 0.000000E+00 | 0.000000E+00 | 0.000000E+00 | 0.000000E+00 |
| A6 | 0.000000E+00 | 0.000000E+00 | 0.000000E+00 | 0.000000E+00 | 0.000000E+00 |
| A8 | 0.000000E+00 | 0.000000E+00 | 0.000000E+00 | 0.000000E+00 | 0.000000E+00 |
| A10 | 0.000000E+00 | 0.000000E+00 | 0.000000E+00 | 0.000000E+00 | 0.000000E+00 |

In the third embodiment, the presentation of the aspheric surface equation is similar to that in the first embodiment. Besides, the definitions of parameters in following tables are similar to those in the first embodiment, so the repetitive details will not be given here.

The following values for the conditional expressions can be obtained from the data in Table 5 and Table 6.

Third Embodiment (Primary Reference Wavelength = 555 nm)

| |f/f1| | |f/f2| | |f/f3| | |f/f4| | |f/f5| | |f/f6| |
|---|---|---|---|---|---|
| 0.71328 | 0.05105 | 0.23230 | 0.21957 | 0.31278 | 0.13104 |

| ΣPPR | ΣNPR | ΣPPR/|ΣNPR| | IN12/f | IN56/f | TP4/(IN34 + TP4 + IN45) |
|---|---|---|---|---|---|
| 0.45187 | 1.12766 | 0.40071 | 0.87850 | 0.21496 | 0.90058 |

| |f1/f2| | |f2/f3| | (TP1 + IN12)/TP2 | | (TP6 + IN56)/TP5 | |
|---|---|---|---|---|---|
| 0.07157 | 4.55064 | 0.85564 | | 2.48292 | |

| HOS | InTL | HOS/HOI | InS/HOS | ODT % | TDT % |
|---|---|---|---|---|---|
| 35.00270 | 32.80130 | 7.00054 | 0.65388 | −74.81920 | 51.42000 |

-continued

| Third Embodiment (Primary Reference Wavelength = 555 nm) | | | | | |
|---|---|---|---|---|---|
| HVT51 | HVT52 | HVT61 | HVT62 | HVT62/HOI | HVT62/HOS |
| 0 | 0 | 0 | 0 | 0 | 0 |
| TP2/TP3 | TP3/TP4 | InRS61 | InRS62 | \| InRS61 \|/TP6 | \| InRS62 \|/TP6 |
| 2.09149 | 0.84729 | −0.86978 | −0.28126 | 0.10102 | 0.03267 |
| PSTA | PLTA | NSTA | NLTA | SSTA | SLTA |
| −0.087 mm | 0.054 mm | −0.117 mm | −0.005 mm | −0.025 mm | −0.023 mm |
| VSFS0 | VSFS3 | VSFS7 | VTFS0 | VTFS3 | VTFS7 |
| −0.055 | −0.060 | −0.065 | −0.055 | −0.060 | −0.060 |
| VSMTF0 | VSMTF3 | VSMTF7 | VTMTF0 | VTMTF3 | VTMTF7 |
| 0.347 | 0.401 | 0.473 | 0.347 | 0.324 | 0.361 |
| ISFS0 | ISFS3 | ISFS7 | ITFS0 | ITFS3 | ITFS7 |
| −0.055 | −0.060 | −0.065 | −0.060 | −0.055 | −0.035 |
| ISMTF0 | ISMTF3 | ISMTF7 | ITMTF0 | ITMTF3 | ITMTF7 |
| 0.361 | 0.414 | 0.397 | 0.361 | 0.407 | 0.380 |
| FS | AIFS | AVFS | AFS | | |
| 0.000 | −0.056 | −0.059 | 0.003 | | |

The following values about the length of the outline curve can be obtained from the data in Table 5 and Table 6.

| Third Embodiment (Primary Reference Wavelength = 555 nm) | | | | | | |
|---|---|---|---|---|---|---|
| ARE | ½(HEP) | ARE value | ARE − ½(HEP) | 2 (ARE/HEP) % | TP | ARE/TP (%) |
| 11 | 1.124 | 1.126 | 0.00147 | 100.13% | 2.000 | 56.28% |
| 12 | 1.124 | 1.144 | 0.02033 | 101.81% | 2.000 | 57.22% |
| 21 | 1.124 | 1.124 | −0.00013 | 99.99% | 6.421 | 17.51% |
| 22 | 1.124 | 1.124 | −0.00010 | 99.99% | 6.421 | 17.51% |
| 31 | 1.124 | 1.124 | 0.00012 | 100.01% | 3.070 | 36.62% |
| 32 | 1.124 | 1.129 | 0.00494 | 100.44% | 3.070 | 36.78% |
| 41 | 1.124 | 1.124 | 0.00027 | 100.02% | 3.623 | 31.03% |
| 42 | 1.124 | 1.125 | 0.00118 | 100.10% | 3.623 | 31.06% |
| 51 | 1.124 | 1.126 | 0.00161 | 100.14% | 3.812 | 29.53% |
| 52 | 1.124 | 1.124 | −0.00008 | 99.99% | 3.812 | 29.49% |
| 61 | 1.124 | 1.125 | 0.00066 | 100.06% | 8.610 | 13.06% |
| 62 | 1.124 | 1.124 | −0.00004 | 100.00% | 8.610 | 13.06% |
| ARS | EHD | ARS value | ARS − EHD | (ARS/EHD) % | TP | ARS/TP (%) |
| 11 | 7.501 | 8.081 | 0.57910 | 107.72% | 2.000 | 404.03% |
| 12 | 3.465 | 5.094 | 1.62869 | 147.00% | 2.000 | 254.68% |
| 21 | 3.289 | 3.289 | −0.00013 | 100.00% | 6.421 | 51.22% |
| 22 | 2.543 | 2.542 | −0.00057 | 99.98% | 6.421 | 39.59% |
| 31 | 2.639 | 2.641 | 0.00232 | 100.09% | 3.070 | 86.03% |
| 32 | 3.577 | 3.761 | 0.18432 | 105.15% | 3.070 | 122.50% |
| 41 | 4.279 | 4.300 | 0.02141 | 100.50% | 3.623 | 118.68% |
| 42 | 4.919 | 5.034 | 0.11540 | 102.35% | 3.623 | 138.94% |
| 51 | 5.471 | 5.694 | 0.22296 | 104.08% | 3.812 | 149.37% |
| 52 | 5.208 | 5.213 | 0.00512 | 100.10% | 3.812 | 136.76% |
| 61 | 5.130 | 5.209 | 0.07854 | 101.53% | 8.610 | 60.50% |
| 62 | 5.320 | 5.330 | 0.00947 | 100.18% | 8.610 | 61.90% |

The following values for the conditional expressions can be obtained from the data in Table 5 and Table 6.

| Values Related to Inflection Point of Third Embodiment (Primary Reference Wavelength = 555 nm) | | | | | | | |
|---|---|---|---|---|---|---|---|
| HIF311 | 0 | HIF311/HOI | 0 | SGI311 | 0 | \|SGI311\|/(\|SGI311\| + TP3) | 0 |

Fourth Embodiment

Figure 4A:
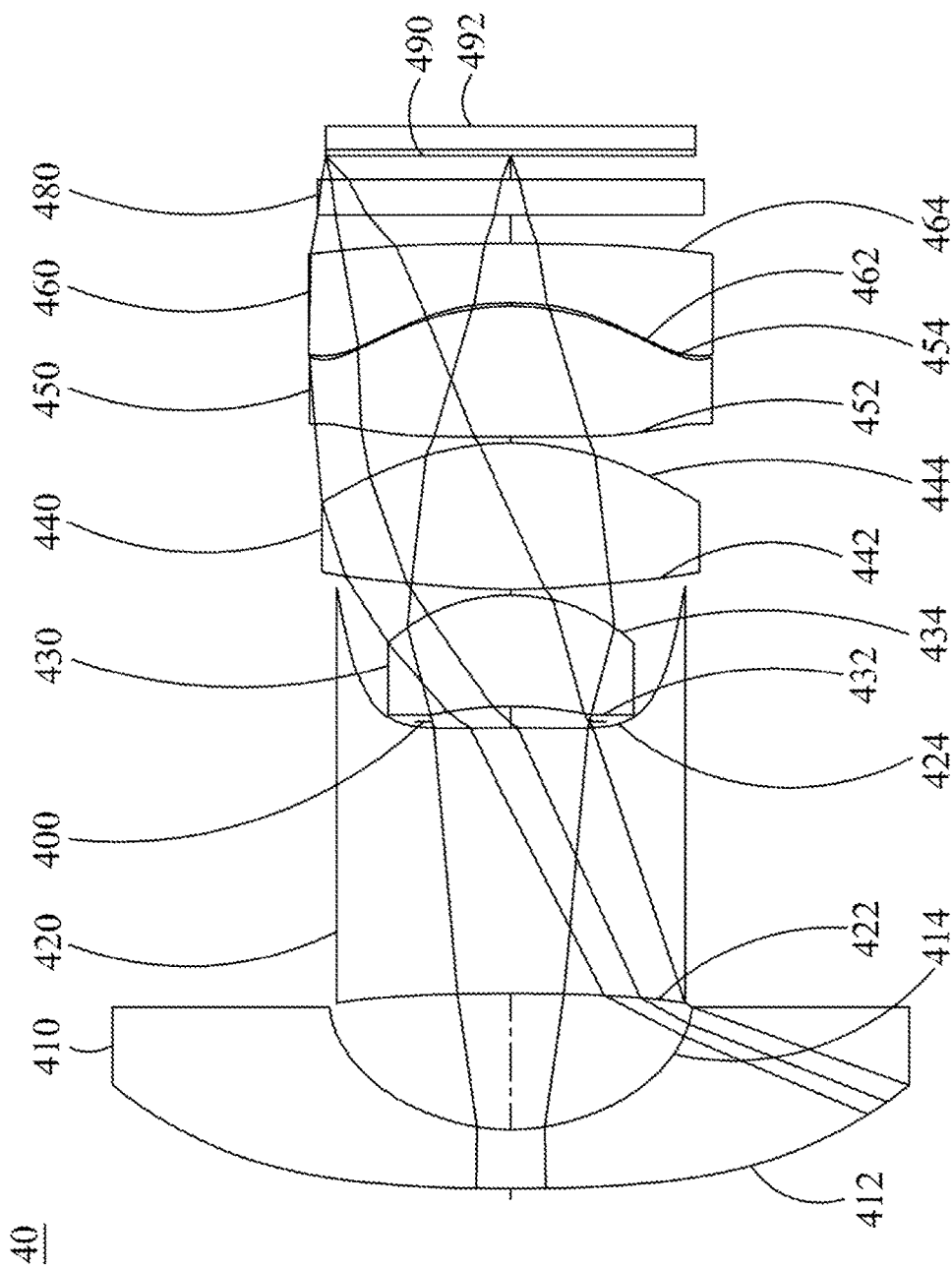
FIG. 4A is a schematic view of the optical image capturing system according to the fourth embodiment of the present invention.
Figure 4B:
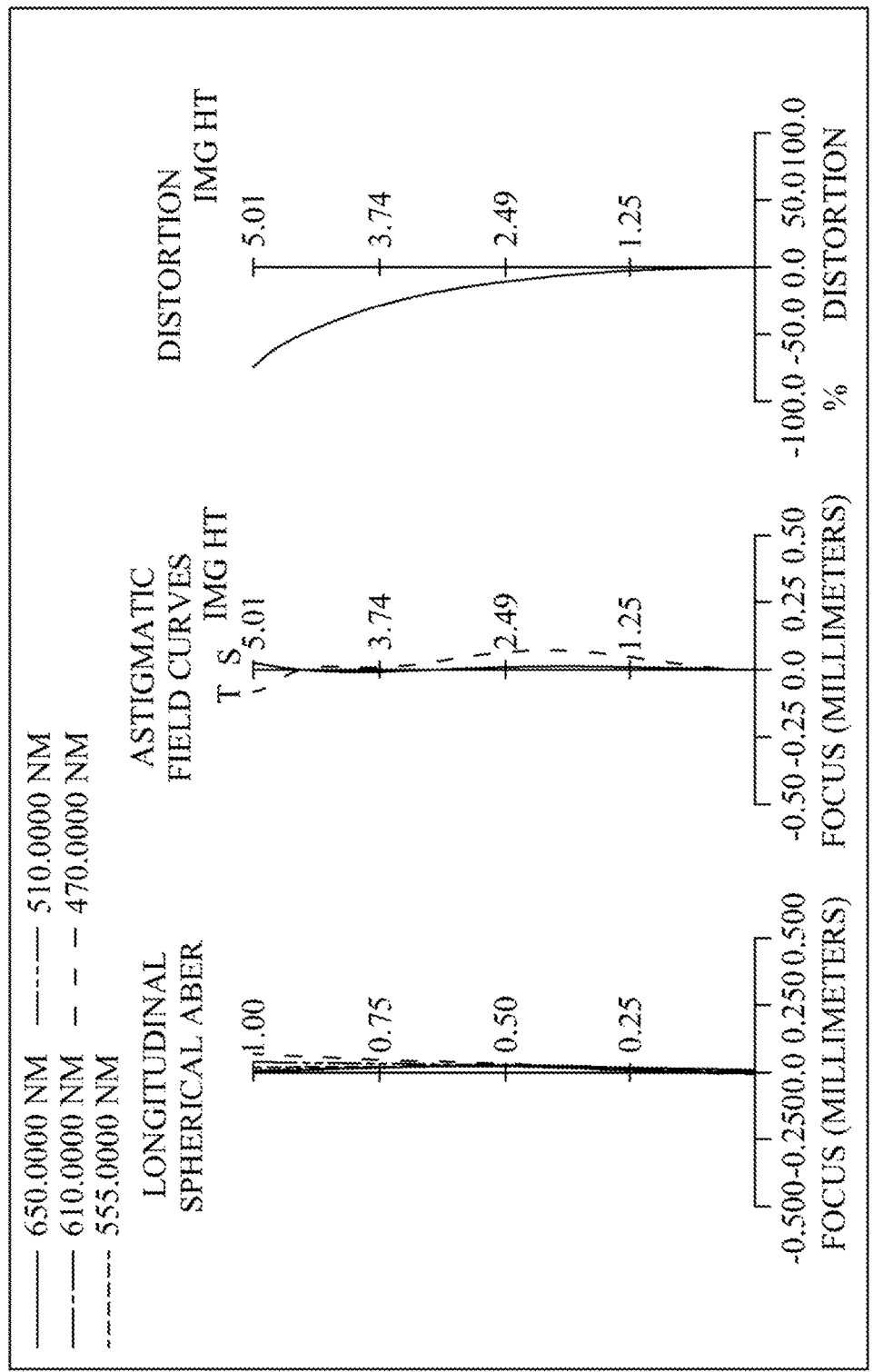
FIG. 4B shows the longitudinal spherical aberration curves, astigmatic field curves, and optical distortion curve of the optical image capturing system in the order from left to right according to the fourth embodiment of the present invention.
Figure 4C:
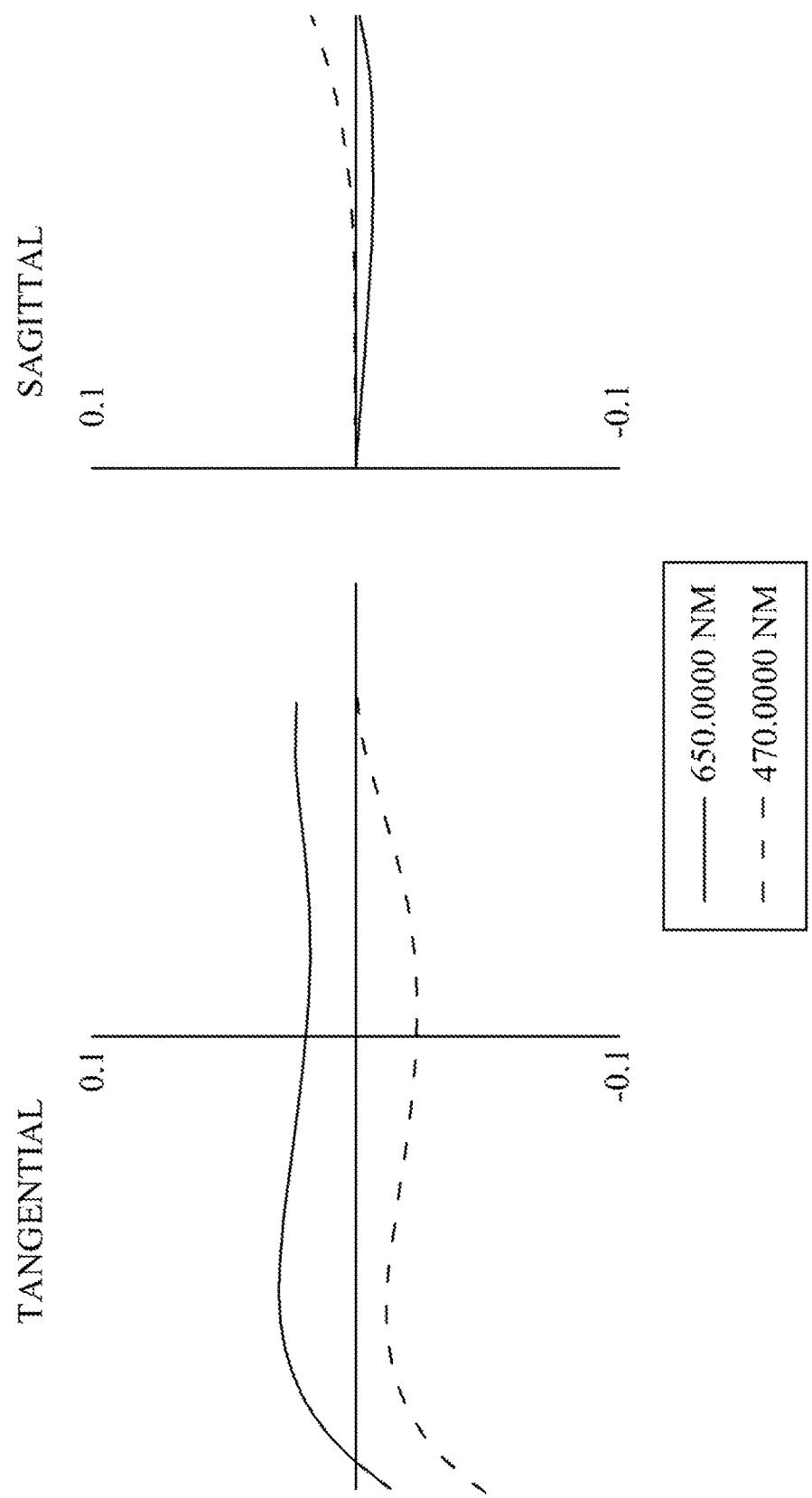
FIG. 4C shows the sagittal fan and the tangential fan of the optical image capturing system and the lateral aberration diagram of the longest operation wavelength and the shortest operation wavelength passing thorough the margin of the aperture at 0.7 field of view according to the fourth embodiment of the present invention.
Figure 4D:
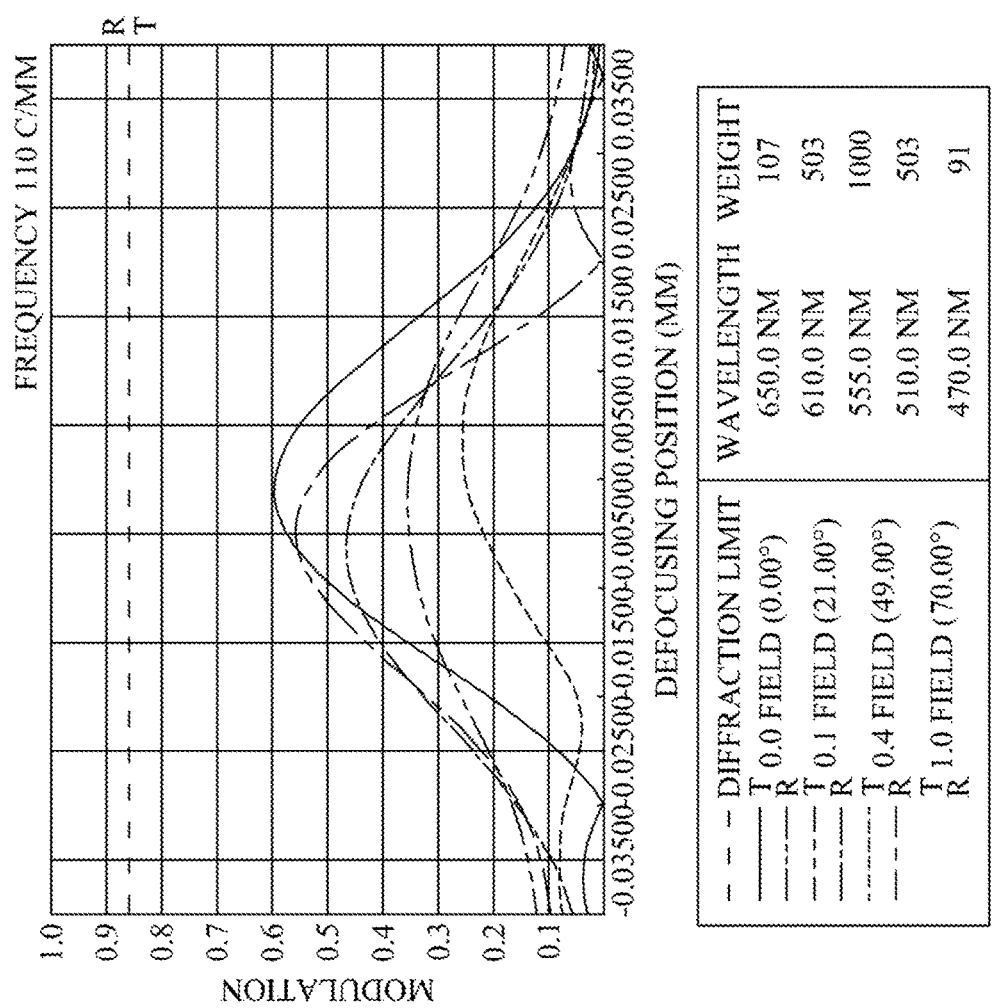
FIG. 4D is a diagram showing the through focus MTF values of the visible light spectrum at the central field of view, 0.3 field of view, and 0.7 field of view of the fourth embodiment of the present invention.
Figure 4E:
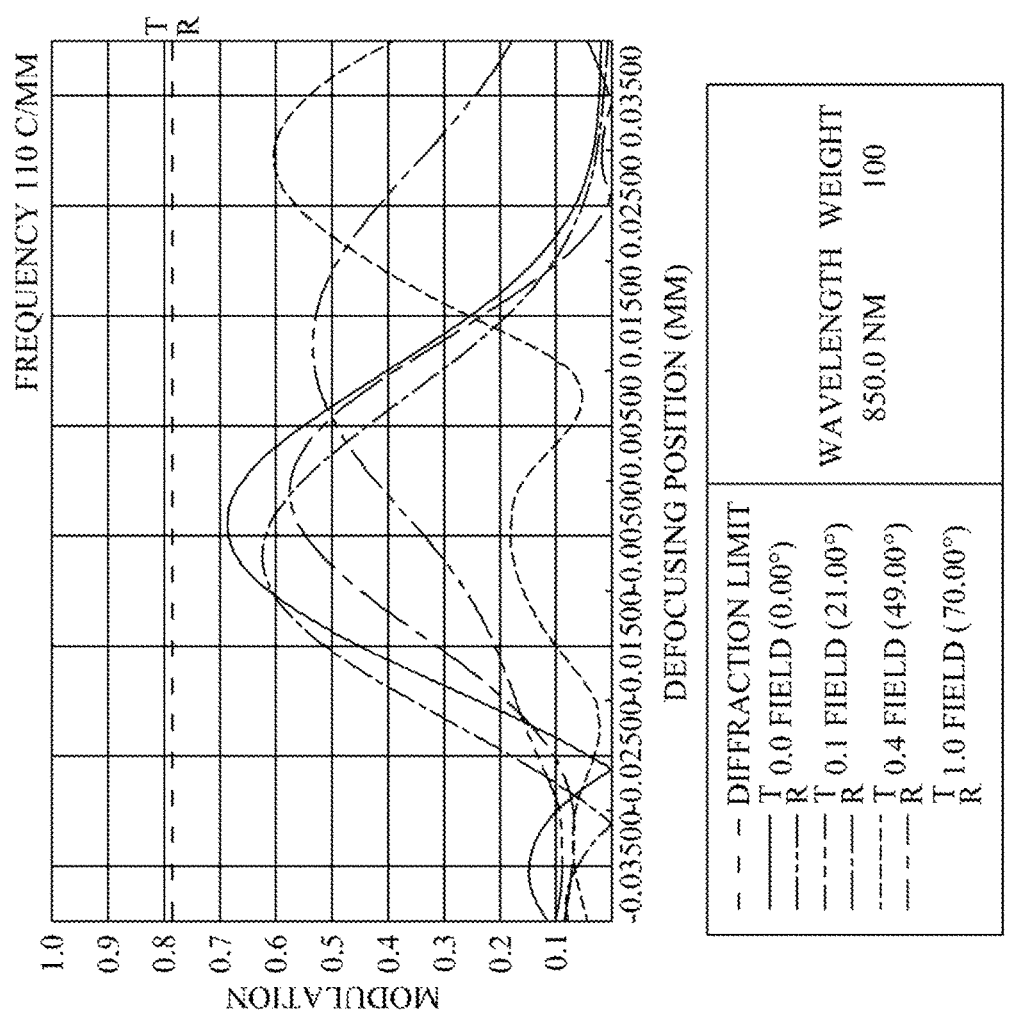
FIG. 4E is a diagram showing the through focus MTF values of the infrared light spectrum at the central field of view, 0.3 field of view, and 0.7 field of view of the fourth embodiment of the present invention.

Please refer to FIGS. 4A to 4E. FIG. 4A is a schematic view of the optical image capturing system according to the fourth embodiment of the present invention. FIG. 4B shows the longitudinal spherical aberration curves, astigmatic field curves, and optical distortion curve of the optical image capturing system, in the order from left to right, according to the fourth embodiment of the present invention. FIG. 4C shows the lateral aberration diagram of the optical image capturing system at 0.7 field of view according to the fourth embodiment of the present invention. FIG. 4D is a diagram showing the through focus MTF values of the visible light spectrum at the central field of view, 0.3 field of view, and 0.7 field of view of the fourth embodiment of the present invention. FIG. 4E is a diagram showing the through focus MTF values of the infrared light spectrum at the central field of view, 0.3 field of view, and 0.7 field of view of the fourth embodiment of the present invention.

As shown in FIG. 4A, in the order from the object side to the image side, the optical image capturing system includes a first lens 410, a second lens 420, an aperture 400, a third lens 430, a fourth lens 440, a fifth lens 450, a sixth lens 460, an IR-bandstop filter 480, a first image plane 490, and an image sensing device 492. In the fourth embodiment of the present invention, the rays of any field of view can be further divided into sagittal ray and tangential ray, and the spatial frequency of 55 cycles/mm serves as the benchmark for evaluating the focus shifts and the MTF values. The fourth embodiment of the present invention takes 850 nm as the infrared light wavelength.

The first lens 410 has negative refractive power and is made of glass material. The object side 412 of the first lens 410 is a convex surface and the image side 414 of the first lens 410 is a concave surface, and the object side 412 and the image side 414 of the first lens 410 are both aspheric.

The second lens 420 has positive refractive power and is made of glass material. The object side 422 of the second lens 420 is a concave surface and the image side 424 of the second lens 420 is a convex surface, and the object side 422 and the image side 424 of the second lens 420 are both aspheric. The image side 424 of the second lens 420 has one inflection point.

The third lens 430 has positive refractive power and is made of glass material. The object side 432 of the third lens 430 is a concave surface and the image side 434 of the third lens 430 is a convex surface, and the object side 432 and the image side 434 of the third lens 430 are both aspheric.

The fourth lens 440 has positive refractive power and is made of glass material. The object side 442 of the fourth lens 440 is a convex surface and the image side 444 of the fourth lens 440 is a convex surface, and the object side 442 and an image side 444 of the fourth lens 440 are both aspheric. The image side 444 of the fourth lens 440 has one inflection point.

The fifth lens 450 has positive refractive power and is made of glass material. The object side 452 of the fifth lens 450 is a concave surface and the image side 454 of the fifth lens 450 is a convex surface, and the object side 452 and the image side 454 of the fifth lens 450 are both aspheric. The object side 452 of the fifth lens 450 has two inflection points. The image side 454 of the fifth lens 450 has one inflection point.

The sixth lens 460 has negative refractive power and is made of glass material. The object side 462 of the sixth lens 460 is a concave surface and the image side 464 of the sixth lens 460 is a convex surface, and the object side 462 and an image side 464 of the sixth lens 460 are both aspheric. Hereby, this configuration is beneficial to shorten the back focal length of the optical image capturing system so as to keep its miniaturization. Besides, the incident angle of the off-axis rays can be reduced effectively, thereby further correcting the off-axis aberration.

The IR-bandstop filter 480 is made of glass material and is disposed between the sixth lens 460 and the first image plane 490. The IR-bandstop filter 480 does not affect the focal length of the optical image capturing system.

Table 7 and Table 8 below should be incorporated into the reference of the present embodiment.

TABLE 7

Lens Parameters for the Fourth Embodiment
f (focal length) = 3.494 mm; f/HEP = 1.8; HAF (half angle of view) = 80 deg

| Surface No | | Curvature Radius | Thickness (mm) | Material | Refractive Index | Coefficient of Dispersion | Focal Length |
|---|---|---|---|---|---|---|---|
| 0 | Object | 1E+18 | 1E+18 | | | | |
| 1 | First Lens | 47.83874974 | 2.000 | Glass | 1.702 | 41.15 | −8.33029 |
| 2 | | 5.093998161 | 4.604 | | | | |
| 3 | Second Lens | −62.47132045 | 9.008 | Glass | 2.002 | 19.32 | 210.063 |
| 4 | | −51.49724991 | 0.200 | | | | |
| 5 | Aperture | 1E+18 | 0.525 | | | | |
| 6 | Third Lens | −8.49338434 | 3.782 | Glass | 1.497 | 81.56 | 13.0829 |
| 7 | | −4.219891859 | 0.200 | | | | |
| 8 | Fourth Lens | 14.73946027 | 4.956 | Glass | 1.497 | 81.56 | 9.79205 |
| 9 | | −6.43052881 | 0.200 | | | | |
| 10 | Fifth Lens | −80.76094682 | 4.449 | Glass | 1.497 | 81.56 | 12.9782 |

TABLE 7-continued

Lens Parameters for the Fourth Embodiment
f (focal length) = 3.494 mm; f/HEP = 1.8; HAF (half angle of view) = 80 deg

| Surface No | | Curvature Radius | Thickness (mm) | Material | Refractive Index | Coefficient of Dispersion | Focal Length |
|---|---|---|---|---|---|---|---|
| 11 | | −6.067266679 | 0.101 | | | | |
| 12 | Sixth Lens | −6.432499639 | 2.000 | Glass | 2.002 | 19.32 | −6.80461 |
| 13 | | −161.8418547 | 0.975 | | | | |
| 14 | IR-bandstop Filter | 1E+18 | 1.200 | BK_7 | 1.517 | 64.13 | |
| 15 | | 1E+18 | 0.800 | | | | |
| 16 | First Image Plane | 1E+18 | 0.000 | | | | |

Reference Wavelength = 555 nm; Shield Position: The 9th surface with effective aperture radius = 5.250 mm

TABLE 8

The Aspheric Coefficients of the Fourth Embodiment
Table 8: Aspheric Coefficients

| | Surface No | | | | | | |
|---|---|---|---|---|---|---|---|
| | 1 | 2 | 3 | 4 | 6 | 7 | 8 |
| k | 0.000000E+00 | 0.000000E+00 | 0.000000E+00 | 0.000000E+00 | 0.000000E+00 | 0.000000E+00 | 0.000000E+00 |
| A4 | 1.631296E−04 | −5.562694E−04 | −4.171670E−04 | 1.620696E−03 | 1.021772E−03 | 5.798220E−04 | −1.141554E−03 |
| A6 | −1.544068E−07 | −9.346227E−10 | 1.821172E−05 | −1.242134E−05 | −1.492844E−04 | 2.459098E−05 | 2.801288E−05 |
| A8 | 0.000000E+00 | −3.849725E−17 | −4.532436E−07 | 1.397579E−05 | 1.119642E−05 | 5.600989E−07 | −2.012977E−07 |
| A10 | 0.000000E+00 | 0.000000E+00 | 0.000000E+00 | 0.000000E+00 | 0.000000E+00 | 0.000000E+00 | 0.000000E+00 |

| | Surface No | | | | |
|---|---|---|---|---|---|
| | 9 | 10 | 11 | 12 | 13 |
| k | 0.000000E+00 | 0.000000E+00 | 0.000000E+00 | 0.000000E+00 | 0.000000E+00 |
| A4 | 7.890995E−04 | 1.764937E−03 | 5.240971E−04 | −1.594470E−03 | −5.248986E−04 |
| A6 | −1.653208E−05 | −2.579581E−05 | −2.630670E−05 | 1.114888E−04 | 8.623637E−06 |
| A8 | 7.993127E−07 | −3.217421E−07 | 2.372252E−06 | −3.654260E−07 | 0.000000E+00 |
| A10 | 0.000000E+00 | 0.000000E+00 | 0.000000E+00 | 0.000000E+00 | 0.000000E+00 |

In the fourth embodiment, the form of the aspheric surface equation is similar to that in the first embodiment. Besides, the definitions of parameters in following tables are similar to those in the first embodiment, so the repetitive details will not be given here.

The following values for the conditional expressions can be obtained from the data in Table 7 and Table 8.

| Fourth Embodiment (Primary Reference Wavelength = 587.5 nm) | | | | | |
|---|---|---|---|---|---|
| \|f/f1\| | \|f/f2\| | \|f/f3\| | \|f/f4\| | \|f/f5\| | \|f/f6\| |
| 0.41945 | 0.01663 | 0.26708 | 0.35684 | 0.26923 | 0.51350 |
| ΣPPR | ΣNPR | ΣPPR/\|ΣNPR\| | IN12/f | IN56/f | TP4/(IN34 + TP4 + IN45) |
| 0.98941 | 0.43609 | 2.26882 | 1.31755 | 0.02904 | 0.92531 |
| \|f1/f2\| | \|f2/f3\| | (TP1 + IN12)/TP2 | | (TP6 + IN56)/TP5 | |
| 0.03966 | 16.05630 | 0.73307 | | 0.47234 | |
| HOS | InTL | HOS/HOI | InS/HOS | ODT % | TDT % |
| 35.00000 | 32.02460 | 7.00000 | 0.54823 | −75.15850 | 58.76930 |

-continued

| Fourth Embodiment (Primary Reference Wavelength = 587.5 nm) | | | | | |
|---|---|---|---|---|---|
| HVT51 | HVT52 | HVT61 | HVT62 | HVT62/HOI | HVT62/HOS |
| 1.35268 | 5.21748 | 5.23567 | 0.00000 | 0.00000 | 0.00000 |
| TP2/TP3 | TP3/TP4 | InRS61 | InRS62 | \| InRS61 \|/TP6 | \| InRS62 \|/TP6 |
| 2.38211 | 0.76309 | −1.77989 | −0.32977 | 0.88995 | 0.16488 |
| PSTA | PLTA | NSTA | NLTA | SSTA | SLTA |
| −0.039 mm | −0.003 mm | −0.011 mm | 0.005 mm | 0.006 mm | −0.013 mm |
| VSFS0 | VSFS3 | VSFS7 | VTFS0 | VTFS3 | VTFS7 |
| 0.025 | 0.015 | −0.010 | 0.025 | 0.020 | 0.005 |
| VSMTF0 | VSMTF3 | VSMTF7 | VTMTF0 | VTMTF3 | VTMTF7 |
| 0.864 | 0.782 | 0.842 | 0.864 | 0.558 | 0.408 |
| ISFS0 | ISFS3 | ISFS7 | ITFS0 | ITFS3 | ITFS7 |
| 0.025 | 0.015 | −0.010 | 0.025 | 0.025 | 0.030 |
| ISMTF0 | ISMTF3 | ISMTF7 | ITMTF0 | ITMTF3 | ITMTF7 |
| 0.787 | 0.643 | 0.777 | 0.787 | 0.473 | 0.819 |
| FS | AIFS | AVFS | AFS | | |
| 0.000 | 0.018 | 0.013 | 0.005 | | |

The following values about the length of the outline curve can be obtained from the data in Table 7 and Table 8.

| Fourth Embodiment (Primary Reference Wavelength = 555 nm) | | | | | | |
|---|---|---|---|---|---|---|
| ARE | ½(HEP) | ARE value | ARE − ½(HEP) | 2 (ARE/HEP) % | TP | ARE/TP (%) |
| 11 | 0.976 | 0.976 | −0.00002 | 100.00% | 2.000 | 48.80% |
| 12 | 0.976 | 0.982 | 0.00591 | 100.61% | 2.000 | 49.10% |
| 21 | 0.976 | 0.976 | −0.00004 | 100.00% | 9.008 | 10.83% |
| 22 | 0.976 | 0.976 | −0.00005 | 99.99% | 9.008 | 10.83% |
| 31 | 0.976 | 0.978 | 0.00200 | 100.20% | 3.782 | 25.86% |
| 32 | 0.976 | 0.985 | 0.00873 | 100.89% | 3.782 | 26.04% |
| 41 | 0.976 | 0.977 | 0.00057 | 100.06% | 4.956 | 19.71% |
| 42 | 0.976 | 0.980 | 0.00361 | 100.37% | 4.956 | 19.77% |
| 51 | 0.976 | 0.976 | −0.00008 | 99.99% | 4.449 | 21.94% |
| 52 | 0.976 | 0.980 | 0.00411 | 100.42% | 4.449 | 22.03% |
| 61 | 0.976 | 0.980 | 0.00386 | 100.40% | 2.000 | 49.00% |
| 62 | 0.976 | 0.976 | −0.00008 | 99.99% | 2.000 | 48.80% |
| ARS | EHD | ARS value | ARS − EHD | (ARS/EHD) % | TP | ARE/TP (%) |
| 11 | 10.879 | 11.681 | 0.80196 | 107.37% | 2.000 | 584.07% |
| 12 | 5.058 | 7.111 | 2.05263 | 140.58% | 2.000 | 355.54% |
| 21 | 4.882 | 4.900 | 0.01733 | 100.35% | 9.008 | 54.39% |
| 22 | 2.423 | 2.423 | 0.00013 | 100.01% | 9.008 | 26.90% |
| 31 | 2.347 | 2.375 | 0.02737 | 101.17% | 3.782 | 62.79% |
| 32 | 3.570 | 4.146 | 0.57643 | 116.15% | 3.782 | 109.65% |
| 41 | 4.754 | 4.781 | 0.02678 | 100.56% | 4.956 | 96.47% |
| 42 | 5.250 | 5.711 | 0.46086 | 108.78% | 4.956 | 115.24% |
| 51 | 5.473 | 5.508 | 0.03504 | 100.64% | 4.449 | 123.79% |
| 52 | 5.588 | 5.979 | 0.39112 | 107.00% | 4.449 | 134.40% |
| 61 | 5.615 | 6.001 | 0.38640 | 106.88% | 2.000 | 300.06% |
| 62 | 5.563 | 5.580 | 0.01652 | 100.30% | 2.000 | 278.99% |

The following values for the conditional expressions can be obtained from the data in Table 7 and Table 8.

Values Related to Inflection Point of Fourth Embodiment
(Primary Reference Wavelength = 555 nm)

| | | | | | | | | |
|---|---|---|---|---|---|---|---|---|
| HIF221 | 0.9897 | HIF221/HOI | 0.1979 | SGI221 | −0.0080 | \|SGI221\|/(\|SGI221\| + TP2) | 0.0009 |
| HIF421 | 4.9933 | HIF421/HOI | 0.9987 | SGI421 | −1.8354 | \|SGI421\|/(\|SGI421\| + TP4) | 0.2703 |
| HIF511 | 0.7735 | HIF511/HOI | 0.1547 | SGI511 | −0.0031 | \|SGI511\|/(\|SGI511\| + TP5) | 0.0007 |
| HIF512 | 4.3031 | HIF512/HOI | 0.8606 | SGI512 | 0.2888 | \|SGI512\|/(\|SGI512\| + TP5) | 0.0610 |
| HIF521 | 3.8629 | HIF521/HOI | 0.7726 | SGI521 | −1.2417 | \|SGI521\|/(\|SGI521\| + TP5) | 0.2182 |
| HIF611 | 3.6124 | HIF611/HOI | 0.7225 | SGI611 | −1.1445 | \|SGI611\|/(\|SGI611\| + TP6) | 0.3640 |
| HIF621 | 5.0294 | HIF621/HOI | 1.0059 | SGI621 | −0.2744 | \|SGI621\|/(\|SGI621\| + TP6) | 0.1207 |

Fifth Embodiment

Figure 5A:
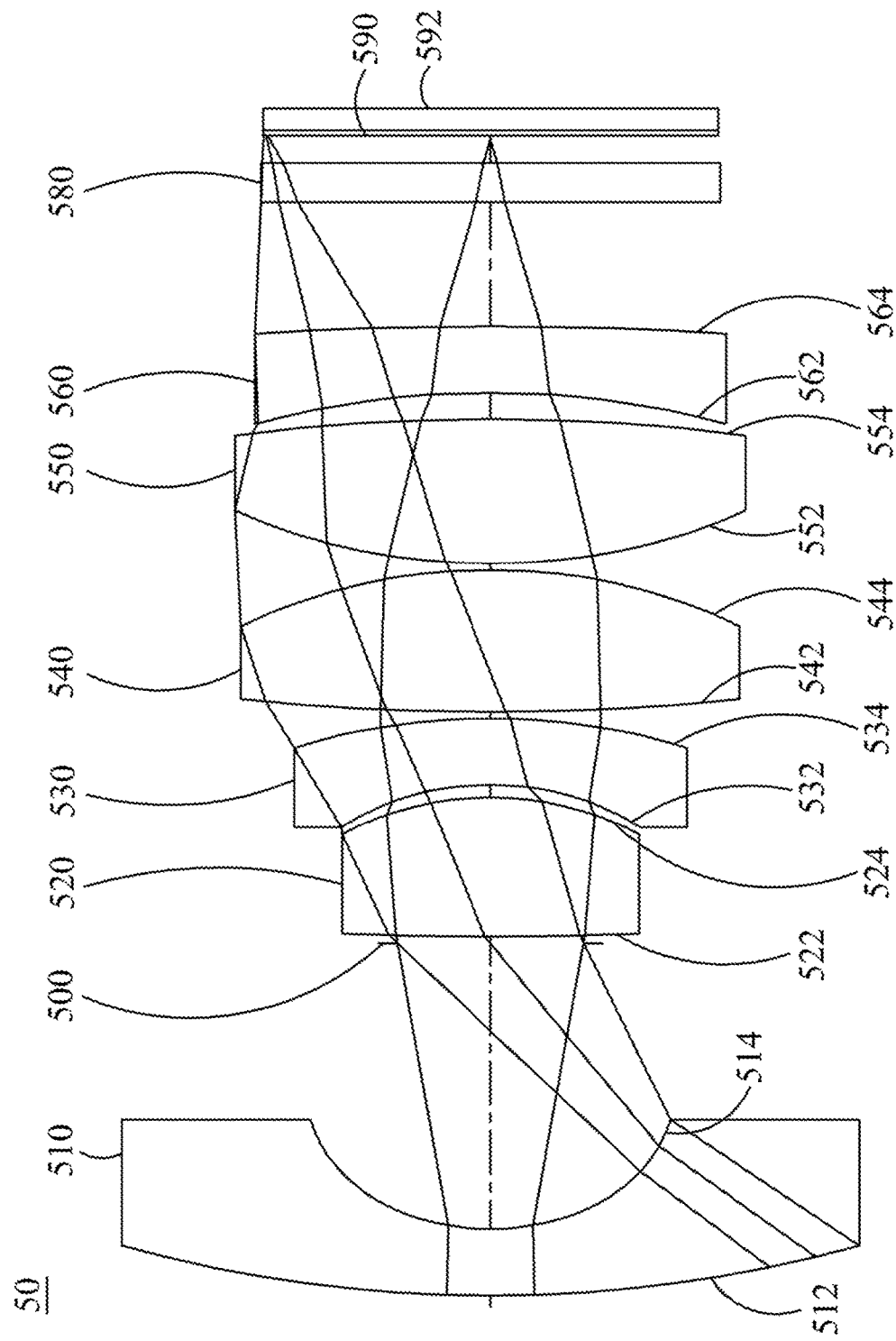
FIG. 5A is a schematic view of the optical image capturing system according to the fifth embodiment of the present invention.
Figure 5B:
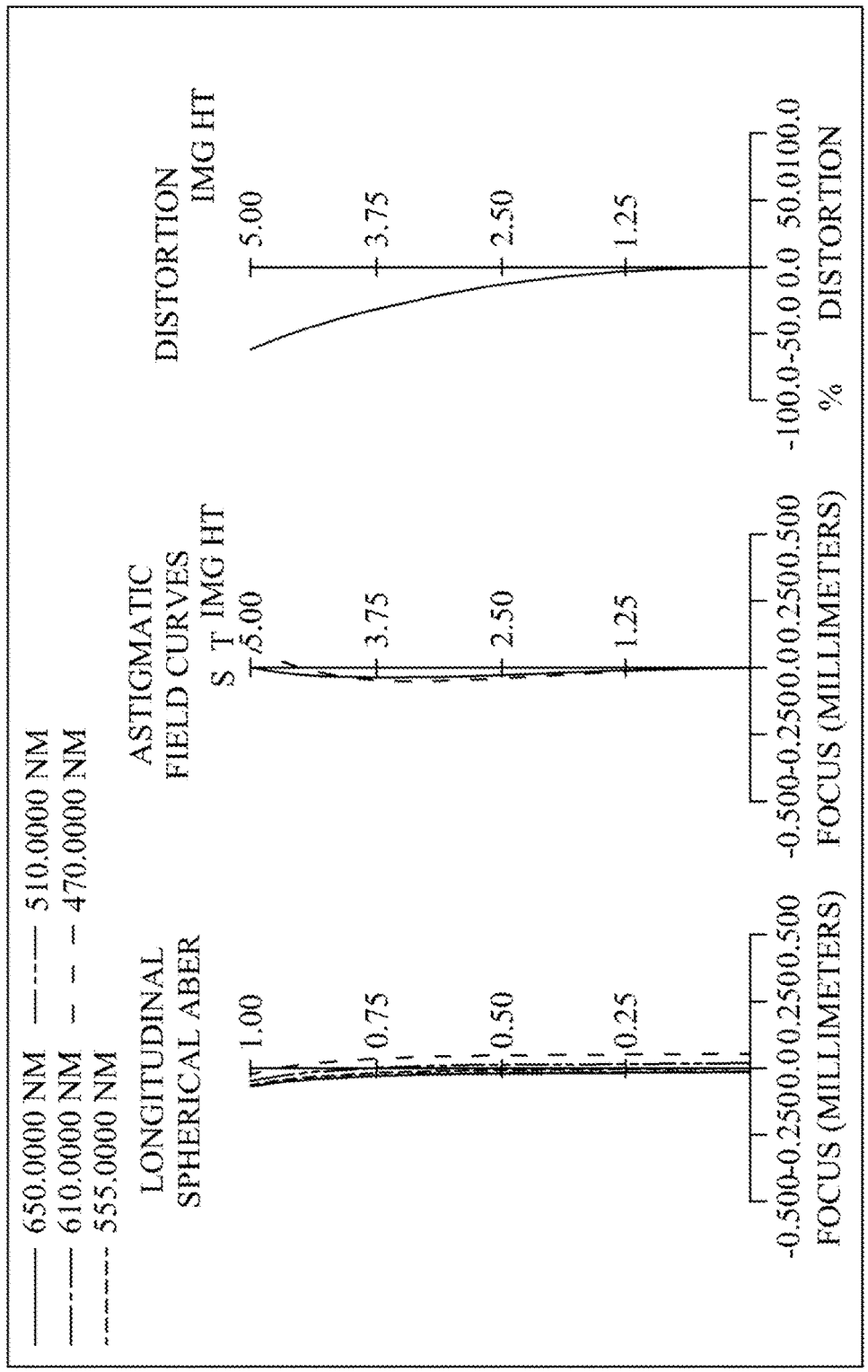
FIG. 5B shows the longitudinal spherical aberration curves, astigmatic field curves, and optical distortion curve of the optical image capturing system in the order from left to right according to the fifth embodiment of the present invention.
Figure 5C:
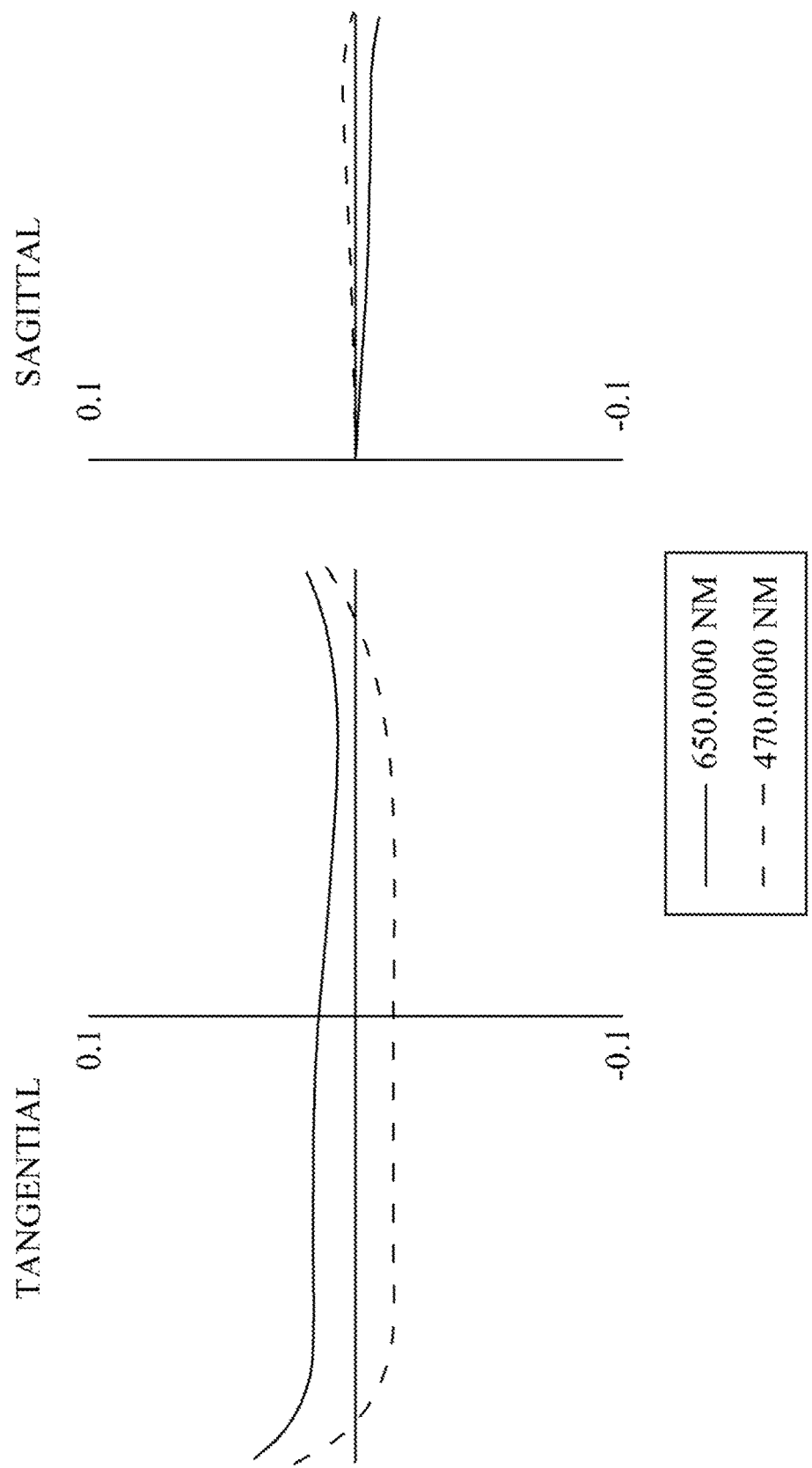
FIG. 5C shows the sagittal fan and the tangential fan of the optical image capturing system and the lateral aberration diagram of the longest operation wavelength and the shortest operation wavelength passing thorough the margin of the stop at 0.7 field of view according to the fifth embodiment of the present invention.
Figure 5D:
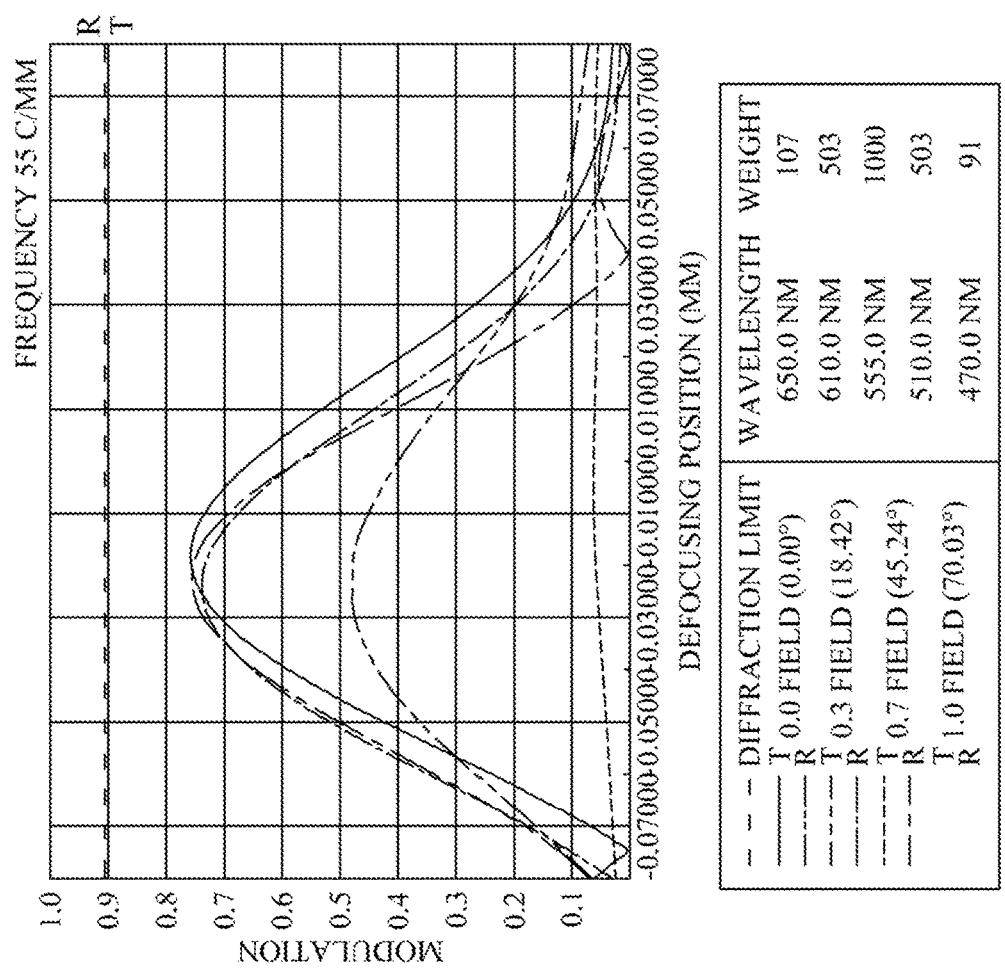
FIG. 5D is a diagram showing the through focus MTF values of the visible light spectrum at the central field of view, 0.3 field of view, and 0.7 field of view of the fifth embodiment of the present invention.
Figure 5E:
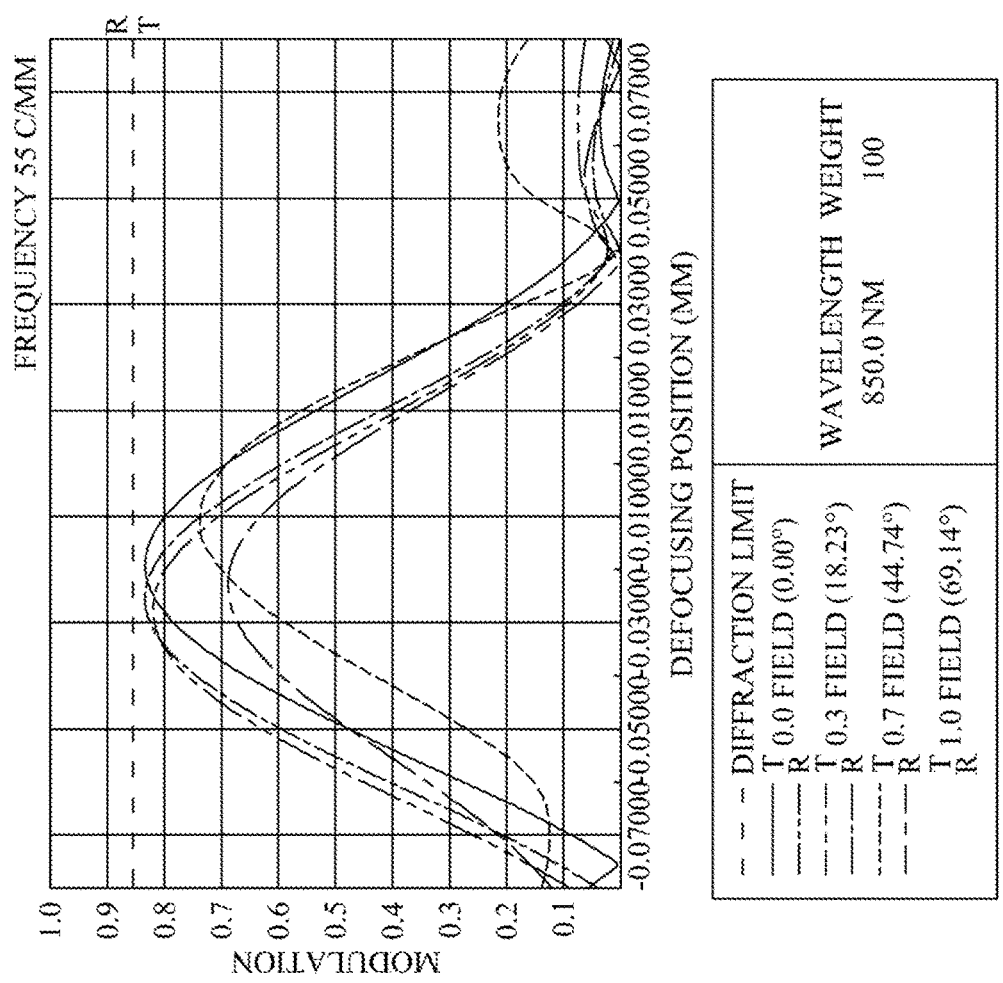
FIG. 5E is a diagram showing the through focus MTF values of the infrared light spectrum at the central field of view, 0.3 field of view, and 0.7 field of view of the fifth embodiment of the present invention.

Please refer to FIGS. 5A to 5E. FIG. 5A is a schematic view of the optical image capturing system according to the fifth embodiment of the present invention. FIG. 5B shows the longitudinal spherical aberration curves, astigmatic field curves, and optical distortion curve of the optical image capturing system, in the order from left to right, according to the fifth embodiment of the present invention. FIG. 5C shows the lateral aberration diagram of the optical image capturing system at 0.7 field of view according to the fifth embodiment of the present invention. FIG. 5D is a diagram showing the through focus MTF values of the visible light spectrum at the central field of view, 0.3 field of view and 0.7 field of view of the fifth embodiment of the present invention. FIG. 5E is a diagram showing the through focus MTF values of the infrared light spectrum at the central field of view, 0.3 field of view, and 0.7 field of view of the fifth embodiment of the present invention.

As shown in FIG. 5A, in the order from an object side to an image side, the optical image capturing system includes a first lens 510, an aperture 500, a second lens 520, a third lens 530, a fourth lens 540, a fifth lens 550, a sixth lens 560, an IR-bandstop filter 580, a first image plane 590, and an image sensing device 592. In the fifth embodiment of the present invention, the rays of any field of view can be further divided into sagittal ray and tangential ray, and the spatial frequency of 55 cycles/mm serves as the benchmark for evaluating the focus shifts and the MTF values. The fifth embodiment of the present invention takes 850 nm as the infrared light wavelength.

The first lens 510 has negative refractive power and is made of glass material. The object side 512 of the first lens 510 is a convex surface and the image side 514 of the first lens 510 is a concave surface, and the object side 512 and the image side 514 of the first lens 510 are both spherical.

The second lens 520 has positive refractive power and is made of glass material. The object side 522 of the second lens 520 is a convex surface and the image side 524 of the second lens 520 is a convex surface, and the object side 522 and the image side 524 of the second lens 520 are both spherical.

The third lens 530 has negative refractive power and is made of glass material. The object side 532 of the third lens 530 is a concave surface and the image side 534 of the third lens 530 is a convex surface, and object side 532 and image side 534 of the third lens 530 are both spherical.

The fourth lens 540 has positive refractive power and is made of glass material. The object side 542 of the fourth lens 540 is a convex surface and the image side 544 of the fourth lens 540 is a convex surface, and object side 542 and image side 544 of the fourth lens 540 are both spherical.

The fifth lens 550 has positive refractive power and is made of glass material. The object side 552 of the fifth lens 550 is a convex surface and the image side 554 of the fifth lens 550 is a convex surface, and object side 552 and image side 554 of the fifth lens 550 are both spherical.

The sixth lens 560 has negative refractive power and is made of glass material. The object side 562 of the sixth lens 560 is a, concave surface and the image side 564 of the sixth lens 560 is a convex surface, and the object side 562 and the image side 564 of the sixth lens 560 are both spherical. Hereby, this configuration is beneficial to shorten the back focal length of the optical image capturing system so as to keep its miniaturization. Besides, the incident angle of the off-axis rays can be reduced effectively, thereby further correcting the off-axis aberration.

The IR-bandstop filter 580 is made of glass material and is disposed between the sixth lens 560 and the first image plane 590 without affecting the focal length of the optical image capturing system.

Table 9 and Table 10 below should be incorporated into the reference of the present embodiment.

TABLE 9

Lens Parameters for the Fifth Embodiment
f (focal length) = 4.714 mm; f/HEP = 2.4; HAF (half angle of view) = 70 deg

| Surface No | | Curvature Radius | Thickness (mm) | Material | Refractive Index | Coefficient of Dispersion | Focal Length |
|---|---|---|---|---|---|---|---|
| 0 | Object | 1E+18 | 1E+18 | | | | |
| 1 | First Lens | 23.10516481 | 2.000 | Glass | 1.658 | 50.85 | −7.836 |
| 2 | | 4.084495136 | 8.628 | | | | |
| 3 | Aperture | 1E+18 | 0.200 | | | | |
| 4 | Second Lens | 62.62001215 | 4.198 | Glass | 1.806 | 33.27 | 6.351 |

TABLE 9-continued

Lens Parameters for the Fifth Embodiment
f (focal length) = 4.714 mm; f/HEP = 2.4; HAF (half angle of view) = 70 deg

| Surface No | | Curvature Radius | Thickness (mm) | Material | Refractive Index | Coefficient of Dispersion | Focal Length |
|---|---|---|---|---|---|---|---|
| 5 | | −5.44047608 | 0.394 | | | | |
| 6 | Third Lens | −4.893147528 | 2.000 | Glass | 2.002 | 19.32 | −10.253 |
| 7 | | −11.17259591 | 0.200 | | | | |
| 8 | Fourth Lens | 40.96588298 | 4.273 | Glass | 1.497 | 81.56 | 16.458 |
| 9 | | −9.89586665 | 0.200 | | | | |
| 10 | Fifth Lens | 10.87373192 | 4.359 | Glass | 1.497 | 81.56 | 16.939 |
| 11 | | −32.669358 | 0.795 | | | | |
| 12 | Sixth Lens | −14.99959297 | 2.000 | Glass | 2.002 | 19.32 | −19.980 |
| 13 | | −62.18124811 | 3.754 | | | | |
| 14 | IR-bandstop Filter | 1E+18 | 1.192 | BK_7 | 1.517 | 64.13 | |
| 15 | | 1E+18 | 0.808 | | | | |
| 16 | First Image Plane | 1E+18 | 0.000 | | | | |

Reference Wavelength = 555 nm

TABLE 10

The Aspheric Coefficients of the Fifth Embodiment
Table 10: Aspheric Coefficients

| | Surface No | | | | | | |
|---|---|---|---|---|---|---|---|
| | 1 | 2 | 4 | 5 | 6 | 7 | 8 |
| k | 0.000000E+00 | 0.000000E+00 | 0.000000E+00 | 0.000000E+00 | 0.000000E+00 | 0.000000E+00 | 0.000000E+00 |
| A4 | 0.000000E+00 | 0.000000E+00 | 0.000000E+00 | 0.000000E+00 | 0.000000E+00 | 0.000000E+00 | 0.000000E+00 |
| A6 | 0.000000E+00 | 0.000000E+00 | 0.000000E+00 | 0.000000E+00 | 0.000000E+00 | 0.000000E+00 | 0.000000E+00 |
| A8 | 0.000000E+00 | 0.000000E+00 | 0.000000E+00 | 0.000000E+00 | 0.000000E+00 | 0.000000E+00 | 0.000000E+00 |
| A10 | 0.000000E+00 | 0.000000E+00 | 0.000000E+00 | 0.000000E+00 | 0.000000E+00 | 0.000000E+00 | 0.000000E+00 |

| | Surface No | | | | |
|---|---|---|---|---|---|
| | 9 | 10 | 11 | 12 | 13 |
| k | 0.000000E+00 | 0.000000E+00 | 0.000000E+00 | 0.000000E+00 | 0.000000E+00 |
| A4 | 0.000000E+00 | 0.000000E+00 | 0.000000E+00 | 0.000000E+00 | 0.000000E+00 |
| A6 | 0.000000E+00 | 0.000000E+00 | 0.000000E+00 | 0.000000E+00 | 0.000000E+00 |
| A8 | 0.000000E+00 | 0.000000E+00 | 0.000000E+00 | 0.000000E+00 | 0.000000E+00 |
| A10 | 0.000000E+00 | 0.000000E+00 | 0.000000E+00 | 0.000000E+00 | 0.000000E+00 |

In the fifth embodiment, the form of the aspheric surface equation is similar to that in the first embodiment. Besides, the definitions of parameters in following tables are similar to those in the first embodiment, so the repetitive details will not be given here.

The following values for the conditional expressions can be obtained from the data in Table 9 and Table 10:

| Fifth Embodiment (Primary Reference Wavelength = 555 nm) | | | | | |
|---|---|---|---|---|---|
| $|f/f1|$ | $|f/f2|$ | $|f/f3|$ | $|f/f4|$ | $|f/f5|$ | $|f/f6|$ |
| 0.60153 | 0.74216 | 0.45974 | 0.28642 | 027829 | 0.23593 |

| $\Sigma PPR$ | $\Sigma NPR$ | $\Sigma PPR/|\Sigma NPR|$ | IN12/f | IN56/f | TP4/(IN34 + TP4 + IN45) |
|---|---|---|---|---|---|
| 0.98209 | 1.62198 | 0.60549 | 1.87271 | 0.16870 | 0.91440 |

Fifth Embodiment (Primary Reference Wavelength = 555 nm)

| |f1/f2| | |f2/f3| | (TP1 + IN12)/TP2 | | (TP6 + IN56)/TP5 | |
|---|---|---|---|---|---|
| 1.23379 | 0.61945 | 2.57928 | | 0.64129 | |
| HOS | InTL | HOS/HOI | InS/HOS | ODT % | TDT % |
| 35.00000 | 29.24600 | 7.00000 | 0.69635 | −61.45710 | 42.61570 |
| HVT51 | HVT52 | HVT61 | HVT62 | HVT62/HOI | HVT62/HOS |
| 0 | 0 | 0 | 0 | 0 | 0 |
| TP2/TP3 | TP3/TP4 | InRS61 | InRS62 | \|InRS61\|/TP6 | \|InRS62\|/TP6 |
| 2.09896 | 0.46809 | −0.92057 | −0.22141 | 0.46028 | 0.11070 |
| PSTA | PLTA | NSTA | NLTA | SSTA | SLTA |
| 0.011 mm | 0.018 mm | 0.023 mm | 0.038 mm | 0.001 mm | −0.009 mm |
| VSFS0 | VSFS3 | VSFS7 | VTFS0 | VTFS3 | VTFS7 |
| −0.020 | −0.025 | −0.025 | −0.020 | −0.025 | −0.005 |
| VSMTF0 | VSMTF3 | VSMTF7 | VTMTF0 | VTMTF3 | VTMTF7 |
| 0.757 | 0.739 | 0.755 | 0.757 | 0.481 | 0.064 |
| ISFS0 | ISFS3 | ISFS7 | ITFS0 | ITFS3 | ITFS7 |
| −0.020 | −0.025 | −0.025 | −0.020 | −0.030 | −0.010 |
| ISMTF0 | ISMTF3 | ISMTF7 | ITMTF0 | ITMTF3 | ITMTF7 |
| 0.833 | 0.834 | 0.686 | 0.833 | 0.818 | 0.739 |
| FS | AIFS | AVFS | AFS | | |
| 0.000 | −0.021 | −0.021 | 0.000 | | |

The following values about the length of the outline curve can be obtained from the data in Table, 9 and Table 10.

Fifth Embodiment (Primary Reference Wavelength = 555 nm)

| ARE | ½(HEP) | ARE value | ARE − ½(HEP) | 2 (ARE/HEP) % | TP | ARE/TP (%) |
|---|---|---|---|---|---|---|
| 11 | 0.992 | 0.992 | 0.00025 | 100.03% | 2.000 | 49.62% |
| 12 | 0.992 | 1.002 | 0.00996 | 101.00% | 2.000 | 50.10% |
| 21 | 0.992 | 0.992 | −0.00001 | 100.00% | 4.198 | 23.63% |
| 22 | 0.992 | 0.998 | 0.00552 | 100.56% | 4.198 | 23.76% |
| 31 | 0.992 | 0.999 | 0.00687 | 100.69% | 2.000 | 49.95% |
| 32 | 0.992 | 0.993 | 0.00125 | 100.13% | 2.000 | 49.67% |
| 41 | 0.992 | 0.992 | 0.00004 | 100.00% | 4.273 | 23.22% |
| 42 | 0.992 | 0.994 | 0.00161 | 100.16% | 4.273 | 23.26% |
| 51 | 0.992 | 0.993 | 0.00132 | 100.13% | 4.359 | 22.79% |
| 52 | 0.992 | 0.992 | 0.00010 | 100.01% | 4.359 | 22.76% |
| 61 | 0.992 | 0.993 | 0.00067 | 100.07% | 2.000 | 49.64% |
| 62 | 0.992 | 0.992 | −0.00001 | 100.00% | 2.000 | 49.60% |
| ARS | EHD | ARS value | ARS − EHD | (ARS/EHD) % | TP | ARS/TP (%) |
| 11 | 8.238 | 8.422 | 0.18472 | 102.24% | 2.000 | 421.11% |
| 12 | 4.017 | 5.667 | 1.64997 | 141.08% | 2.000 | 283.34% |
| 21 | 2.333 | 2.333 | −0.00004 | 100.00% | 4.198 | 55.56% |
| 22 | 3.369 | 3.633 | 0.26389 | 107.83% | 4.198 | 86.54% |
| 31 | 3.378 | 3.728 | 0.35040 | 110.37% | 2.000 | 186.42% |
| 32 | 4.460 | 4.588 | 0.12748 | 102.86% | 2.000 | 229.39% |
| 41 | 5.124 | 5.136 | 0.01288 | 100.25% | 4.273 | 120.22% |
| 42 | 5.646 | 6.008 | 0.36216 | 106.41% | 4.273 | 140.62% |
| 51 | 5.769 | 6.081 | 0.31193 | 105.41% | 4.359 | 139.51% |
| 52 | 5.369 | 5.393 | 0.02409 | 100.45% | 4.359 | 123.74% |

-continued

| Fifth Embodiment (Primary Reference Wavelength = 555 nm) | | | | | | |
|---|---|---|---|---|---|---|
| 61 | 5.263 | 5.377 | 0.11442 | 102.17% | 2.000 | 268.87% |
| 62 | 5.313 | 5.319 | 0.00635 | 100.12% | 2.000 | 265.97% |

The following values for the conditional expressions can be obtained from the data in Table 9 and Table 10.

| Values Related to Inflection Point of Fifth Embodiment (Primary Reference Wavelength = 555 nm) | | | | | | | |
|---|---|---|---|---|---|---|---|
| HIF411 | 0 | HIF411/HOI | 0 | SGI411 | 0 | \|SGI411\|/(\|SGI411\| + TP4) | 0 |

Sixth Embodiment

Figure 6A:
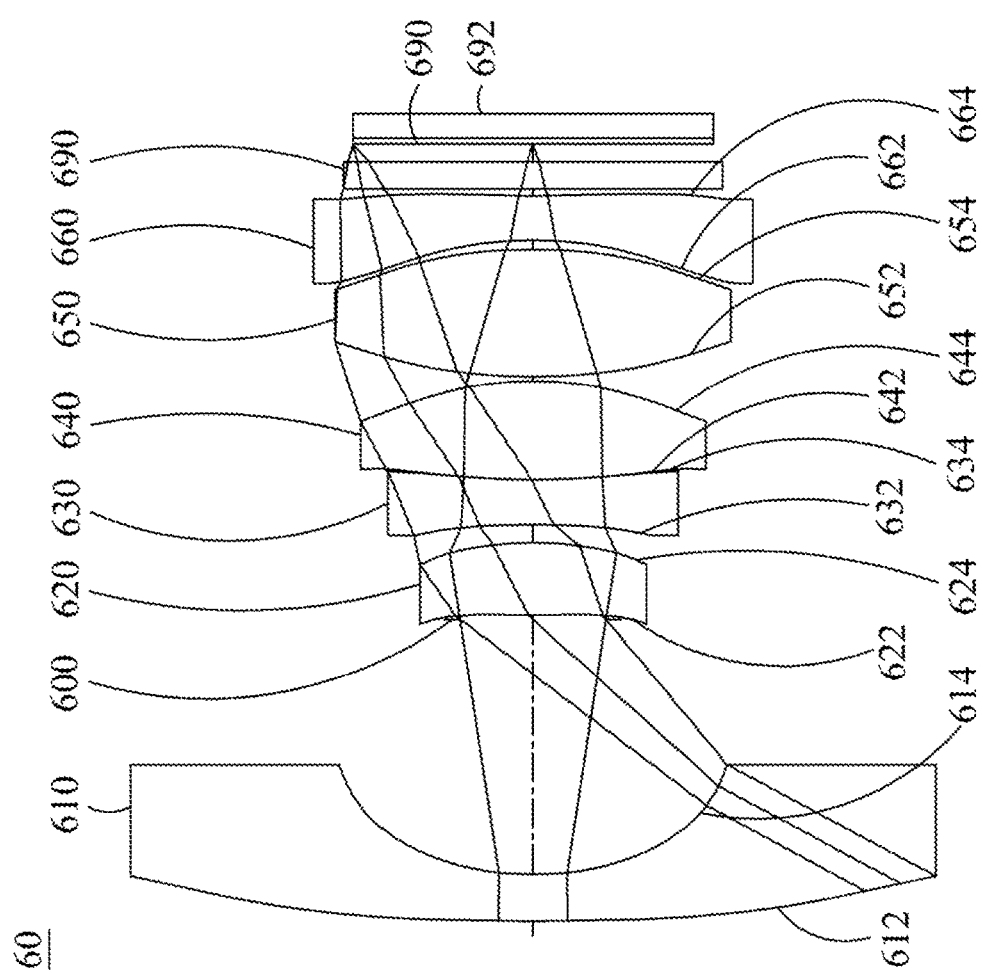
FIG. 6A is a schematic view of the optical image capturing system according to the sixth embodiment of the present invention.
Figure 6B:
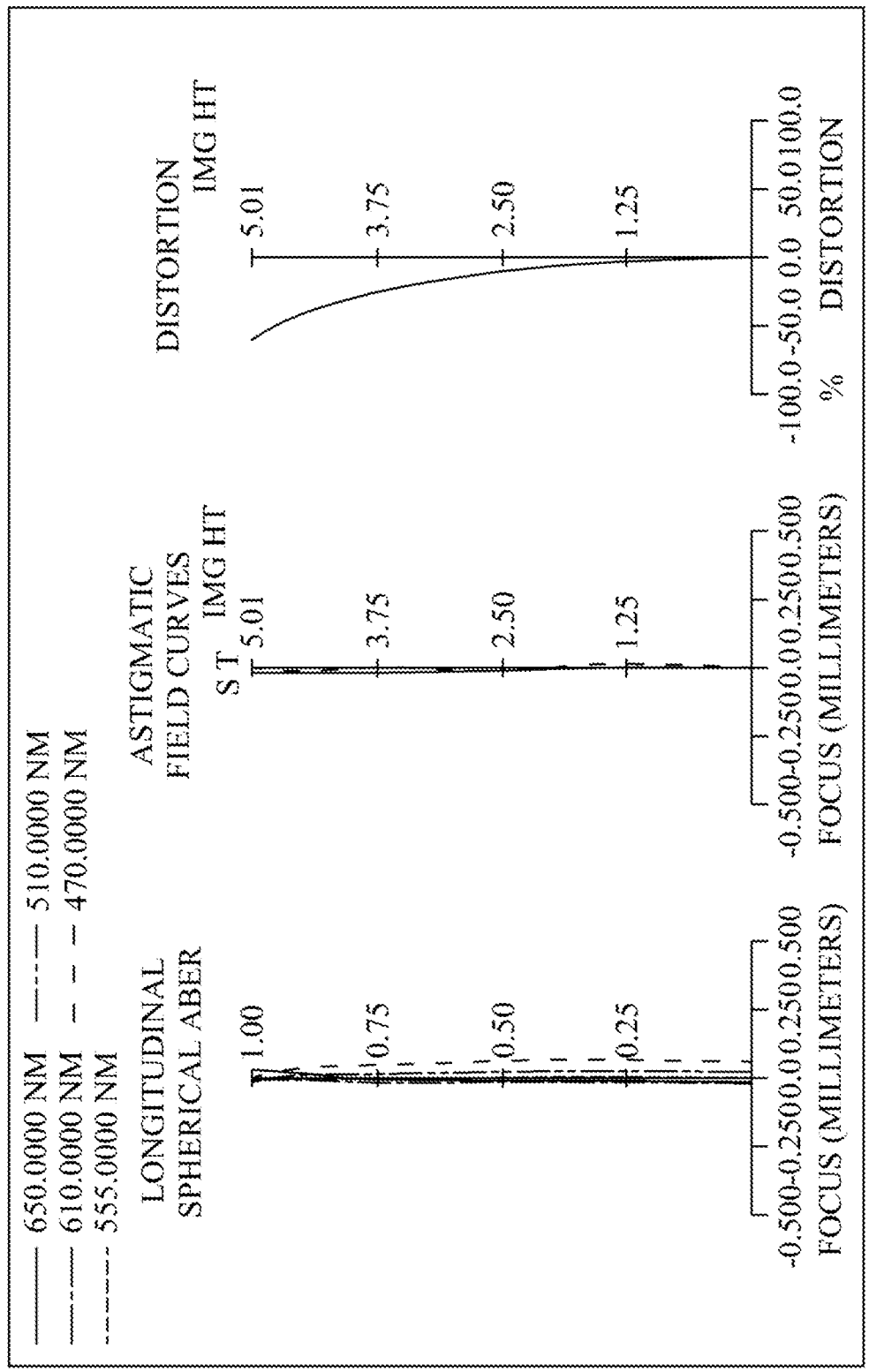
FIG. 6B shows the longitudinal spherical aberration curves, astigmatic field curves, and optical distortion curve of the optical image capturing system in the order from left to right according to the sixth embodiment of the present invention.
Figure 6C:
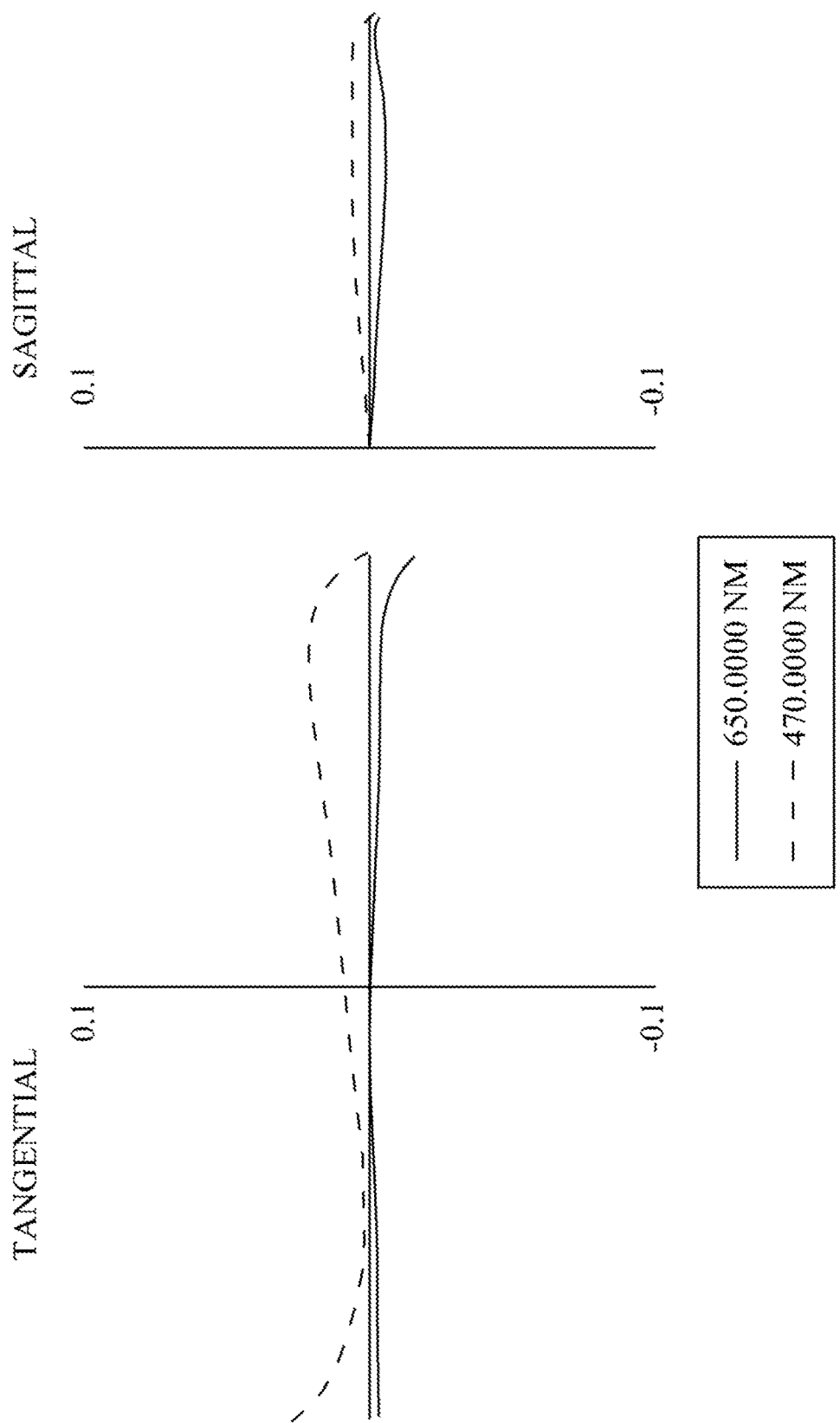
FIG. 6C shows the sagittal fan and the tangential fan of the optical image capturing system and the lateral aberration diagram of the longest operation wavelength and the shortest operation wavelength passing thorough the margin of the aperture at 0.7 field of view according to the sixth embodiment of the present invention.
Figure 6D:
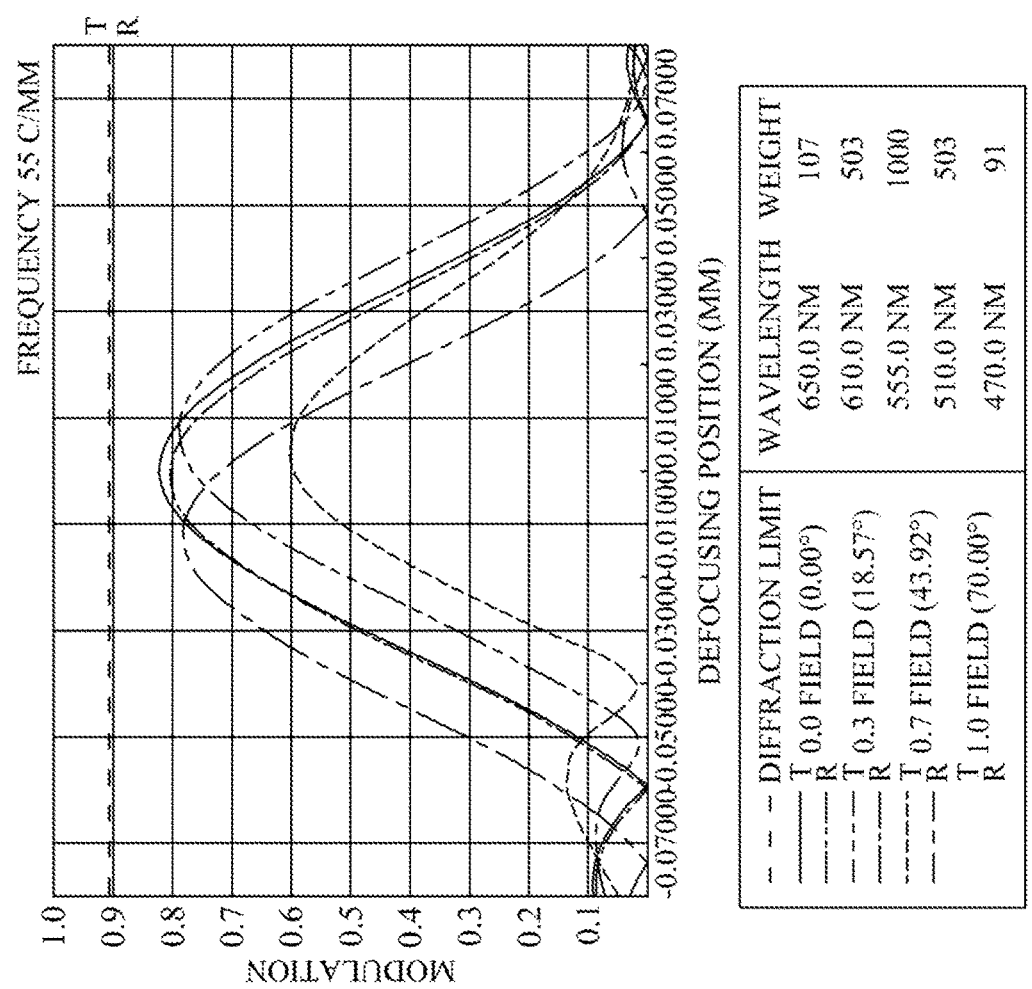
FIG. 6D is a diagram showing the through focus MTF values of the visible light spectrum at the central field of view, 0.3 field of view, and 0.7 field of view of the sixth embodiment of the present invention.
Figure 6E:
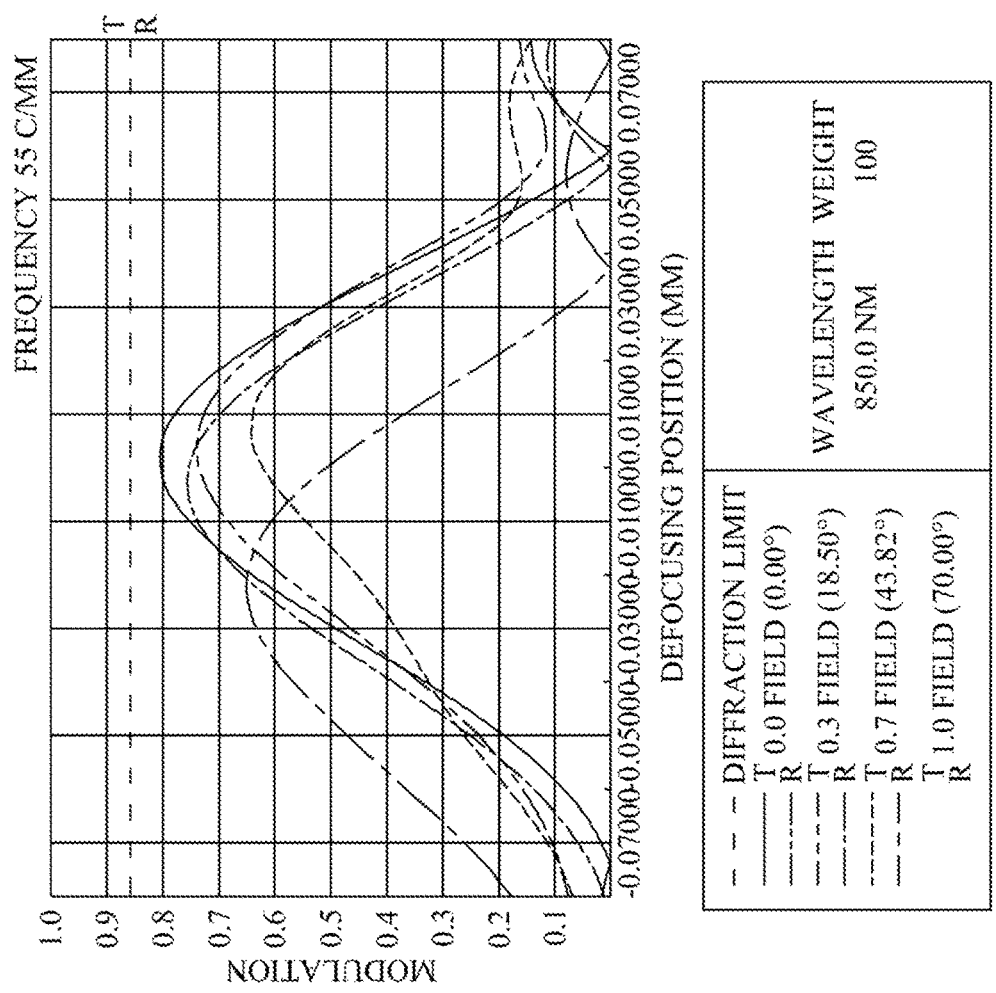
FIG. 6E is a diagram showing the through focus MTF values of the infrared light spectrum at the central field of view, 0.3 field of view, and 0.7 field of view of the sixth embodiment of the present disclosure.

Please refer to FIGS. 6A to 6E. FIG. 6A is a schematic view of the optical image capturing system according to the sixth embodiment of the present invention. FIG. 6B shows the longitudinal spherical aberration curves, astigmatic field curves, and optical distortion curve of the optical image capturing system, in the order from left to right, according to the sixth embodiment of the present invention. FIG. 6C shows the lateral aberration diagram of the optical image capturing system at 0.7 field of view according to the sixth embodiment of the present invention. FIG. 6D is a diagram showing the through focus MTF values of the visible light spectrum at the central field of view, 0.3 field of view, and 0.7 field of view of the sixth embodiment of the present invention. FIG. 6E is a diagram showing the through focus MTF values of the infrared light spectrum at the central field of view, 0.3 field of view, and 0.7 field of view of the sixth embodiment of the present invention.

As shown in FIG. 6A, in the order from an object side to an image side, the optical image capturing system includes a first lens 610, aperture 600; a second lens 620, an a third lens 630, a fourth lens 640, a fifth lens 650, a sixth lens 660, an IR-bandstop filter 680, a first image plane 690, and an image sensing device 692. In the sixth embodiment of the present invention, the rays of any field of view can be further divided into sagittal ray and tangential ray, and the spatial frequency of 55 cycles/mm serves as the benchmark for evaluating the focus shifts and the MTF values. The sixth embodiment of the present invention takes 850 nm as the infrared light wavelength.

The first lens 610 has negative refractive power and is made of glass material. The object side 612 of the first lens 610 is a convex surface and the image side 614 of the first lens 610 is a concave surface, and the object side 612 and the image side 614 of the first lens 610 are both aspheric. The object side 612 of the first lens 610 has one inflection point.

The second lens 620 has positive refractive power and is made of glass material. The object side 622 of the second lens 620 is a convex surface and the image side 624 of the second lens 620 is a convex surface, and the object side 622 and the image side 624 of the second lens 620 are both aspheric. The object side 622 of the second lens 620 has one inflection point.

The third lens 630 has negative refractive power and is made of glass material. The object side 632 of the third lens 630 is a concave surface and the image side 634 of the third lens 630 is a concave surface, and the object side 632 and the image side 634 of the third lens 630 are both aspheric. The image side 634 of the third lens 630 has one inflection point.

The fourth lens 640 has positive refractive power and is made of glass material. The object side 642 of the fourth lens 640 is a convex surface and the image side 644 of the fourth lens 640 is a convex surface, and the object side 642 and the image side 644 of the fourth lens 640 are both aspheric. The image side 644 and the object side 642 of the fourth lens 640 all have one inflection point.

The fifth lens 650 has positive refractive power and is made of glass material. The object side 652 of the fifth lens 650 is a convex surface and the image side 654 of the fifth lens 650 is a convex surface, and the object side 652 and the image side 654 of the fifth lens 650 are both aspheric. The object side 652 and the image side 654 of the fifth lens 650 all have one inflection point.

The sixth lens 660 has negative refractive power and is made of glass material. The object side 662 of the sixth lens 660 is a concave surface and the image side 664 of the sixth lens 660 is a concave surface, and the object side 662 and the image side 664 of the sixth lens 660 are aspheric. The object side 662 and the image side 664 of the sixth lens 660 all have one inflection point. Hereby, this configuration is beneficial to shorten the back focal length of the optical image capturing system so as to keep its miniaturization. Besides, the incident angle of the off-axis rays can be reduced effectively, thereby further correcting the off-axis aberration.

The IR-bandstop filter 680 is made of glass material and is disposed between the sixth lens 660 and the first image plane 690, without affecting the focal length of the optical image capturing system.

Table 11 and Table 12 below should be incorporated into the reference of the present embodiment.

TABLE 11

Lens Parameters for the Sixth Embodiment
f (focal length) = 4.633 mm; f/HEP = 2.4; HAF (half angle of view) = 70 deg

| Surface No | | Curvature Radius | Thickness (mDm) | Material | Refractive Index | Coefficient of Dispersion | Focal Length |
|---|---|---|---|---|---|---|---|
| 0 | Object | 1E+18 | 1E+18 | | | | |
| 1 | First Lens | 76.22024782 | 2.094 | Glass | 1.569 | 56.04 | −10.563 |
| 2 | | 5.493555726 | 11.498 | | | | |
| 3 | Aperture | 1E+18 | 0.200 | | | | |

TABLE 11-continued

Lens Parameters for the Sixth Embodiment
f (focal length) = 4.633 mm; f/HEP = 2.4; HAF (half angle of view) = 70 deg

| Surface No | | Curvature Radius | Thickness (mDm) | Material | Refractive Index | Coefficient of Dispersion | Focal Length |
|---|---|---|---|---|---|---|---|
| 4 | Second Lens | 233.7424655 | 3.249 | Glass | 1.904 | 31.32 | 7.548 |
| 5 | | −6.930187522 | 0.819 | | | | |
| 6 | Third Lens | −25.60651117 | 2.000 | Glass | 2.002 | 19.32 | −7.883 |
| 7 | | 11.67403806 | 0.019 | | | | |
| 8 | Fourth Lens | 13.10878197 | 4.442 | Glass | 1.517 | 64.20 | 8.721 |
| 9 | | −6.045001257 | 0.208 | | | | |
| 10 | Fifth Lens | 11.107377 | 5.728 | Glass | 1.517 | 64.20 | 11.538 |
| 11 | | −10.53708859 | 0.407 | | | | |
| 12 | Sixth Lens | −7.187644648 | 2.006 | Glass | 2.002 | 19.32 | −6.022 |
| 13 | | 39.985766 | 0.331 | | | | |
| 14 | IR-bandstop filter | 1E+18 | 1.192 | BK_7 | 1.517 | 64.13 | |
| 15 | | 1E+18 | 0.808 | | | | |
| 16 | First Image Plane | 1E+18 | 0.000 | | | | |

Reference Wavelength = 555 nm; Shield Position: The 12th surface with effective aperture radius = 6.108 mm

TABLE 12

The Aspheric Coefficients of the Sixth Embodiment
Table 12: Aspheric Coefficients

| | Surface No | | | | | | |
|---|---|---|---|---|---|---|---|
| | 1 | 2 | 4 | 5 | 6 | 7 | 8 |
| k | 0.000000E+00 | 0.000000E+00 | 0.000000E+00 | 0.000000E+00 | 0.000000E+00 | 0.000000E+00 | 0.000000E+00 |
| A4 | 1.981357E−04 | 2.761147E−04 | −2.060557E−03 | −2.885247E−03 | −3.808936E−03 | −1.473213E−03 | −7.430699E−04 |
| A6 | −1.340481E−06 | −6.527141E−06 | −5.808618E−05 | 1.238428E−04 | 1.507847E−04 | 3.642650E−05 | 3.759547E−05 |
| A8 | 2.877980E−09 | 6.215075E−07 | −1.898289E−05 | −7.844835E−06 | −1.544533E−06 | −1.156921E−06 | −1.738054E−06 |
| A10 | 0.000000E+00 | 0.000000E+00 | 0.000000E+00 | 0.000000E+00 | 0.000000E+00 | 0.000000E+00 | 0.000000E+00 |

| | Surface No | | | | |
|---|---|---|---|---|---|
| | 9 | 10 | 11 | 12 | 13 |
| k | 0.000000E+00 | 0.000000E+00 | 0.000000E+00 | 0.000000E+00 | 0.000000E+00 |
| A4 | 1.146367E−04 | 1.844509E−04 | −1.371738E−03 | −8.251547E−04 | −4.385916E−04 |
| A6 | 3.206730E−05 | 1.923476E−05 | 3.985607E−05 | 5.645082E−05 | −2.543423E−05 |
| A8 | 3.291454E−07 | −7.007774E−07 | −1.359166E−07 | −1.685789E−07 | 9.692976E−07 |
| A10 | 0.000000E+00 | 0.000000E+00 | 0.000000E+00 | 0.000000E+00 | −9.320470E−09 |

In the sixth embodiment, the form of the aspheric surface equation is similar to that in the first embodiment. Besides, the definitions of parameters in following tables are similar to those in the first embodiment, so the repetitive details will not be given here.

The following values for the conditional expressions can be obtained from the data in Table 11 and Table 12:

| Sixth Embodiment (Primary Reference Wavelength = 555 nm) | | | | | |
|---|---|---|---|---|---|
| |f/f1| | |f/f2| | |f/f3| | |f/f4| | |f/f5| | |f/f6| |
| 0.43863 | 0.61380 | 0.58777 | 0.53124 | 0.40154 | 0.76940 |
| ΣPPR | ΣNPR | ΣPPR/|ΣNPR| | IN12/f | IN56/f | TP4/(IN34 + TP4 + IN45) |
| 1.75648 | 1.05243 | 1.66899 | 2.52496 | 0.08781 | 0.95144 |

-continued

| Sixth Embodiment (Primary Reference Wavelength = 555 nm) | | | | | |
|---|---|---|---|---|---|
| \|f1/f2\| | \|f2/f3\| | (TP1 + IN12)/TP2 | | (TP6 + IN56)/TP5 | |
| 1.39936 | 0.95759 | 4.24516 | | 0.42119 | |
| HOS | InTL | HOS/HOI | InS/HOS | ODT % | TDT % |
| 35.00000 | 32.66950 | 7.00000 | 0.61165 | −60.99330 | 45.69950 |
| HVT51 | HVT52 | HVT61 | HVT62 | HVT62/HOI | HVT62/HOS |
| 0 | 0 | 0.00000 | 3.06977 | 0.61395 | 0.08771 |
| TP2/TP3 | TP3/TP4 | InRS61 | InRS62 | \|InRS61\|/TP6 | \|InRS62\|/TP6 |
| 1.62447 | 0.45027 | −1.83168 | −0.13462 | 0.91315 | 0.06711 |
| PSTA | PLTA | NSTA | NLTA | SSTA | SLTA |
| 0.001 mm | −0.004 mm | −0.027 mm | −0.010 mm | −0.001 mm | 0.004 mm |
| VSFS0 | VSFS3 | VSFS7 | VTFS0 | VTFS3 | VTFS7 |
| −0.000 | −0.000 | −0.010 | −0.000 | 0.005 | 0.005 |
| VSMTF0 | VSMTF3 | VSMTF7 | VTMTF0 | VTMTF3 | VTMTF7 |
| 0.822 | 0.805 | 0.780 | 0.822 | 0.788 | 0.602 |
| ISFS0 | ISFS3 | ISFS7 | ITFS0 | ITFS3 | ITFS7 |
| −0.000 | −0.005 | −0.025 | −0.000 | 0.005 | 0.005 |
| ISMTF0 | ISMTF3 | ISMTF7 | ITMTF0 | ITMTF3 | ITMTF7 |
| 0.804 | 0.755 | 0.648 | 0.804 | 0.740 | 0.640 |
| FS | AIFS | AVFS | AFS | | |
| 0.000 | −0.003 | −0.000 | 0.003 | | |

The following values about the length of the outline curve can be obtained from the data in Table 11 and Table 12.

| Sixth Embodiment (Primary Reference Wavelength = 555 nm) | | | | | | |
|---|---|---|---|---|---|---|
| ARE | ½(HEP) | ARE value | ARE − ½(HEP) | 2 (ARE/HEP) % | TP | ARE/TP (%) |
| 11 | 0.969 | 0.969 | −0.00016 | 99.98% | 2.094 | 46.28% |
| 12 | 0.969 | 0.974 | 0.00494 | 100.51% | 2.094 | 46.52% |
| 21 | 0.969 | 0.969 | −0.00019 | 99.98% | 3.249 | 29.83% |
| 22 | 0.969 | 0.972 | 0.00328 | 100.34% | 3.249 | 29.93% |
| 31 | 0.969 | 0.969 | 0.00015 | 100.02% | 2.000 | 48.47% |
| 32 | 0.969 | 0.970 | 0.00085 | 100.09% | 2.000 | 48.50% |
| 41 | 0.969 | 0.970 | 0.00066 | 100.07% | 4.442 | 21.83% |
| 42 | 0.969 | 0.973 | 0.00399 | 100.41% | 4.442 | 21.91% |
| 51 | 0.969 | 0.970 | 0.00106 | 100.11% | 5.728 | 16.94% |
| 52 | 0.969 | 0.970 | 0.00127 | 100.13% | 5.728 | 16.94% |
| 61 | 0.969 | 0.972 | 0.00285 | 100.29% | 2.006 | 48.46% |
| 62 | 0.969 | 0.969 | −0.00010 | 99.99% | 2.006 | 48.31% |
| ARS | EHD | ARS value | ARS − EHD | (ARS/EHD) % | TP | ARS/TP (%) |
| 11 | 11.167 | 11.430 | 0.26224 | 102.35% | 2.094 | 545.87% |
| 12 | 5.384 | 7.962 | 2.57781 | 147.88% | 2.094 | 380.24% |
| 21 | 2.149 | 2.151 | 0.00160 | 100.07% | 3.249 | 66.19% |
| 22 | 3.144 | 3.363 | 0.21861 | 106.95% | 3.249 | 103.50% |
| 31 | 3.321 | 3.380 | 0.05878 | 101.77% | 2.000 | 168.98% |
| 32 | 4.053 | 4.076 | 0.02277 | 100.56% | 2.000 | 203.78% |
| 41 | 4.117 | 4.152 | 0.03478 | 100.84% | 4.442 | 93.48% |
| 42 | 4.809 | 5.225 | 0.41647 | 108.66% | 4.442 | 117.64% |
| 51 | 5.511 | 5.804 | 0.29338 | 105.32% | 5.728 | 101.33% |
| 52 | 5.466 | 5.842 | 0.37616 | 106.88% | 5.728 | 101.99% |

-continued

Sixth Embodiment (Primary Reference Wavelength = 555 nm)

| 61 | 6.108 | 6.499 | 0.39101 | 106.40% | 2.006 | 323.98% |
| 62 | 5.358 | 5.371 | 0.01319 | 100.25% | 2.006 | 267.78% |

The following values for the conditional expressions can be obtained from the data in Table 11 and Table 12:

Values Related to Inflection Point of Sixth Embodiment
(Primary Reference Wavelength = 555 nm)

| HIF111 | 10.7461 | HIF111/HOI | 2.1492 | SGI111 | 1.8511 | |SGI111|/(|SGI111| + TP1) | 0.4692 |
| HIF211 | 0.4133 | HIF211/HOI | 0.0827 | SGI211 | 0.0003 | |SGI211|/(|SGI211| + TP2) | 0.0001 |
| HIF321 | 2.6507 | HIF321/HOI | 0.5301 | SGI321 | 0.2420 | |SGI321|/(|SGI321| + TP3) | 0.1079 |
| HIF411 | 3.2578 | HIF411/HOI | 0.6516 | SGI411 | 0.3505 | |SGI411|/(|SGI411| + TP4) | 0.0731 |
| HIF421 | 4.3404 | HIF421/HOI | 0.8681 | SGI421 | −1.5410 | |SGI421|/(|SGI421| + TP4) | 0.2576 |
| HIF511 | 4.8003 | HIF511/HOI | 0.9601 | SGI511 | 1.2265 | |SGI511|/(|SGI511| + TP5) | 0.1764 |
| HIF521 | 4.6748 | HIF521/HOI | 0.9350 | SGI521 | −1.3639 | |SGI521|/(|SGI521| + TP5) | 0.1923 |
| HIF611 | 4.0283 | HIF611/HOI | 0.8057 | SGI611 | −1.2226 | |SGI611|/(|SGI611| + TP6) | 0.3787 |
| HIF621 | 1.8312 | HIF621/HOI | 0.3662 | SGI621 | 0.0360 | |SGI621|/(|SGI621| + TP6) | 0.0176 |

Although the present invention is disclosed by the aforementioned embodiments, those embodiments do not serve to limit the scope of the present invention. A person skilled in the art could perform various alterations and modifications to the present invention, without departing from the spirit and the scope of the present invention. Hence, the scope of the present invention should be defined by the following appended claims.

Despite the fact that the present invention is specifically presented and illustrated with reference to the exemplary embodiments thereof, it should be apparent to a person skilled in the art that, various modifications could be performed to the forms and details of the present invention, without departing from the scope and spirit of the present invention defined in the claims and their equivalence.

What is claimed is:

1. An optical image capturing system, from an object side to an image side, comprising:
   a first lens with refractive power;
   a second lens with refractive power;
   a third lens with refractive power;
   a fourth lens with refractive power;
   a fifth lens with refractive power;
   a sixth lens with refractive power;
   a first image plane, which is an image plane specifically for visible light and perpendicular to an optical axis, and a through focus modulation transfer rate (MTF) of central field of view of the first image plane having a maximum value at a first spatial frequency; and
   a second image plane, which is an image plane specifically for infrared light and perpendicular to the optical axis, and a through focus modulation transfer rate (MTF) of central of field of view of the second image plane having a maximum value at the first spatial frequency;
wherein the optical image capturing system has six lenses with refractive powers, and the optical image capturing system has a maximum image height HOI on the first image plane, there is at least one lens having positive refractive power among the first lens to the sixth lens, focal lengths of the six lenses are respectively f1, f2, f3, f4, f5 and f6, and a focal length of the optical image capturing system is f, and an entrance pupil diameter of the optical image capturing system is HEP, there is a distance HOS on the optical axis from an object side of the first lens to the first image plane, there is a distance InTL on the optical axis from the object side of the first lens to an image side of the sixth lens, a half maximum angle of view of the optical image capturing system is HAF, a distance on the optical axis between the first image plane and the second image plane is FS, and the optical image capturing system meets the following conditions: $1.0 \leq f/HEP \leq 10.0$, $0 \deg < HAF \leq 150 \deg$, $|FS| \leq 60$ μm, and $1 \leq HOS/HOI \leq 15$.

2. The optical image capturing system of claim 1, wherein a wavelength of the infrared light is from 700 nm to 1300 nm, and the first spatial frequency is expressed as SP1, the following condition is satisfied: $SP1 \leq 440$ cycles/mm.

3. The optical image capturing system of claim 1, wherein the optical image capturing system meets the following conditions: $1 \leq HOS/HOI \leq 10$.

4. The optical image capturing system of claim 1, wherein at least one lens among the first lens to the sixth lens is made of the glass material.

5. The optical image capturing system of claim 1, wherein the optical image capturing system meets the following conditions: $|FS| \leq 10$ μm.

6. The optical image capturing system of claim 1, wherein with a point on the any surface of any one of the six lenses which crosses the optical axis defined as a starting point, a length of an outline curve from the starting point to a coordinate point of vertical height with a distance from the optical axis to the half entrance pupil diameter on the surface along an outline of the surface is ARE, the following condition is satisfied: $1 \leq 2(ARE/HEP) \leq 2.0$.

7. The optical image capturing system of claim 1, wherein with a first point on the object side of the six lenses which crosses the optical axis defined as a first starting point, a length of an outline curve from the first starting point to a coordinate point of vertical height with a distance from the optical axis to the half entrance pupil diameter on the surface along an outline of the surface is expressed as ARE61, with a second point on the image side of the six lenses which crosses the optical axis defined as a second starting point, a length of an outline curve from the second starting point to a coordinate point of vertical height with a distance from the optical axis to the half entrance pupil diameter on the surface along an outline of the surface is expressed as ARE62, a thickness of the sixth lens on the optical axis is TP6, the following conditions are satisfied: 0.05≤ARE61/TP6≤35; and 0.05≤ARE62/TP6≤35.

8. The optical image capturing system of claim 1, wherein TV distortion of the optical image capturing system when forming image is TDT, there is a maximum image height HOI of the optical image capturing system on the first image plane, a lateral aberration of the longest operation wavelength of visible light of a positive tangential fan of the optical image capturing system passing through a margin of the entrance pupil and projecting onto the first image plane by 0.7 HOI is expressed as PLTA, and a lateral aberration of the shortest operation wavelength of visible light of the positive tangential fan of the optical image capturing system passing through the margin of the entrance pupil and projecting onto the first image plane by 0.7 HOI is expressed as PSTA, a lateral aberration of the longest operation wavelength of visible light of a negative tangential fan of the optical image capturing system passing through the margin of the entrance pupil and projecting onto the first image plane by 0.7 HOI is expressed as NLTA, a lateral aberration of the shortest operation wavelength of visible light of a negative tangential fan of the optical image capturing system passing through the margin of the entrance pupil and projecting onto the first image plane by 0.7 HOI is expressed as NSTA, a lateral aberration of the longest operation wavelength of visible light of a sagittal fan of the optical image capturing system passing through the margin of the entrance pupil and projecting onto the first image plane by 0.7 HOI is expressed as SLTA, a lateral aberration of the shortest operation wavelength of visible light of the sagittal fan of the optical image capturing system passing through the margin of the entrance pupil and projecting onto the first image plane by 0.7 HOI is expressed as SSTA, the following conditions are satisfied: PLTA≤200 μm; PSTA≤200 μm; NLTA≤200 μm; NSTA≤200 μm; SLTA≤200 μm; and SSTA≤200 μm; |TDT|<250%.

9. The optical image capturing system of claim 1, further comprising an aperture, wherein a distance from the aperture to the first image plane on the optical axis is InS, a wavelength of the infrared light is from 700 nm to 1300 nm, and the first spatial frequency is expressed as SP1, the following conditions are satisfied: 0.2≤InS/HOS≤1.1 and SP1≤55 cycles/mm.

10. An optical image capturing system, from an object side to an image side, comprising:
- a first lens with refractive power;
- a second lens with refractive power;
- a third lens with refractive power;
- a fourth lens with refractive power;
- a fifth lens with refractive power;
- a sixth lens with refractive power;
- a first image plane, which is an image plane specifically for visible light and perpendicular to an optical axis, and a through focus modulation transfer rate (MTF) of central field of view of the first image plane having a maximum value at a first spatial frequency, and the first spatial frequency being 55 cycles/mm; and
- a second image plane, which is an image plane specifically for infrared light and perpendicular to the optical axis, and the through focus modulation transfer rate (MTF) of central field of view of the second image plane having a maximum value at the first spatial frequency, and the first spatial frequency being 55 cycles/mm;

wherein the optical image capturing system has six lenses with refractive powers, the optical image capturing system has a maximum image height HOI on the first image plane that is perpendicular to the optical axis, there is at least one lens having positive refractive power among the first lens to the sixth lens, focal lengths of the six lenses are respectively f1, f2, f3, f4, f5 and f6, a focal length of the optical image capturing system is f, an entrance pupil diameter of the optical image capturing system is HEP; there is a distance HOS on the optical axis from an object side of the first lens to the first image plane, there is a distance InTL on the optical axis from the object side of the first lens to an image side of the sixth lens, a half maximum angle of view of the optical image capturing system is HAF, a distance on the optical axis between the first image plane and the second image plane is FS, with a point on the any surface of any one of the six lenses which crosses the optical axis defined as a starting point, a length of an outline curve from the starting point to a coordinate point of vertical height with a distance from the optical axis to the half entrance pupil diameter on the surface along an outline of the surface is ARE, the following condition are satisfied: 1.0≤f/HEP≤10.0; 0 deg<HAF≤150 deg; |FS|≤30 μm; 1≤2(ARE/HEP)≤2.0 and 1≤HOS/HOI≤15.

11. The optical image capturing system of claim 10, there is an air gap between each lens among the six lenses.

12. The optical image capturing system of claim 10, wherein an effective maximum radius of any surface of any lens among the six lenses is expressed as EHD, with a first point on the any surface of any one of the six len which crosses the optical axis defined as a first starting point and the maximum effective half diameter position of the surface along the outline of the surface defined as a first final point, a length of outline curve from the first starting point to the first final point is ARS, which meets the following condition: 1≤ARS/EHD≤2.0.

13. The optical image capturing system of claim 10, wherein there is at least one lens made of the glass material among the first lens to the sixth lens and at least one surface of the lens made of the glass material is aspheric surface.

14. The optical image capturing system of claim 10, wherein the optical image capturing system meets the following conditions: |FS|≤10 μm.

15. The optical image capturing system of claim 10, wherein the optical image capturing system meets the following conditions: 1≤HOS/HOI≤10.

16. The optical image capturing system of claim 10, wherein a distance on the optical axis between the third lens and the fourth lens is IN34, a distance on the optical axis between the fourth lens and the fifth lens is IN45, and a thickness of the third lens, a thickness of the fourth lens and a thickness of the fifth lens are respectively TP3, TP4 and TP5, the following conditions are satisfied: (IN34+IN45)≤TP3; (IN34+IN45)≤TP4; and (IN34+IN45)≤TP5.

17. The optical image capturing system of claim 10, a distance on the optical axis between the fifth lens and the sixth lens is IN56, and meets the following condition: 0<IN56/f≤5.0.

18. The optical image capturing system of claim 10, wherein a distance on the optical axis between the fifth lens and the sixth lens is IN56, and a thicknesses of the fifth lens and a thicknesses of the sixth lens on the optical axis are respectively TP5 and TP6, the following conditions is satisfied: 0.15≤(TP6+IN56)/TP5≤50.

19. The optical image capturing system of claim 10, wherein at least one lens among the first lens, the second lens, the third lens, the fourth lens, the fifth lens and the sixth lens is a light filter element which filter light which is less than 500 nm.

20. An optical image capturing system, from an object side to an image side, comprising:
- a first lens with refractive power;
- a second lens with refractive power;
- a third lens with refractive power;
- a fourth lens with refractive power;
- a fifth lens with refractive power;
- a sixth lens with refractive power;
- a first average image plane, which is an image plane specifically for visible light and perpendicular to an optical axis, and the first average image plane is disposed at the average position of the defocusing positions, where through focus modulation transfer rates (values of MTF) of visible light at central field of view, 0.3 field of view, and 0.7 field of view of the optical image capturing system are respectively at corresponding maximum value at a first spatial frequency, the first spatial frequency being 55 cycles/mm; and
- a second average image plane, which is an image plane specifically for infrared light and perpendicular to the optical axis, and the second average image plane is disposed at the average position of the defocusing positions, where through focus modulation transfer rates of infrared light (values of MTF) at central field of view, 0.3 field of view, and 0.7 field of view of the optical image capturing system are at their respective maximum at the first spatial frequency, the first spatial frequency being 55 cycles/mm;

wherein the optical image capturing system has six lenses with refractive powers and there is at least one lens made of the glass material, the optical image capturing system has a maximum image height HOI on the first average image plane that is perpendicular to the optical axis, focal lengths of the six lenses are respectively f1, f2, f3, f4, f5 and f6, a focal length of the optical image capturing system is f, an entrance pupil diameter of the optical image capturing system is HEP, a half maximum angle of view of the optical image capturing system is HAF, there is a distance HOS on the optical axis from an object side of the first lens to the first average image plane, there is a distance InTL on the optical axis from the object side of the first lens to an image side of the sixth lens, a distance on the optical axis between the first average image plane and the second average image plane is AFS, with a point on the any surface of any one of the six lenses which crosses the optical axis defined as a starting point, a length of an outline curve from the starting point to a coordinate point of vertical height with a distance from the optical axis to the half entrance pupil diameter on the surface along an outline of the surface is ARE, the following condition are satisfied: $1 \leq f/HEP \leq 10$; $0 \text{ deg} < HAF \leq 150 \text{ deg}$; $|AFS| \leq 30 \text{ μm}$; $1 \leq 2(ARE/HEP) \leq 2.0$ and $1 \leq HOS/HOI \leq 10$.

21. The optical image capturing system of claim 20, wherein a effective maximum radius of any surface of any lens among the six lenses is expressed as EHD, with a first point on the any surface of any one of the six lenses which crosses the optical axis defined as a first starting point and a maximum effective half diameter position of the surface along the outline of the surface defined as a first final point, a length of an outline curve from the first starting point to the first final point is ARS, which meets the following condition: $0.9 \leq ARS/EHD \leq 2.0$.

22. The optical image capturing system of claim 20, wherein the first lens to the sixth lens are all made of the glass.

23. The optical image capturing system of claim 20, wherein at least one surface of at least one of the lenses is aspheric surface.

24. The optical image capturing system of claim 20, wherein the optical image capturing system meets the following condition: $|AFS| \leq 30 \text{ μm}$.

25. The optical image capturing system of claim 20, further comprising an aperture and an image sensing device, wherein the image sensing device is disposed on the first average image plane and is disposed with at least 100 thousand pixels, there is a distance InS on the optical axis from the aperture to the first average image plane, the following condition is satisfied: $0.2 \leq InS/HOS \leq 1.1$.

* * * * *